United States Patent
Gotou

(10) Patent No.: US 6,680,593 B2
(45) Date of Patent: Jan. 20, 2004

(54) DISK DRIVE APPARATUS AND MOTOR

(75) Inventor: Makoto Gotou, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/087,635

(22) Filed: Feb. 28, 2002

(65) Prior Publication Data

US 2002/0121871 A1 Sep. 5, 2002

(30) Foreign Application Priority Data

Mar. 2, 2001 (JP) ........................................ 2001-057745

(51) Int. Cl.⁷ ................................................ H02P 7/06
(52) U.S. Cl. ...................................... 318/254; 318/138
(58) Field of Search ................................ 318/254, 138, 318/34, 439, 37, 74, 95; 363/34

(56) References Cited

U.S. PATENT DOCUMENTS

| | | |
|---|---|---|
| 5,122,715 A | 6/1992 | Kimura et al. |
| 5,160,873 A | * 11/1992 | Tukiyama et al. .......... 318/254 |
| 5,473,232 A | 12/1995 | Tamaki et al. |
| 5,982,118 A | 11/1999 | Gotou et al. |
| 6,163,120 A | 12/2000 | Menegoli |

FOREIGN PATENT DOCUMENTS

| | | | |
|---|---|---|---|
| JP | 2001-275388 A | 3/2000 | |
| JP | 2000295887 A | * 10/2000 | ............. H02P/6/08 |

* cited by examiner

Primary Examiner—Robert Nappi
Assistant Examiner—Renata McCloud
(74) Attorney, Agent, or Firm—Akin Gump Strauss Hauer & Feld, L.L.P.

(57) ABSTRACT

Power transistors of a power supplying part execute high-frequency switching operation and form current paths to three-phase windings so as to rotate the disk. A voltage detecting part produces a detected pulse signal responding with terminal voltages of the three-phase windings. An activation operation part controls active periods of the power transistors in response to the detected signal. A phase detecting part includes a slant producing part and a phase pulse producing part. The slant producing part produces a slant voltage signal which intermittently responds with a voltage difference between one of the power supplying terminal voltages and the common terminal voltage of the three-phase windings and has a voltage slant. The phase pulse producing part produces a phase pulse signal by comparing the slant voltage signal with a reference voltage. A commanding part produces a command signal which responds with the phase pulse signal. A switching operation block causes at least one of the power transistors to perform high-frequency switching responding with the command signal.

40 Claims, 35 Drawing Sheets

DISK DRIVE APPARATUS AND MOTOR

BACKGROUND OF THE INVENTION

The present invention relates to a motor and a disk drive apparatus including the motor.

In recent years, a motor in which current paths are altered electronically by using a number of transistors has been used widely in office automation apparatuses and audio-visual apparatuses. In other words, optical disk drive apparatuses (such as DVD apparatuses, CD apparatuses, etc.), magnetic disk drive apparatuses (such as HDD apparatuses, FDD apparatuses, etc.) and the like, include this kind of motor.

FIG. 35 shows a conventional motor, and the operation of the motor will be described below. A rotor 2011 has a field part formed by a permanent magnet. In a position detector 2041, three position sensors detect the magnetic field of the field part of the rotor 2011. The position detector 2041 produces two sets of three-phase voltage signals, Kp1, Kp2 and Kp3, and Kp4, Kp5 and Kp6, from the three-phase output signals of the three position sensors responding with the rotation of the rotor 2011. A first distributor 2042 produces three-phase low-side signals Mp1, Mp2 and Mp3 responding with the voltage signals Kp1, Kp2 and Kp3, and controls the activation of the low-side NPN-type bipolar power transistors 2021, 2022 and 2023. A second distributor 2043 produces three-phase high-side signals Mp4, Mp5 and Mp6 responding with the voltage signals Kp4, Kp5 and Kp6, and controls the activation of the high-side PNP-type bipolar power transistors 2025, 2026 and 2027. Hence, three-phase drive voltages are supplied to windings 2012, 2013 and 2014.

In this conventional configuration, power losses at the power transistors are large, whereby the power efficiency of the motor is significantly low. The NPN-type bipolar power transistors 2021, 2022 and 2023 and the PNP-type bipolar power transistors 2025, 2026 and 2027 supply drive voltages to the windings 2012, 2013 and 2014 by controlling voltage drops between the emitters and the collectors thereof in an analogue manner responding with the output signals of the three position sensors. A residual voltage in each power transistor is large, and a large power loss and heat generation are caused by the product of the residual voltage and the drive current supplied to each winding. As a result, the power efficiency of the motor is low, and the power consumption of the disk drive apparatus including the motor is large. In addition, the power loss increases the disk temperature at the disk drive apparatus, thereby increasing bit errors during recording and reproduction of information on a disk.

The specification of U.S. Pat. No. 5,982,118 discloses a motor wherein power transistors are subjected to PWM operation (PWM: Pulse Width Modulation) by using the outputs of two sensor to reduce power consumption. However, in the motor configurations in accordance with the above-mentioned conventional example shown in FIG. 35 and the specification of U.S. Pat. No. 5,982,118, two or three position sensors are included to detect the rotational position of the rotor. Hence, space, wiring, etc. are required for the installation of the position sensors, thereby making the configurations complicated and raising the cost thereof.

The specifications of U.S. Pat. No. 5,122,715 and U.S. Pat. No. 5,473,232 disclose motors wherein the terminal voltages of the windings are detected and the current paths to the windings are altered responding with the timing of the detection. In the motor configuration described in the specification of U.S. Pat. No. 5,122,715, the width of activation is 120 degrees, whereby vibration and acoustic noise are significant. In addition, the motor configuration is complicated due to use of a switching regulator. In the motor configuration described in the specification of U.S. Pat. No. 5,473,232, power transistors are subjected to PWM operation to reduce power losses. However, the width of activation for each power transistor is 120 degrees, whereby vibration and acoustic noise are significant. Furthermore, in the motor configuration described in the specification of U.S. Pat. No. 5,473,232, the detection timing of the terminal voltages of the windings is apt to fluctuate because of the PWM operation. Hence, when the rotational speed of the rotor is controlled by a detected pulse signal responding with the terminal voltages of the windings, fluctuation of the rotational speed of the rotor occurs owing to the timing fluctuation of the detected pulse signal.

In magnetic disk drive apparatuses, such as HDD apparatuses, and optical disk drive apparatuses, such as DVD apparatuses, speed fluctuation (jitter) must be minimized to stably carry out recording and/or reproduction on a high-density disk. However, when power transistors are subjected to PWM operation, very large high-frequency switching noise occurs, thereby causing a large timing fluctuation of the detected pulse signal. Hence, the reliability of the recording and/or reproduction of the disk drive apparatus lowers significantly. It is thus difficult to subject the power transistors to PWM operation.

BRIEF SUMMARY OF THE INVENTION

The object of the present invention is to provide a motor and a disk drive apparatus including the motor wherein the above-mentioned problems have been solved individually or concurrently.

A motor in accordance with one aspect of the present invention comprises:

a rotor having a field part which generates field fluxes;

Q-phase windings (Q is an integer of 3 or more);

voltage supplying means, including two output terminals, for supplying a DC voltage;

power supplying means having Q first power transistors and Q second power transistors, each of said Q first power transistors forming a current path between first output terminal side of said voltage supplying means and one of said Q-phase windings, and each of said Q second power transistors forming a current path between second output terminal side of said voltage supplying means and one of said Q-phase windings;

voltage detecting means for producing a detected pulse signal which responds with terminal voltages of said Q-phase windings;

phase detecting means for producing a phase pulse signal which responds with terminal voltages of said Q-phase windings;

state shifting means for shifting a holding state from one state to at least one other state in sequence responding with said detected pulse signal of said voltage detecting means;

activation control means for controlling active periods of said Q first power transistors and said Q second power transistors responding with said holding state of said state shifting means;

commanding means for producing a command signal which responds with said phase pulse signal of said phase detecting means; and switching operation means for causing at least one power transistor among said Q first power transistors and said Q second power transistors to perform high-frequency switching responding with said command signal;

and that said activation control means causes each of said active periods of said Q first power transistors and said Q second power transistors to become larger than the period of 360/Q electrical degrees, said switching operation means produces a high-frequency switching pulse signal which responds with said command signal and switches said at least one power transistor responding with said switching pulse signal, and said phase detecting means includes:

slant producing means for producing a slant voltage signal at a terminal of a capacitor, said slant voltage signal responding intermittently with a voltage difference between one of the power supplying terminal voltages and the common terminal voltage of said Q-phase windings during sampling periods and having substantially a voltage slant during at least one of the rest periods except said sampling periods, and phase pulse producing means for producing said phase pulse signal by comparing said slant voltage signal with a reference voltage.

With this configuration, the switching operation means cause the power transistors of the power supplying means to perform high-frequency switching. Hence, the power losses of the power transistors of the power supplying means are reduced remarkably, and heat generation at the motor is reduced significantly. In addition, the voltage detecting means, the state shifting means and the activation control means produce the detected pulse signal responding with the terminal voltages of the windings and cause the rotor to rotate in a predetermined direction responding with the detected pulse signal. Therefore, no position sensor is necessary, and the configuration of the motor is simplified. Furthermore, the active periods of the first and second power transistors are set so as to be larger than the period of an electrical angle of 360/Q degrees, whereby two of the power transistors are activated simultaneously during the alteration of current paths. Hence, the alteration of the current paths becomes smooth, and the pulsation of the generated drive force becomes small, whereby the motor has low vibration and low acoustic noise. Still further, the slant voltage signal at the terminal (or across the terminals) of the single capacitor intermittently responds with the voltage difference between one of the power supplying terminal voltages and the common terminal voltage of the Q-phase windings during the sampling periods. The slant voltage signal has the voltage slant during at least one of the rest periods other than the sampling periods. As a result, it is possible to produce accurately the slant voltage signal which nearly corresponds to the voltage difference between one of the power supplying terminal voltages and the common terminal voltage. The phase detecting means selects one of the power supplying terminal voltages responding with the operation state of the activation control means, for example. Since the slant voltage signal intermittently responds with the voltage difference between one of the power supplying terminal voltages and the common terminal voltage, the slant producing means can produce the slant voltage signal having an accurate voltage slant at the terminal of the single capacitor. Since the phase pulse signal responds with the slant voltage signal, the phase pulse signal is free from the influence of the switching of the power transistors. Therefore the phase pulse signal changes at accurate timing. The commanding means produces the command signal responding with the rotational speed of the rotor by using the phase pulse signal. The switching operation means causes at least one of the power transistors to perform high-frequency switching responding with the command signal. Hence, the rotational speed of the rotor can be controlled accurately. As a result, a motor with low power consumption, low vibration, low acoustic noise and low fluctuation of the rotational speed can be realized at low cost.

A motor in accordance with another aspect of the present invention comprises:

a rotor having a field part which generates field fluxes;

Q-phase windings (Q is an integer of 3 or more);

voltage supplying means, including two output terminals, for supplying a DC voltage;

power supplying means having Q first power transistors and Q second power transistors, each of said Q first power transistors forming a current path between first output terminal side of said voltage supplying means and one of said Q-phase windings, and each of said Q second power transistors forming a current path between second output terminal side of said voltage supplying means and one of said Q-phase windings;

phase detecting means for producing a phase pulse signal which responds with terminal voltages of said Q-phase windings;

state shifting means for shifting a holding state from one state to at least one other state in sequence responding with said phase pulse signal of said phase detecting means;

activation control means for controlling active periods of said Q first power transistors and said Q second power transistors responding with said holding state of said state shifting means;

commanding means for producing a command signal which responds with said phase pulse signal of said phase detecting means; and switching operation means for causing at least one power transistor among said Q first power transistors and said Q second power transistors to perform high-frequency switching responding with said command signal;

and that said activation control means causes each of said active periods of said Q first power transistors and said Q second power transistors to become larger than the period of 360/Q electrical degrees, said switching operation means produces a high-frequency switching pulse signal which responds with said command signal and switches said at least one power transistor responding with said switching pulse signal, and said phase detecting means includes:

slant producing means for producing a slant voltage signal at a terminal of a capacitor, said slant voltage signal responding intermittently with a voltage difference between one of the power supplying terminal voltages and the common terminal voltage of said Q-phase windings during sampling periods and having substantially a voltage slant during at least one of the rest periods except said sampling periods, and phase pulse producing means for producing said phase pulse signal by comparing said slant voltage signal with a reference voltage.

With this configuration, the switching operation means cause the power transistors of the power supplying means to perform high-frequency switching. Hence, the power losses of the power transistors of the power supplying means are reduced remarkably, and heat generation at the motor is reduced significantly. In addition, the phase detecting means, the state shifting means and the activation control means produce the phase pulse signal responding with the terminal voltages of the windings and cause the rotor to rotate in a predetermined direction responding with the phase pulse signal. Therefore, no position sensor is necessary, and the configuration of the motor is simplified. Furthermore, the active periods of the first and second power transistors are set so as to be larger than the period of an electrical angle of 360/Q degrees, whereby two of the power transistors are activated simultaneously during the alteration of current paths. Hence, the alteration of the current paths becomes smooth, and the pulsation of the generated drive force becomes small, whereby the motor has low vibration and low acoustic noise. Still further, the slant voltage signal at the terminal (or across the terminals) of the single capacitor intermittently responds with the voltage difference between one of the power supplying terminal voltages and the common terminal voltage of the Q-phase windings during the sampling periods. The slant voltage signal has the voltage slant during at least one of the rest periods other than the sampling periods. As a result, it is possible to produce accurately the slant voltage signal which nearly corresponds to the voltage difference between one of the power supplying terminal voltages and the common terminal voltage. The phase detecting means selects one of the power supplying terminal voltages responding with the operation state of the activation control means, for example. Since the slant voltage signal intermittently responds with the voltage difference between one of the power supplying terminal voltages and the common terminal voltage, the slant producing means can produce the slant voltage signal having an accurate voltage slant at the terminal of the single capacitor. Since the phase pulse signal responds with the slant voltage signal, the phase pulse signal is free from the influence of the switching of the power transistors. Therefore the phase pulse signal changes at accurate timing. The commanding means produces the command signal responding with the rotational speed of the rotor by using the phase pulse signal. The switching operation means causes at least one of the power transistors to perform high-frequency switching responding with the command signal. Hence, the rotational speed of the rotor can be controlled accurately. As a result, a motor with low power consumption, low vibration, low acoustic noise and low fluctuation of the rotational speed can be realized at low cost.

A motor in accordance with still another aspect of the present invention:

a rotor having a field part which generates field fluxes;

Q-phase windings (Q is an integer of 3 or more);

voltage supplying means, including two output terminals, for supplying a DC voltage;

power supplying means having plural power transistors, said plural power transistors supplying said Q-phase windings with bi-directional currents from said voltage supplying means;

phase detecting means for producing a phase pulse signal which responds with terminal voltages of said Q-phase windings;

activation operation means for controlling active periods of said plural power transistors responding with terminal voltages of said Q-phase windings;

commanding means for producing a command signal which responds with said phase pulse signal of said phase detecting means; and switching operation means for causing at least one power transistor among said plural power transistors to perform high-frequency switching responding with said command signal;

and that said activation operation means causes each of said active periods of said plural power transistors to become larger than the period of 360/Q electrical degrees, said switching operation means produces a high-frequency switching pulse signal which responds with said command signal and switches said at least one power transistor responding with said switching pulse signal, and said phase detecting means includes:

slant producing means for producing a slant voltage signal at a terminal of a capacitor, said slant voltage signal responding intermittently with a voltage difference between one of the power supplying terminal voltages and the common terminal voltage of said Q-phase windings during sampling periods and having substantially a voltage slant during at least one of the rest periods except said sampling periods, and phase pulse producing means for producing said phase pulse signal responding with said slant voltage signal.

With this configuration, the switching operation means cause the power transistors of the power supplying means to perform high-frequency switching. Hence, the power losses of the power transistors of the power supplying means are reduced remarkably, and heat generation at the motor is reduced significantly. In addition, the activation operation means control the active periods of the power transistors responding with the terminal voltages of the windings and cause the rotor to rotate in a predetermined direction. Therefore, no position sensor is necessary, and the configuration of the motor is simplified. Furthermore, the active periods of the power transistors are set so as to be larger than the period of an electrical angle of 360/Q degrees, whereby two of the power transistors are activated simultaneously in the alteration of current paths. Hence, the alteration of the current paths becomes smooth, and the pulsation of the generated drive force becomes small, whereby the motor has low vibration and low acoustic noise. Still further, the slant voltage signal at the terminal (or across the terminals) of the single capacitor intermittently responds with the voltage difference between one of the power supplying terminal voltages and the common terminal voltage of the Q-phase windings during the sampling periods. The slant voltage signal has the voltage slant in at least one of the rest periods other than the sampling periods. As a result, it is possible to produce accurately the slant voltage signal which nearly corresponds to the voltage difference between one of the power supplying terminal voltages and the common terminal voltage. The phase detecting means selects one of the power supplying terminal voltages responding with the operation state of the activation operation means, for example. Since the slant voltage signal intermittently responds with the voltage difference between one of the power supplying terminal voltages and the common terminal voltage, the slant producing means can produce the slant voltage signal having an accurate voltage slant at the terminal of the single capacitor. Since the phase pulse signal responds with the slant voltage signal, the phase pulse signal is free from the influence of the switching of the power transistors. Therefore the phase pulse signal changes at accurate timing. The commanding means produces the command signal responding with the rotational speed of the rotor by using the phase pulse signal. The switching operation means causes at least one of the power transistors to perform high-frequency switching responding with the command signal. Hence, the rotational speed of the rotor can be controlled accurately. As a result, a motor with low power consumption, low vibration, low acoustic noise and low fluctuation of the rotational speed can be realized at low cost.

A motor in accordance with further aspect of the present invention:

- a rotor having a field part which generates field fluxes;
- Q-phase windings (Q is an integer of 3 or more);
- voltage supplying means, including two output terminals, for supplying a DC voltage;
- power supplying means having plural power transistors, said plural power transistors supplying said Q-phase windings with bi-directional currents from said voltage supplying means;
- phase detecting means for producing a phase pulse signal which responds with terminal voltages of said Q-phase windings;
- activation operation means for controlling active periods of said plural power transistors responding with terminal voltages of said Q-phase windings;
- commanding means for producing a command signal which responds with said phase pulse signal of said phase detecting means; and
- switching operation means for causing at least one power transistor among said plural power transistors to perform high-frequency switching responding with said command signal;

and that said activation operation means causes each of said active periods of said plural power transistors to become larger than the period of 360/Q electrical degrees, said switching operation means produces a high-frequency switching pulse signal which responds with said command signal and switches said at least one power transistor responding with said switching pulse signal, and said phase detecting means includes:

- slant producing means for producing a first voltage signal at a terminal of a first capacitor which intermittently responds with one of the power supplying terminal voltages of said Q-phase winding means, and producing a second voltage signal at a terminal of a second capacitor which intermittently responds with the common terminal voltage of said Q-phase windings during sampling periods and has substantially a voltage slant during at least one of the rest periods except said sampling periods, and

- phase pulse producing means for producing said phase pulse signal by comparing said first voltage signal with said second voltage signal.

With this configuration, the switching operation means cause the power transistors of the power supplying means to perform high-frequency switching. Hence, the power losses of the power transistors of the power supplying means are reduced remarkably, and heat generation at the motor is reduced significantly. In addition, the activation operation means control the active periods of the power transistors responding with the terminal voltages of the windings and cause the rotor to rotate in a predetermined direction. Therefore, no position sensor is necessary, and the configuration of the motor is simplified. Furthermore, the active periods of the power transistors are set so as to be larger than the period of an electrical angle of 360/Q degrees, whereby two of the power transistors are activated simultaneously in the alteration of current paths. Hence, the alteration of the current paths becomes smooth, and the pulsation of the generated drive force becomes small, whereby the motor has low vibration and low acoustic noise. Still further, the first voltage signal intermittently responds with one of the power supplying terminal voltages of the Q-phase windings. The second voltage signal intermittently responds with the common terminal voltage of the Q-phase windings during the sampling periods and has the voltage slant during at least one of the rest periods other than the sampling periods. The phase detecting means selects one of the power supplying terminal voltages responding with the operation state of the activation operation means, for example. Since the second voltage signal having the voltage slant responds with the common terminal voltage, the second voltage signal has a relatively intermediate level. It is thus easy to add the accurate voltage slant to the second voltage signal. Since the phase pulse signal responds with the comparison result between the first voltage signal and the second voltage signal, the phase pulse signal is free from the influence of the switching of the power transistors. Therefore the phase pulse signal changes at accurate timing. The commanding means produces the command signal responding with the rotational speed of the rotor by using the phase pulse signal. The switching operation means causes at least one of the power transistors to perform high-frequency switching responding with the command signal. Hence, the rotational speed of the rotor can be controlled accurately. As a result, a motor with low power consumption, low vibration, low acoustic noise and low fluctuation of the rotational speed can be realized at low cost.

A disk drive apparatus in accordance with one aspect of the present invention comprises:

- head means for at least reproducing a signal from a disk or recording a signal on said disk;
- processing means for at least processing an output signal from said head means and outputting a reproduced signal, or processing a signal and outputting a recording signal into said head means;
- a rotor, having a field part which generates field fluxes, for driving directly said disk;
- Q-phase windings (Q is an integer of 3 or more);
- voltage supplying means, including two output terminals, for supplying a DC voltage;
- power supplying means having Q first power transistors and Q second power transistors, each of said Q first power transistors forming a current path between first output terminal side of said voltage supplying means and one of said Q-phase windings, and each of said Q second power transistors forming a current path between second output terminal side of said voltage supplying means and one of said Q-phase windings;
- voltage detecting means for producing a detected pulse signal which responds with terminal voltages of said Q-phase windings;

phase detecting means for producing a phase pulse signal which responds with terminal voltages of said Q-phase windings;

state shifting means for shifting a holding state from one state to at least one other state in sequence responding with said detected pulse signal of said voltage detecting means;

activation control means for controlling active periods of said Q first power transistors and said Q second power transistors responding with said holding state of said state shifting means;

commanding means for producing a command signal which responds with said phase pulse signal of said phase detecting means; and switching operation means for causing at least one power transistor among said Q first power transistors and said Q second power transistors to perform high-frequency switching responding with said command signal;

and that said activation control means causes each of said active periods of said Q first power transistors and said Q second power transistors to become larger than the period of 360/Q electrical degrees, said switching operation means produces a high-frequency switching pulse signal which responds with said command signal and switches said at least one power transistor responding with said switching pulse signal, and said phase detecting means includes:

slant producing means for producing a slant voltage signal at a terminal of a capacitor, said slant voltage signal responding intermittently with a voltage difference between one of the power supplying terminal voltages and the common terminal voltage of said Q-phase windings during sampling periods and having substantially a voltage slant during at least one of the rest periods except said sampling periods, and phase pulse producing means for producing said phase pulse signal by comparing said slant voltage signal with a reference voltage.

With this configuration, the switching operation means cause the power transistors of the power supplying means to perform high-frequency switching. Hence, the power losses of the power transistors of the power supplying means are reduced remarkably, and heat generation at the disk drive apparatus is reduced significantly. In addition, the voltage detecting means, the state shifting means and the activation control means produce the detected pulse signal responding with the terminal voltages of the windings and cause the rotor to rotate in a predetermined direction responding with the detected pulse signal. Therefore, no position sensor is necessary, and the configuration of the disk drive apparatus is simplified. Furthermore, the active periods of the first and second power transistors are set so as to be larger than the period of an electrical angle of 360/Q degrees, whereby two of the power transistors are activated simultaneously in the alteration of current paths. Hence, the alteration of the current paths becomes smooth, and the pulsation of the generated drive force becomes small, thereby reducing variation and acoustic noise of the disk remarkably. Still further, the slant voltage signal at the terminal (or across the terminals) of the single capacitor intermittently responds with the voltage difference between one of the power supplying terminal voltages and the common terminal voltage of the Q-phase windings during the sampling periods. The slant voltage signal has the voltage slant during at least one of the rest periods other than the sampling periods. As a result, it is possible to produce accurately the slant voltage signal which nearly corresponds to the voltage difference between one of the power supplying terminal voltages and the common terminal voltage. The phase detecting means selects one of the power supplying terminal voltages responding with the operation state of the activation control means, for example. Since the slant voltage signal intermittently responds with the voltage difference between one of the power supplying terminal voltages and the common terminal voltage, the slant producing means can produce the slant voltage signal having an accurate voltage slant at the terminal of the single capacitor. Since the phase pulse signal responds with the slant voltage signal, the phase pulse signal is free from the influence of the switching of the power transistors. Therefore the phase pulse signal changes at accurate timing. The commanding means produces the command signal responding with the rotational speed of the rotor by using the phase pulse signal. The switching operation means causes at least one of the power transistors to perform high-frequency switching responding with the command signal. Hence, the rotational speed of the disk can be controlled accurately, thereby improving reliability during recording and/or reproduction. As a result, a disk drive apparatus with low power consumption, low temperature increase, low disk vibration and low disk noise, suited for recording and/or reproduction on a high-density disk can be realized at low cost.

A disk drive apparatus in accordance with another aspect of the present invention comprises:

head means for at least reproducing a signal from a disk or recording a signal on said disk;

processing means for at least processing an output signal from said head means and outputting a reproduced signal, or processing a signal and outputting a recording signal into said head means;

a rotor, having a field part which generates field fluxes, for driving directly said disk;

Q-phase windings (Q is an integer of 3 or more);

voltage supplying means, including two output terminals, for supplying a DC voltage;

power supplying means having Q first power transistors and Q second power transistors, each of said Q first power transistors forming a current path between first output terminal side of said voltage supplying means and one of said Q-phase windings, and each of said Q second power transistors forming a current path between second output terminal side of said voltage supplying means and one of said Q-phase windings;

phase detecting means for producing a phase pulse signal which responds with terminal voltages of said Q-phase windings;

state shifting means for shifting a holding state from one state to at least one other state in sequence responding with said phase pulse signal of said phase detecting means;

activation control means for controlling active periods of said Q first power transistors and said Q second power transistors responding with said holding state of said state shifting means;

commanding means for producing a command signal which responds with said phase pulse signal of said phase detecting means; and switching operation means for causing at least one power transistor among said Q first power transistors and said Q second power transistors to perform high-frequency switching responding with said command signal;

and that said activation control means causes each of said active periods of said Q first power transistors and said Q second power transistors to become larger than the period of 360/Q electrical degrees, said switching operation means produces a high-frequency switching pulse signal which responds with said command signal and switches said at least one power transistor responding with said switching pulse signal, and said phase detecting means includes:

slant producing means for producing a slant voltage signal at a terminal of a capacitor, said slant voltage signal responding intermittently with a voltage difference between one of the power supplying terminal voltages and the common terminal voltage of said Q-phase windings during sampling periods and having substantially a voltage slant during at least one of the rest periods except said sampling periods, and phase pulse producing means for producing said phase pulse signal by comparing said slant voltage signal with a reference voltage.

With this configuration, the switching operation means cause the power transistors of the power supplying means to perform high-frequency switching. Hence, the power losses of the power transistors of the power supplying means are reduced remarkably, and heat generation at the disk drive apparatus is reduced significantly. In addition, the phase detecting means, the state shifting means and the activation control means produce the phase pulse signal responding with the terminal voltages of the windings and cause the rotor to rotate in a predetermined direction responding with the phase pulse signal. Therefore, no position sensor is necessary, and the configuration of the disk drive apparatus is simplified. Furthermore, the active periods of the first and second power transistors are set so as to be larger than the period of an electrical angle of 360/Q degrees, whereby two of the power transistors are activated simultaneously in the alteration of current paths. Hence, the alteration of the current paths becomes smooth, and the pulsation of the generated drive force becomes small, thereby reducing vibration and acoustic noise of the disk remarkably. Still further, the slant voltage signal at the terminal (or across the terminals) of the single capacitor intermittently responds with the voltage difference between one of the power supplying terminal voltages and the common terminal voltage of the Q-phase windings during the sampling periods. The slant voltage signal has the voltage slant during at least one of the rest periods other than the sampling periods. As a result, it is possible to produce accurately the slant voltage signal which nearly corresponds to the voltage difference between one of the power supplying terminal voltages and the common terminal voltage. The phase detecting means selects one of the power supplying terminal voltages responding with the operation state of the activation control means, for example. Since the slant voltage signal intermittently responds with the voltage difference between one of the power supplying terminal voltages and the common terminal voltage, the slant producing means can produce the slant voltage signal having an accurate voltage slant across the terminals of the single capacitor. Since the phase pulse signal responds with the slant voltage signal, the phase pulse signal is free from the influence of the switching of the power transistors. Therefore the phase pulse signal changes at accurate timing. The commanding means produces the command signal responding with the rotational speed of the rotor by using the phase pulse signal. The switching operation means causes at least one of the power transistors to perform high-frequency switching responding with the command signal. Hence, the rotational speed of the disk can be controlled accurately, thereby improving reliability during recording and/or reproduction. As a result, a disk drive apparatus with low power consumption, low temperature increase, low disk vibration and low disk noise, suited for recording and/or reproduction on a high-density disk can be realized at low cost.

A disk drive apparatus in accordance with still another aspect of the present invention comprises:

head means for at least reproducing a signal from a disk or recording a signal on said disk;

processing means for at least processing an output signal from said head means and outputting a reproduced signal, or processing a signal and outputting a recording signal into said head means;

a rotor, having a field part which generates field fluxes, for driving directly said disk;

Q-phase windings (Q is an integer of 3 or more);

voltage supplying means, including two output terminals, for supplying a DC voltage;

power supplying means having plural power transistors, said plural power transistors supplying said Q-phase windings with bi-directional currents from said voltage supplying means;

phase detecting means for producing a phase pulse signal which responds with terminal voltages of said Q-phase windings;

activation operation means for controlling active periods of said plural power transistors responding with terminal voltages of said Q-phase windings;

commanding means for producing a command signal which responds with said phase pulse signal of said phase detecting means; and switching operation means for causing at least one power transistor among said plural power transistors to perform high-frequency switching responding with said command signal;

and that said activation operation means causes each of said active periods of said plural power transistors to become larger than the period of 360/Q electrical degrees, said switching operation means produces a high-frequency switching pulse signal which responds with said command signal and switches said at least one power transistor responding with said switching pulse signal, and said phase detecting means includes:

slant producing means for producing a slant voltage signal at a terminal of a capacitor, said slant voltage signal responding intermittently with a voltage difference between one of the power supplying terminal voltages and the common terminal voltage of said Q-phase windings during sampling periods and having substantially a voltage slant during at least one of the rest periods except said sampling periods, and phase pulse producing means for producing said phase pulse signal responding with said slant voltage signal.

With this configuration, the switching operation means cause the power transistors of the power supplying means to perform high-frequency switching. Hence, the power losses of the power transistors of the power supplying means are reduced remarkably, and heat generation at the disk drive apparatus is reduced significantly. In addition, the activation operation means control the active periods of the power transistors responding with the terminal voltages of the windings and cause the rotor to rotate in a predetermined direction. Therefore, no position sensor is necessary, and the configuration of the disk drive apparatus is simplified. Furthermore, the active periods of the power transistors are set so as to be larger than the period of an electrical angle of 360/Q degrees, whereby two of the power transistors are activated simultaneously during the alteration of current paths. Hence, the alteration of the current paths becomes smooth, and the pulsation of the generated drive force becomes small, thereby reducing vibration and acoustic noise of the disk remarkably. Still further, the slant voltage signal at the terminal (or across the terminals) of the single capacitor intermittently responds with the voltage difference between one of the power supplying terminal voltages and the common terminal voltage of the Q-phase windings during the sampling periods. The slant voltage signal has the voltage slant during at least one of the rest periods other than the sampling periods. As a result, it is possible to produce accurately the slant voltage signal which nearly corresponds to the voltage difference between one of the power supplying terminal voltages and the common terminal voltage. The phase detecting means selects one of the power supplying terminal voltages responding with the operation state of the activation operation means, for example. Since the slant voltage signal intermittently responds with the voltage difference between one of the power supplying terminal voltages and the common terminal voltage, the slant producing means can produce the slant voltage signal having an accurate voltage slant across the terminals of the single capacitor. Since the phase pulse signal responds with the slant voltage signal, the phase pulse signal is free from the influence of the switching of the power transistors. Therefore the phase pulse signal changes at accurate timing. The commanding means produces the command signal responding with the rotational speed of the rotor by using the phase pulse signal. The switching operation means causes at least one of the power transistors to perform high-frequency switching responding with the command signal. Hence, the rotational speed of the disk can be controlled accurately, thereby improving reliability during recording and/or reproduction. As a result, a disk drive apparatus with low power consumption, low temperature increase, low disk vibration and low disk noise, suited for recording and/or reproduction on a high-density disk can be realized at low cost.

A disk drive apparatus in accordance with further aspect of the present invention comprises:

head means for at least reproducing a signal from a disk or recording a signal on said disk;

processing means for at least processing an output signal from said head means and outputting a reproduced signal, or processing a signal and outputting a recording signal into said head means;

a rotor, having a field part which generates field fluxes, for driving directly said disk;

Q-phase windings (Q is an integer of 3 or more);

voltage supplying means, including two output terminals, for supplying a DC voltage;

power supplying means having plural power transistors, said plural power transistors supplying said Q-phase windings with bi-directional currents from said voltage supplying means;

phase detecting means for producing a phase pulse signal which responds with terminal voltages of said Q-phase windings;

activation operation means for controlling active periods of said plural power transistors responding with terminal voltages of said Q-phase windings;

commanding means for producing a command signal which responds with said phase pulse signal of said phase detecting means; and switching operation means for causing at least one power transistor among said plural power transistors to perform high-frequency switching responding with said command signal;

and that said activation operation means causes each of said active periods of said plural power transistors to become larger than the period of 360/Q electrical degrees, said switching operation means produces a high-frequency switching pulse signal which responds with said command signal and switches said at least one power transistor responding with said switching pulse signal, and said phase detecting means includes:

slant producing means for producing a first voltage signal at a terminal of a first capacitor which intermittently responds with one of the power supplying terminal voltages of said Q-phase winding means, and producing a second voltage signal at a terminal of a second capacitor which intermittently responds with the common terminal voltage of said Q-phase windings during sampling periods and has substantially a voltage slant during at least one of the rest periods except said sampling periods, and phase pulse producing means for producing said phase pulse signal by comparing said first voltage signal with said second voltage signal.

With this configuration, the switching operation means cause the power transistors of the power supplying means to perform high-frequency switching. Hence, the power losses of the power transistors of the power supplying means are reduced remarkably, and heat generation at the disk drive apparatus is reduced significantly. In addition, the activation operation means control the active periods of the power transistors responding with the terminal voltages of the windings and cause the rotor to rotate in a predetermined direction. Therefore, no position sensor is necessary, and the configuration of the disk drive apparatus is simplified. Furthermore, the active periods of the power transistors are set so as to be larger than the period of an electrical angle of 360/Q degrees, whereby two of the power transistors are activated simultaneously during the alteration of current paths. Hence, the alteration of the current paths becomes smooth, and the pulsation of the generated drive force becomes small, thereby reducing vibration and acoustic noise of the disk remarkably. Still further, the first voltage signal intermittently responds with one of the power supplying terminal voltages of the Q-phase windings. The second voltage signal intermittently responds with the common terminal voltage of the Q-phase windings during the sampling periods and has the voltage slant during at least one of the rest periods other than the sampling periods. The phase detecting means selects one of the power supplying terminal voltages responding with the operation state of the activation operation means, for example. Since the second voltage signal having the voltage slant responds with the common terminal voltage, the second voltage signal has a relatively intermediate level. It is thus easy to add the accurate voltage slant to the second voltage signal. Since the phase pulse signal responds with the comparison result between the first voltage signal and the second voltage signal, the phase pulse signal is free from the influence of the switching of the power transistors. Therefore the phase pulse signal changes at accurate timing. The commanding means produces the command signal responding with the rotational speed of the rotor by using the phase pulse signal. The switching operation means causes at least one of the power transistors to perform high-frequency switching responding with the command signal. Hence, the rotational speed of the disk can be controlled accurately, thereby improving reliability during recording and/or reproduction. As a result, a disk drive apparatus with low power consumption, low temperature increase, low disk vibration and low disk noise, suited for recording and/or reproduction on a high-density disk, can be realized at low cost.

These and other configurations and operations will be described in detail in the explanations of embodiments.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

Preferred embodiments in accordance with the present invention will be described below referring to the accompanying drawings.

EMBODIMENT 1

Figure 1:
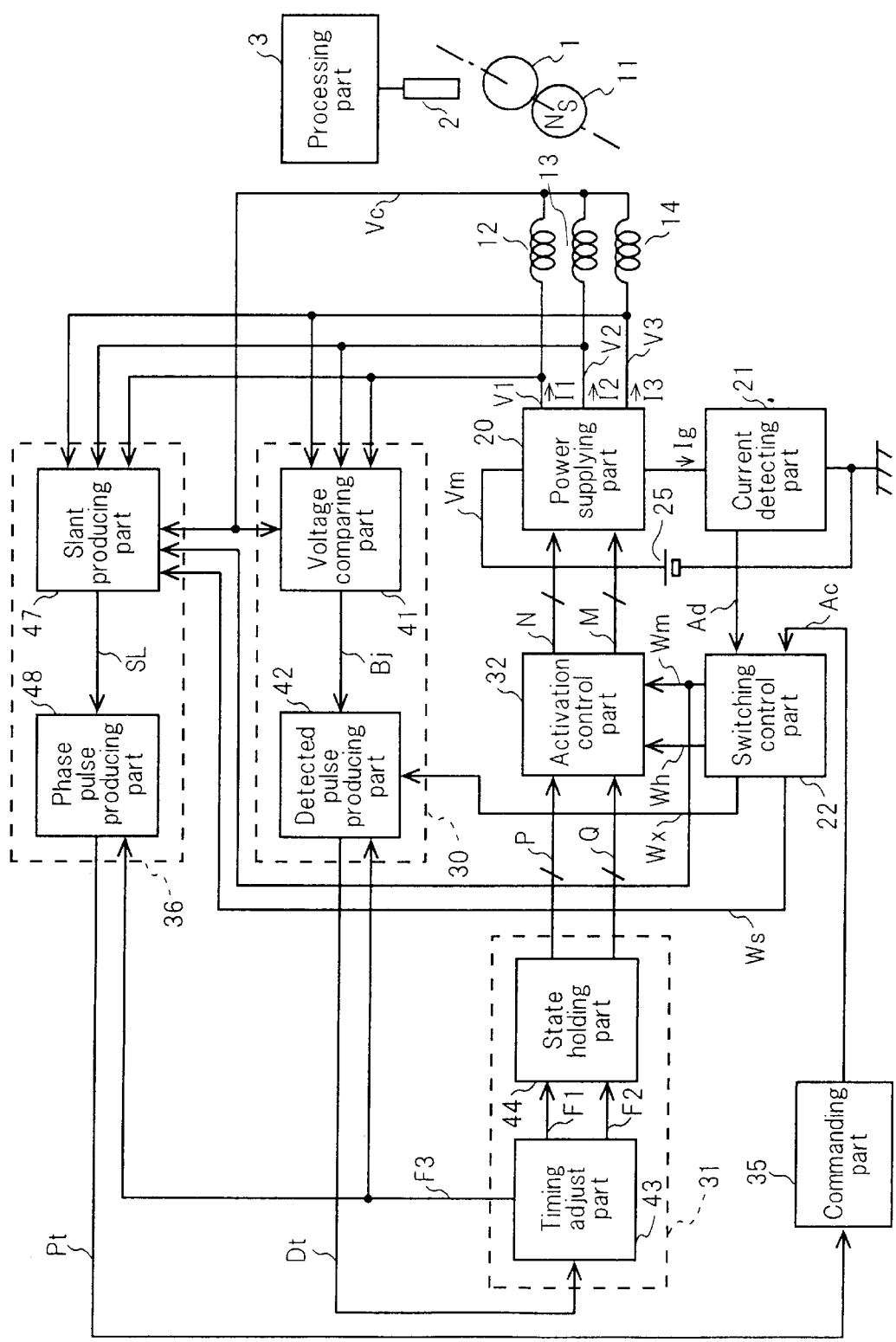
FIG. 1 is a block diagram showing the configuration of a motor and a disk drive apparatus in accordance with Embodiment 1 of the present invention.

FIG. 1 to FIG. 28 and FIG. 34 show configurations of a motor and a disk drive apparatus including the motor in accordance with Embodiment 1 of the present invention. FIG. 1 is a block diagram showing the configuration of the motor and the disk drive apparatus in accordance with Embodiment 1. A rotor 11 is provided with a field part which generates field fluxes from a number of magnetic poles. The field part of the rotor 11 is herein configured by a two-pole permanent magnet. Generally, it is possible to configure a field part which generates field fluxes from a number of magnetic poles, such as two, four and six poles, by a permanent magnet or permanent magnet blocks. Three-phase windings 12, 13 and 14 are disposed on a stator, each displaced from the others by an electrical angle of about 120 degrees with respect to the rotor 11. An electrical angle of 360 degrees corresponds to an angle width of one set of the N and S poles of the rotor 11. One terminal of each of the windings 12, 13 and 14 is connected commonly, and the other terminal is connected to an output terminal of a power supplying part 20. Three-phase drive current signals I1, I2 and I3 supplied to the three-phase windings 12, 13 and 14 generate three-phase magnetic fluxes, and a drive force is generated by the interaction between the field part of the rotor 11 and the three-phase drive current signals. A disk 1 is fixed to the rotor 11 and is directly rotated with the rotor 11.

Digital information signals (for example, high-quality audio and video signals) have been recorded on a disk 1. A head 2, such as an optical head or a magnetic head, reproduces information signals from the disk 1. A processing part 3 processes output signals from the head 2 and outputs reproduced information signals (for example, high-quality audio and video signals).

On the other hand, the disk 1 can record digital information signals. The head 2, such as an optical head or a magnetic head, records information signals on the disk 1. The processing part 3 processes input signals for recording (for example, high-quality audio and video signals) and supplies the signals to the head 2. The signals are recorded on the disk 1 by the head 2.

Figure 34:
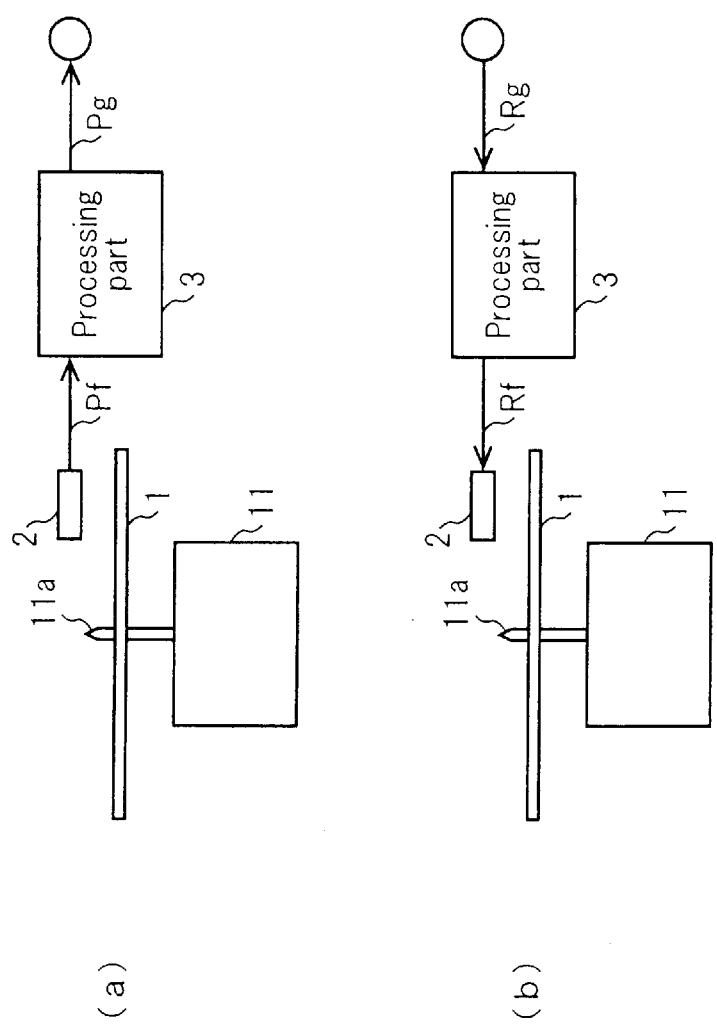
FIG. 34 is a block diagram relating to the information signal of a disk drive apparatus in accordance with Embodiment 1.
Figure 35:
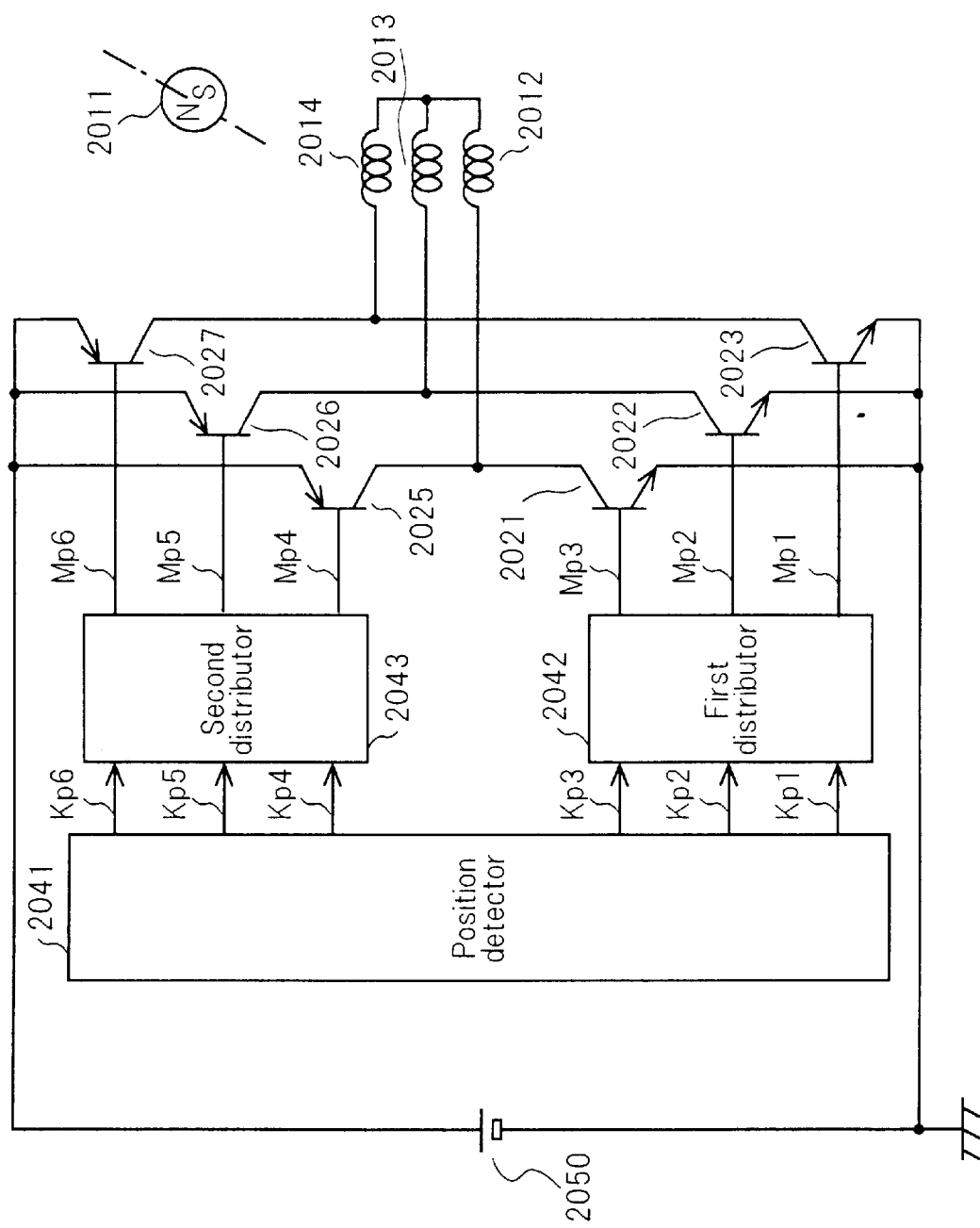
FIG. 35 is a block diagram showing the configuration of the motor for the conventional disk drive apparatus.

The part (a) of FIG. 34 shows an example of a disk drive apparatus for performing signal reproduction. The rotor 11 directly drives the disk 1. A digital information signal has been recorded on the disk 1 at high density. The head 2 reproduces the information signal on the rotating disk 1, thereby outputting a reproduced signal Pf. The processing part 3 digitally processes the reproduced signal Pf from the head 2 and outputs a reproduced information signal Pg. The stator and windings are not shown in the figure.

The part (b) of FIG. 34 shows an example of a disk drive apparatus for performing signal recording. The rotor 11 directly drives the disk 1. The disk 1 is a recordable disk and can be recorded digital information signals at high density. The processing part 3 digitally processes an input record information signal Rg, and outputs a recording signal Rf to the head 2. The head 2 records the recording signal Rf on the rotating disk 1 at high density, whereby a new information signal is formed on the disk 1.

The head 2 can be a head specifically for reproduction, a head for both recording and reproduction or a head specifically for recording, depending on the circumstances.

Figure 2:
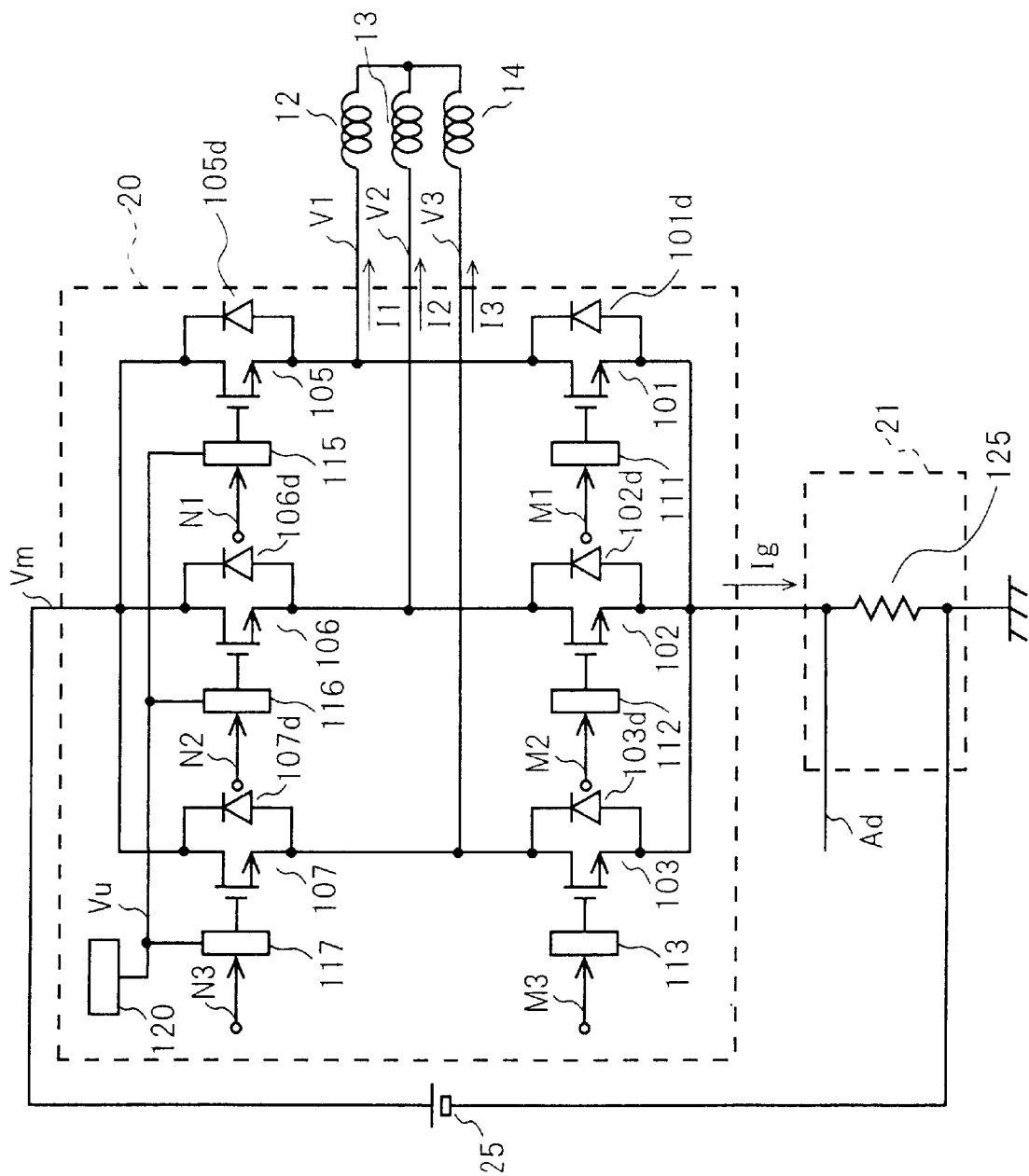
FIG. 2 is a circuit diagram showing a power supplying part 20 and a current detecting part 21 in accordance with Embodiment 1.

The power supplying part 20 shown in FIG. 1 forms current paths from a voltage supplying part 25 to the three-phase windings 12, 13 and 14 responding with the low-side activation control signals M1, M2 and M3 and the high-side activation control signals N1, N2 and N3 of an activation control part 32. Hence, the power supplying part 20 supplies power to the three-phase windings 12, 13 and 14. FIG. 2 shows a configuration of the power supplying part 20.

The power supplying part 20 shown in FIG. 2 comprises three low-side power transistors 101, 102 and 103, each of which forms a power supplying path (a current path) between the negative terminal side (the ground terminal side) of the voltage supplying part 25 and each of the power supply terminals of the three-phase windings 12, 13 and 14. The power supplying part 20 further comprises three high-side power transistors 105, 106 and 107, each of which forms a power supply path (a current path) between the positive output terminal side (Vm side) of the voltage supplying part 25 and each of the power supplying terminals of the windings 12, 13 and 14. High-side power diodes 105d, 106d and 107d are connected reversely in parallel with the high-side power transistors 105, 106 and 107, respectively. Low-side power diodes 101d, 102d and 103d are also connected reversely in parallel with the low-side power transistors 101, 102 and 103, respectively. Each of the low-side power transistors 101, 102 and 103 is an NMOS-FET power transistor, which has a parasitic diode, formed by the reverse connections in the direction from the current flowing-out terminal to the current flowing-in terminal thereof. The parasitic diodes of the low-side FET power transistors 101, 102 and 103 are used as the low-side power diodes 101d, 102d and 103d, respectively. Each of the high-side power transistors 105, 106 and 107 is an NMOS-FET power transistor, which has a parasitic diode, formed by the reverse connections in the direction from the current flowing-out terminal to the current flowing-in terminal thereof. The parasitic diodes of the high-side FET power transistors 105, 106 and 107 are used as the high-side power diodes 105d, 106d and 107d, respectively.

The high-side power transistors and the lowside power transistors for Embodiment 1 are not limited to FET transistors. Other types of transistors, such as IGBT transistors or bipolar transistors, can be used. In addition, the high-side power transistors and the lowside power transistors are not limited to FET transistors having the same polarity. FET transistors having different polarities can be used. For example, PMOS-FET power transistors can be used for the high-side power transistors, and NMOS-FET power transistors can be used for the low-side power transistors.

The low-side operation circuits 111, 112 and 113 of the power supplying part 20 turn ON/OFF the low-side power transistors 101, 102 and 103 responding with the low-side activation control signals M1, M2 and M3, respectively. The low-side power transistors 101, 102 and 103 form current paths for supplying the negative parts of the three-phase drive current signals I1, I2 and I3 to the three-phase windings 12, 13 and 14. The low-side activation control signals M1, M2 and M3 are digital PWM signals (pulse width modulation signals) in the active periods corresponding thereto. The low-side power transistors 101, 102 and 103 perform ON-OFF high-frequency switching. For example, when the low-side power transistor 101 is ON, the power supplying terminal voltage V1 of the winding 12 becomes 0 V or nearly 0 V, and the negative part of the drive current signal I1 is supplied to the winding 12. When the low-side power transistor 101 turns OFF, the high-side power diode 105d (or the high-side power transistor 105) turns ON because of the inductive reaction by virtue of the inductance of the winding 12. Although the power supplying terminal voltage V1 of the winding 12 becomes Vm or nearly Vm, the negative part of the drive current signal I1 is continuously supplied to the winding 12 through the high-side power diodes 105d (or the high-side power transistors 105). Hence, the power supplying terminal voltage V1 of the winding 12 becomes a PWM voltage, the level of which digitally changes between nearly 0 V and nearly Vm. In this way, the power supplying terminal voltages V1, V2 and V3 of the windings 12, 13 and 14 become PWM drive voltages in the respective active periods of the low-side power transistors 101, 102 and 103.

The high-side operation circuits 115, 116 and 117 of the power supplying part 20 turn ON/OFF the high-side power transistors 105, 106 and 107 responding with the high-side activation control signals N1, N2 and N3, respectively. Usually, the high-side power transistors 105, 106 and 107 form current paths for supplying the positive parts of the three-phase drive current signals I1, I2 and I3 to the three-phase windings 12, 13 and 14 responding with the high-side activation control signals N1, N2 and N3.

A high voltage output circuit 120 produces a high potential Vu higher than the positive potential Vm of the power supplying part 20 by a predetermined value. Hence, the high-side operation circuits 115, 116 and 117 can apply the high potential Vu to the activation control terminals of the high-side power transistors 105, 106 and 106, whereby the NMOS-FET power transistors can be fully turned ON.

Each of the high-side power transistors can execute complementary OFF-ON high-frequency switching in phase with each of the low-side power transistors performing ON-OFF high-frequency switching, and then the power loss of the high-side power diodes can be reduced remarkably.

A current detecting part 21 includes a current detecting resistor 125 and outputs a current detection signal Ad proportional to a composed supply current Ig from the voltage supplying part 25 to the three-phase windings 12, 13 and 14 via the three low-side power transistors 101, 102 and 103.

Figure 3:
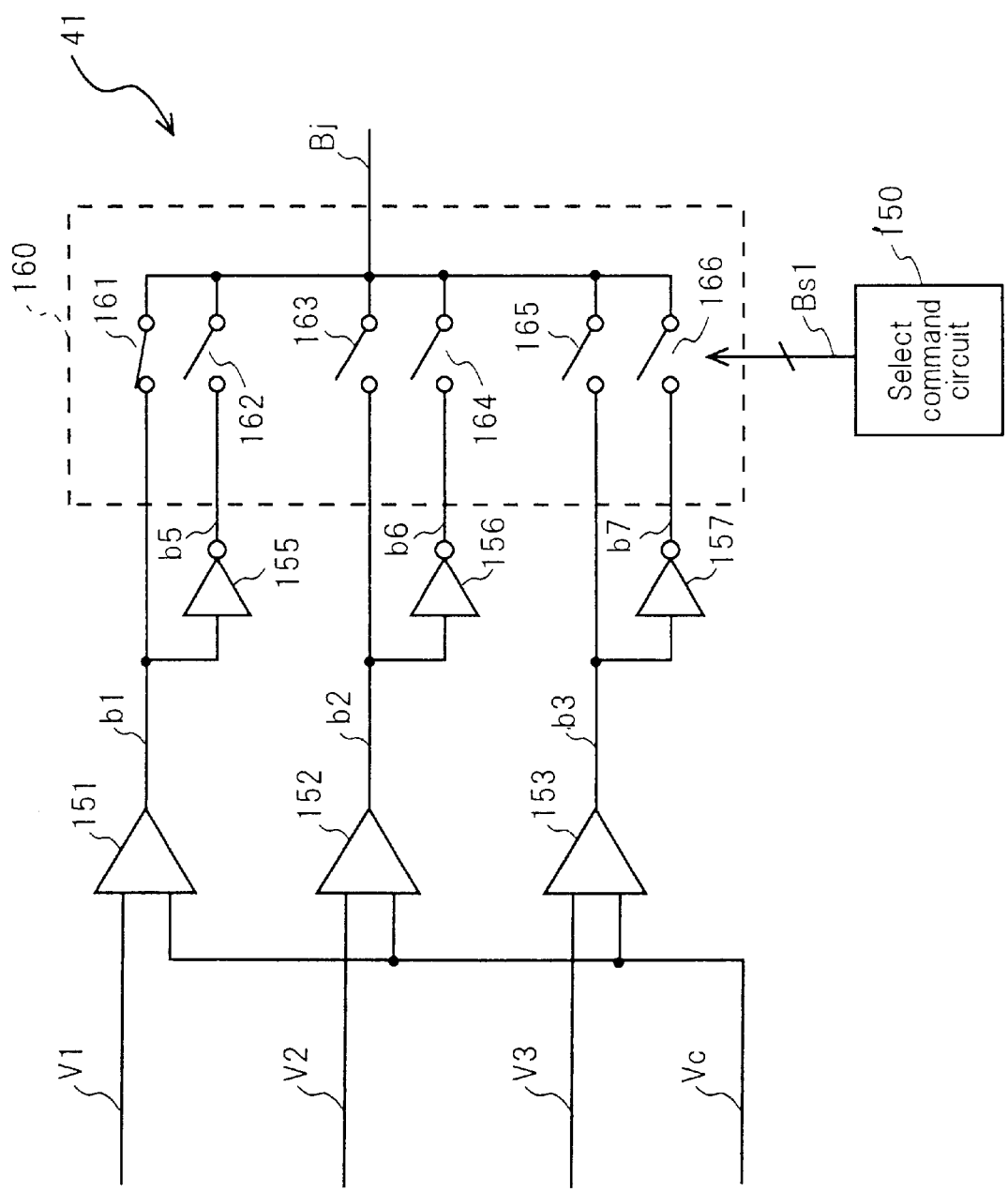
FIG. 3 is a circuit diagram showing the voltage comparing part 41 of a voltage detecting part 30 in accordance with Embodiment 1.
Figure 4:
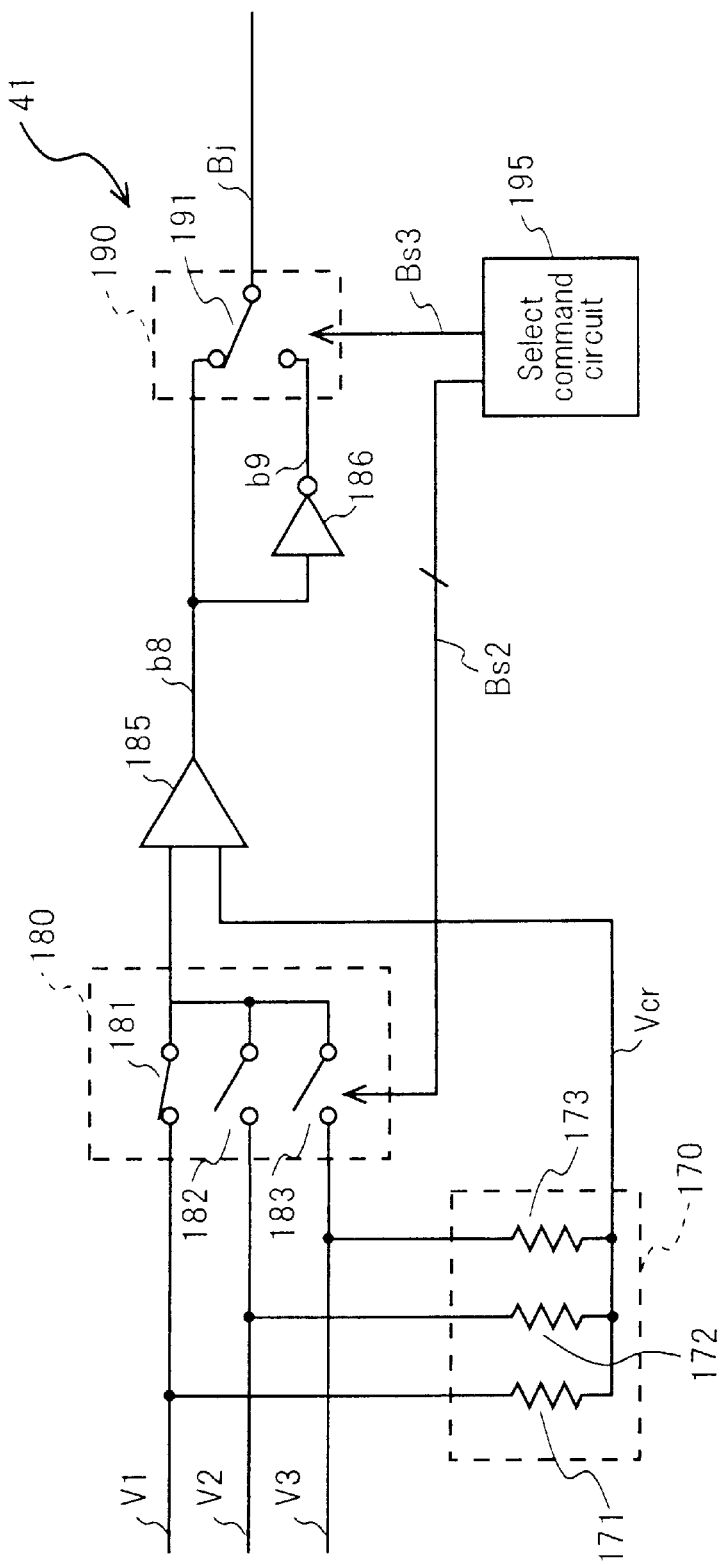
FIG. 4 is a circuit diagram showing another configuration of the voltage comparing part 41 of the voltage detecting part 30 in accordance with Embodiment 1.
Figure 5:
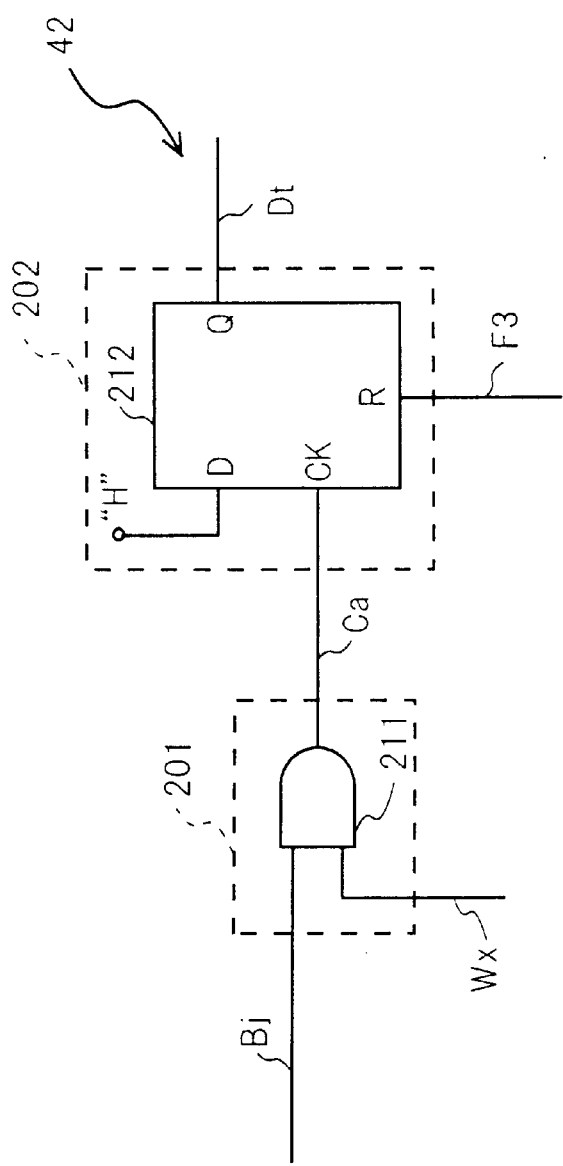
FIG. 5 is a circuit diagram showing the detected pulse producing part 42 of the voltage detecting part 30 in accordance with Embodiment 1.

A voltage detecting part 30 shown in FIG. 1 includes a voltage comparing part 41 and a detected pulse producing part 42. The voltage comparing part 41 receives the three-phase power supplying terminal voltages V1, V2 and V3 of the three-phase windings 12, 13 and 14 (and the common terminal voltage Vc of the three-phase windings 12, 13 and 14). Furthermore, the voltage comparing part 41 selectively compares the three-phase power supplying terminal voltages with the common terminal voltage substantially, and outputs a selected compared signal Bj responding with the comparison result. A detected pulse producing part 42 outputs a detected pulse signal Dt which is obtained by eliminating high-frequency switching noise included in the selected compared signal Bj. FIG. 3 and FIG. 4 show configurations of the voltage comparing part 41. FIG. 5 shows a configuration of the detected pulse producing part 42.

In FIG. 3, the three comparator circuits 151, 152 and 153 of the voltage comparing part 41 compare the three-phase power supplying terminal voltages V1, V2 and V3 with the common terminal voltage Vc, respectively. The three comparator circuits 151, 152 and 153 output three-phase compared pulse signals b1, b2 and b3 responding with the result of the comparison, respectively. Inverter circuits 155, 156 and 157 output pulse signals b5, b6 and b7 by inverting the compared pulse signals b1, b2 and b3, respectively. The switch circuits 161, 162, 163, 164, 165 and 166 of a signal selecting circuit 160 select one of the pulse signals b1, b2, b3, b5, b6 and b7 responding with the select command signal Bs1 of a select command circuit 150. The signal selecting circuit 160 outputs the selected signal as the selected compared signal Bj. The select command circuit 150 outputs the select command signal Bs1 responding with the holding state of a state shifting part 31, which will be described later. Therefore, the voltage comparing part 41 outputs the selected compared signal Bj which is obtained by substantially comparing one of the power supplying terminal voltages with the common terminal voltage responding with the activation state of the three-phase windings 12, 13 and 14.

FIG. 4 shows another configuration of the voltage comparing part 41. A voltage composing circuit 170 shown in FIG. 4 produces a composed common terminal voltage Vcr which is obtained by composing the three-phase power supplying terminal voltages V1, V2 and V3 with resistors 171, 172 and 173. The switch circuits 181, 182 and 183 of a first signal selecting circuit 180 select one of the three-phase power supplying terminal voltages V1, V2 and V3 responding with the first selected command signal Bs2 of the select command circuit 195. The first signal selecting circuit 180 outputs the selected power supplying voltage to a comparator circuit 185. The comparator circuit 185 compares the selected power supplying terminal voltage with the composed common terminal voltage Vcr and outputs a compared pulse signal b8. An inverter circuit 186 outputs a pulse signal b9 by inverting the compared pulse signal b8. The switch circuit 191 of a second signal selecting circuit 190 selects one of the pulse signals b8 and b9 responding with the second selected command signal Bs3 of the select command circuit 195, and outputs the selected signal as the selected compared signal Bj. A select command circuit 195 outputs the first selected command signal Bs2 and the second selected command signal Bs3 responding with the holding state of the state shifting part 31, which will be described later. Therefore, the voltage comparing part 41 outputs the selected compared signal Bj which is obtained by substantially comparing one of the power supplying terminal voltages with the common terminal voltage responding with the activation state of the three-phase windings 12, 13 and 14.

The noise eliminating circuit 201 of a detected pulse producing part 42 shown in FIG. 5 eliminates switching noises which are included in the selected compared signal Bj owing to the high-frequency switching of the power supplying part 20. As a result, noise pulses responding with the switching do not occur in the output signal Ca of the noise eliminating circuit 201. The noise eliminating circuit 201 comprises an AND circuit 211, for example, and logically composes the selected compared signal Bj and the noise eliminating signal Wx of a switching control part 22, which will be described later. In other words, the noise eliminating signal Wx of the switching control part 22 logically gates the output signal Bj of the voltage comparing part 41. Hence, the output signal Ca of the noise eliminating circuit 201 becomes irrelevant to the selected compared signal Bj when the noise eliminating signal Wx is "L" (in a low potential state). When the noise eliminating signal Wx is "H" (in a high potential state), the level of the selected compared signal Bj is output directly. As a result, switching noise pulses, occurred in the selected compared signal Bj by the high-frequency switching of the power supplying part 20, are eliminated. Hence, the output signal Ca of the noise eliminating circuit 201 becomes an accurate pulse signal responding with the comparison result between one of the power supplying terminal voltages and the common terminal voltage.

A pulse producing circuit 202 changes the detected pulse signal Dt to "H" at the arrival of the rising edge of the output signal Ca of the noise eliminating circuit 201. The pulse producing circuit 202 is formed of a D-type flip-flop 212, for example. An "H" level signal is input to the data terminal of the flip-flop 212, the output signal Ca of the noise eliminating circuit 201 is input to the clock terminal of the flip-flop 212, and a third timing adjust signal F3 of the state shifting part 31 is input to the reset terminal of the flip-flop 212. As a result, the detected pulse signal Dt changes to "H" at the rising edge of the output signal Ca of the noise eliminating circuit 201, and then the state of the flip-flop 212 is held. The state shifting part 31, which will be described later, produces the third timing adjust signal F3 after a required time from the rising time of the detected pulse signal Dt, thereby resetting the state of the D-type flip-flop 212. Hence, the detected pulse signal Dt changes to "H" responding with the rising edge of the selected compared signal Bj from which noise pulses are eliminated. The state of the detected pulse signal Dt is held until the arrival of the next third timing adjust signal F3.

Figure 6:
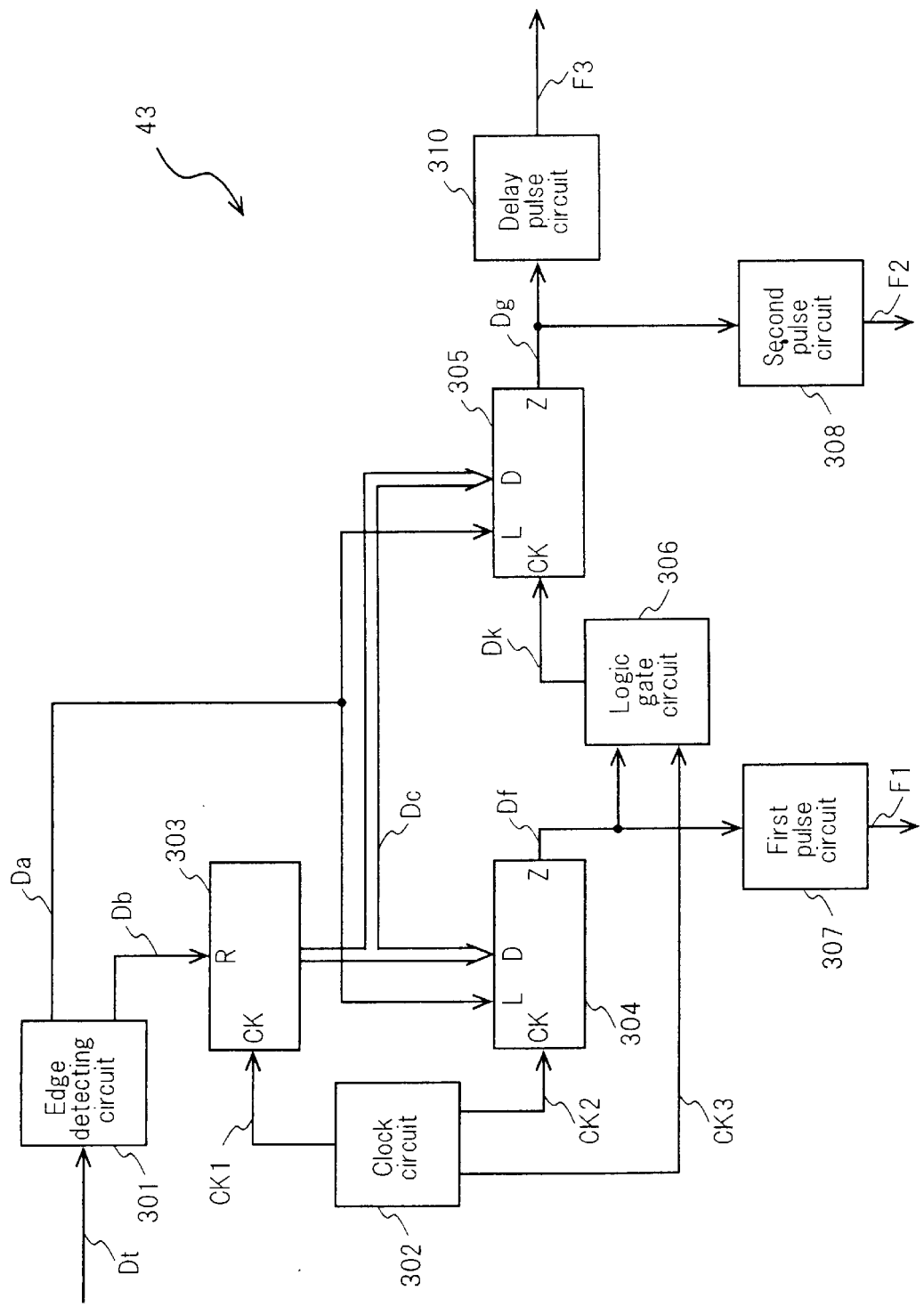
FIG. 6 is a circuit diagram showing the timing adjusting part 43 of a state shifting part 31 in accordance with Embodiment 1.
Figure 7:
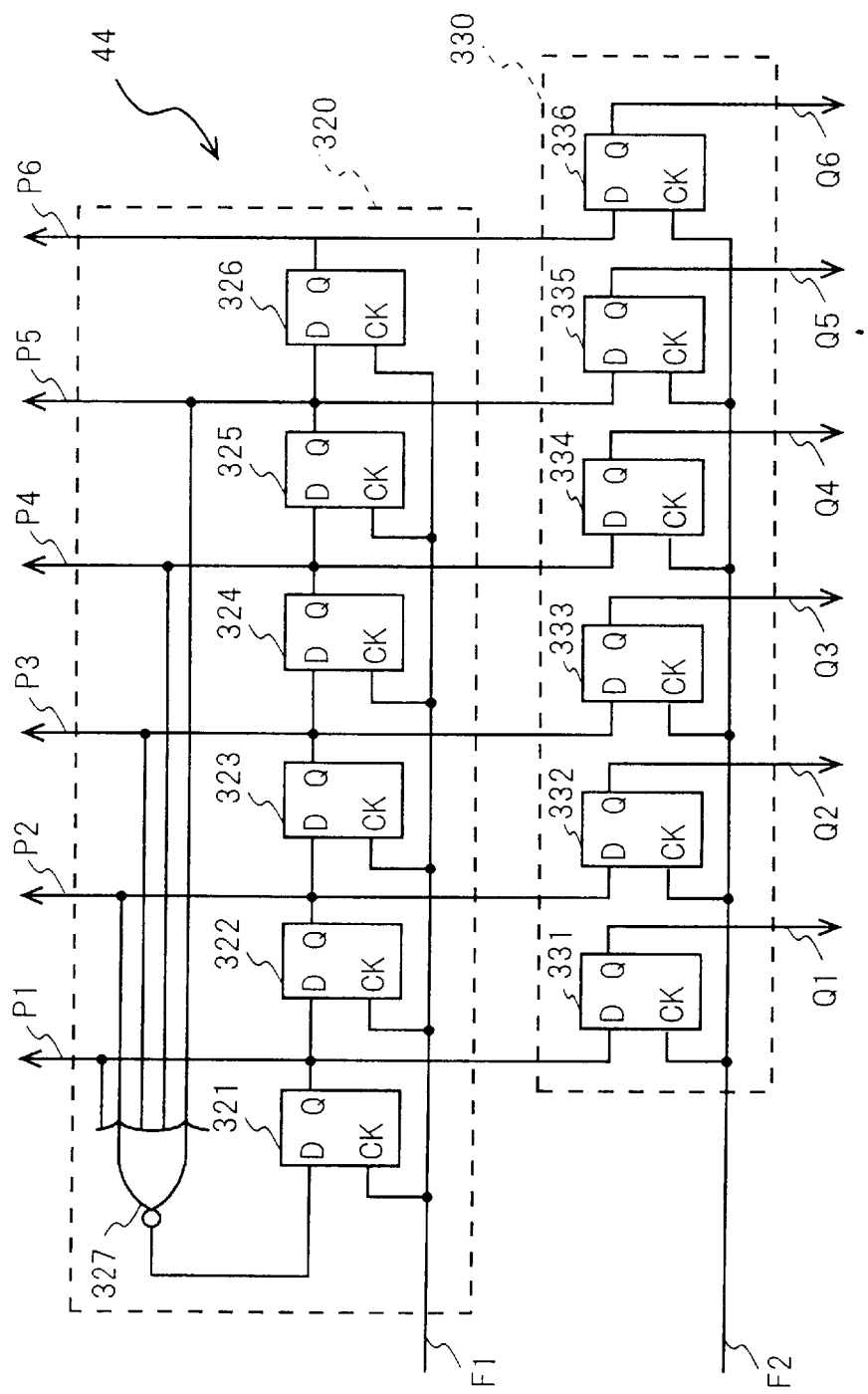
FIG. 7 is a circuit diagram showing the state holding part 44 of the state shifting part 31 in accordance with Embodiment 1.

The state shifting part 31 and the activation control part 32 shown in FIG. 1 form an activation operation block which controls activation to the three-phase windings 12, 13 and 14 responding with the terminal voltages of the three-phase windings 12, 13 and 14. The state shifting part 31 includes a timing adjusting part 43 and a state holding part 44. The timing adjusting part 43 produces a first timing adjust signal F1, a second timing adjust signal F2 and the third timing adjust signal F3 responding with the rising edge of the detected pulse signal Dt of the voltage detecting part 30. The first timing adjust signal F1 is a delayed pulse signal by a first adjust time T1 from the rising edge of the detected pulse signal Dt, the second timing adjust signal F2 is a delayed pulse signal by a second adjust time T2 from the rising edge of the detected pulse signal Dt, and the third timing adjust signal F3 is a delayed pulse signal by a third adjust time T3 from the rising edge of the detected pulse signal Dt, where the relation of T1<T2<T3 is maintained. The state holding part 44 changes its holding state responding with the first timing adjust signal F1 and the second timing adjust signal F2, and outputs first state signals P1 to P6 and second state signals Q1 to Q6 corresponding to the holding state. FIG. 6 shows a configuration of the timing adjusting part 43, and FIG. 7 shows a configuration of the state holding part 44.

The edge detecting circuit 301 of the timing adjusting part 43 shown in FIG. 6 produces a first differential pulse signal Da and a second differential pulse signal Db at the rising edge of the detected pulse signal Dt. The second differential pulse signal Db is output immediately after the first differential pulse signal Da. The first differential pulse signal Da transfers a value of a first count circuit 303 to a second count circuit 304 and a third count circuit 305. The transferred value from the first count circuit 303 to the second count circuit 304 and the third count circuit 305 corresponds to one period of the detected pulse signal Dt. Then, the first count circuit 303 is reset to zero or a predetermined value at the edge of the second differential pulse signal Db.

A clock circuit 302 outputs a first clock signal CK1, a second clock signal CK2 and a third clock signal CK3. The first count circuit 303 receives the first clock signal CK1 and performs counting up to increment its measured data at each arrival of the pulses of the first clock signal CK1. When the measured data reaches a predetermined value, the first count circuit 303 stops further counting up, and holds the value. The second count circuit 304 receives the second clock signal CK2 and performs counting down to decrement its measured data at each arrival of the pulses of the second clock signal CK2. When the measured data reaches zero or a predetermined value, the second count circuit 304 stops further counting down, and outputs a first zero pulse signal Df. A first pulse circuit 307 differentiates the first zero pulse signal Df and outputs the first timing adjust signal F1. A logic gate circuit 306 holds its output clock signal Dk at "L" before the generation of the first zero pulse signal Df. After the generation of the first zero pulse signal Df, the logic gate circuit 306 outputs the third clock signal CK3 as the output clock signal Dk to the third count circuit 305. When the output clock signal Dk is input, the third count circuit 305 performs counting down to decrement its measured data at each arrival of the pulses of the output clock signal Dk. When the measured data reaches zero or a predetermined value, the third count circuit 305 stops further counting down, and outputs a second zero pulse signal Dg. A second pulse circuit 308 differentiates the second zero pulse signal Dg and outputs the second timing adjust signal F2. A delay pulse circuit 310 produces a differentiate delayed signal as the third timing adjust signal F3 which is delayed by a predetermined time from the generation timing of the second zero pulse signal Dg. The configuration of the delay pulse circuit 310 can be similar to a pair of the third count circuit 305 and the second pulse circuit 308.

Figure 15:
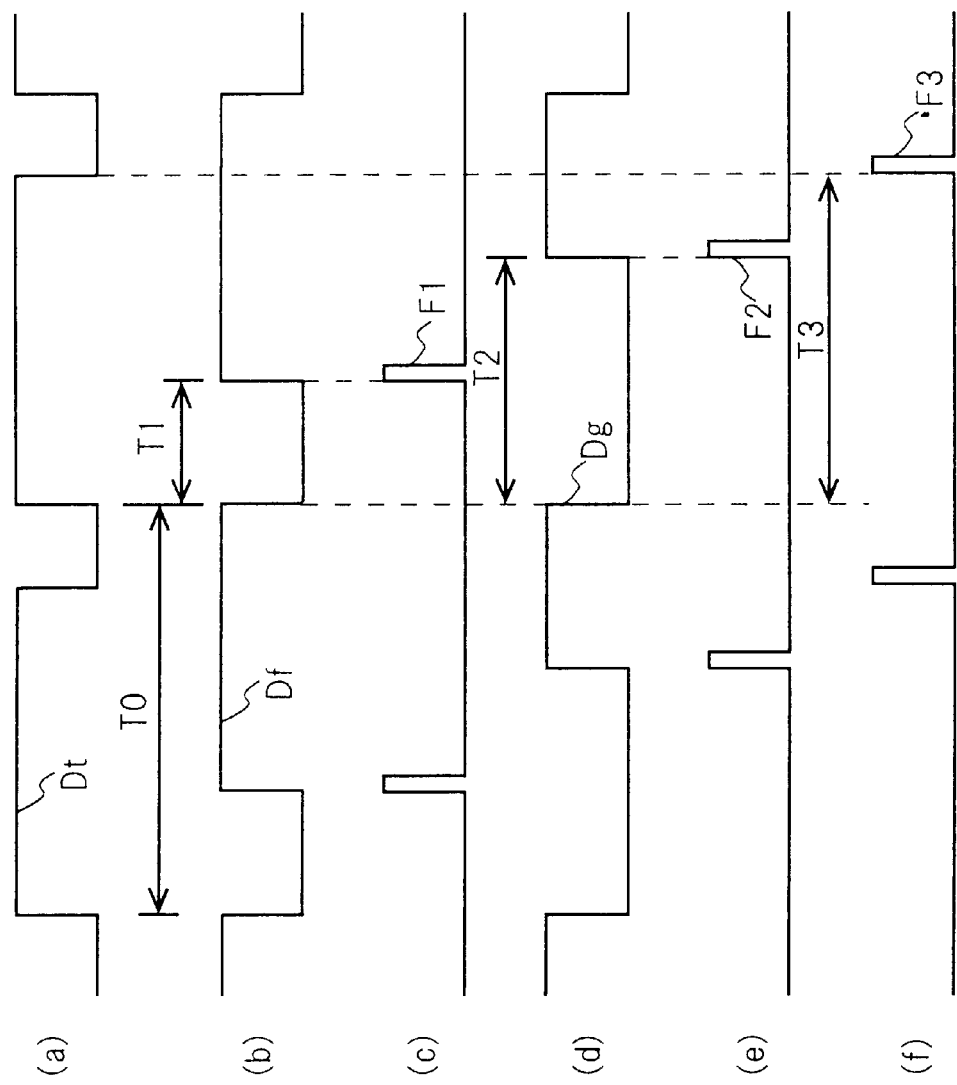
FIG. 15 is a waveform diagram illustrating the operation of the timing adjusting part 43 of the state shifting part 31 in accordance with Embodiment 1.

FIG. 15 shows the relationship among the waveforms of these signals (the abscissa of FIG. 15 represents time). The first count circuit 303 counts a value corresponding to a time interval T0 between the rising edges of the detected pulse signal Dt (see the part (a) of FIG. 15). The second count circuit 304 outputs the first zero pulse signal Df delayed by a first adjust time T1 (T1<T0) (see the part (b) of FIG. 15) proportional to the time interval T0. As a result, the first timing adjust signal F1 becomes a pulse signal delayed by the first adjust time T1 substantially proportional to the time interval T0 from the rising edge of the detected pulse signal Dt (see the part (c) of FIG. 15). The third count circuit 305 outputs the second zero pulse signal Dg delayed by a predetermined time proportional to the time interval T0 after the rising edge of the first zero pulse signal Df (see the part (d) of FIG. 15). As a result, the second timing adjust signal F2 becomes a pulse signal delayed by the second adjust time T2 (T1<T2<T0) substantially proportional to the time interval T0 from the generation of the rising edge of the detected pulse signal Dt (see the part (e) of FIG. 15). In a similar way, the delay pulse circuit 310 outputs the third timing adjust signal F3 delayed by a predetermined time from the generation of the rising edge of the second zero pulse signal Dg (see the part (f) of FIG. 15). As aresult, the third timing adjust signal F3 becomes a pulse signal delayed by the third adjust time T3 (T2<T3<T0) substantially proportional to the time interval T0 from the generation of the rising edge of the detected pulse signal Dt. The pulse producing circuit 202 of the detected pulse producing part 42 resets the detected pulse signal Dt at the generation of the third timing adjust signal F3 (see the part (a) of FIG. 15).

The state holding part 44 shown in FIG. 7 comprises a first state holding circuit 320 and a second state holding circuit 330. The first state holding circuit 320 includes six D-type flip-flops 321, 322, 323, 324, 325 and 326. One of the six D-type flip-flops 321, 322, 323, 324, 325 and 326 become "H," and the other flip-flops become "L." At the rising edge of the first timing adjust signal F1, the states of the flip-flops 321, 322, 323, 324, 325 and 326 are shifted, whereby the "H" state is shifted cyclically just as in the case of a ring counter. The first state holding circuit 320 outputs the internal states of the six flip-flops 321, 322, 323, 324, 325 and 326 as first state signals P1, P2, P3, P4, P5 and P6, respectively. The second state holding circuit 330 comprises six D-type flip-flops 331, 332, 333, 334, 335 and 336. The first state signals P1, P2, P3, P4, P5 and P6 are input to the data input terminals of the flip-flops 331, 332, 333, 334, 335 and 336, respectively. At the rising edge of the second timing adjust signal F2, the flip-flops 331, 332, 333, 334, 335 and 336 receive the first state signals P1, P2, P3, P4, P5 and P6, thereby changing their outputs. The second state holding circuit 330 outputs the internal states of the six flip-flops 331, 332, 333, 334, 335 and 336 as second state signals Q1, Q2, Q3, Q4, Q5 and Q6, respectively. The holding state of the state holding part 44 means the composite state of P1 to P6 and Q1 to Q6.

As described above, the holding state of the state holding part 44 is shifted from a first holding state to a second holding state at the arrival of the first timing adjust signal F1. The holding state further is shifted from the second holding state to a third holding state at the arrival of the second timing adjust signal F2. Twelve holding states in total are shifted in sequence.

Figure 8:
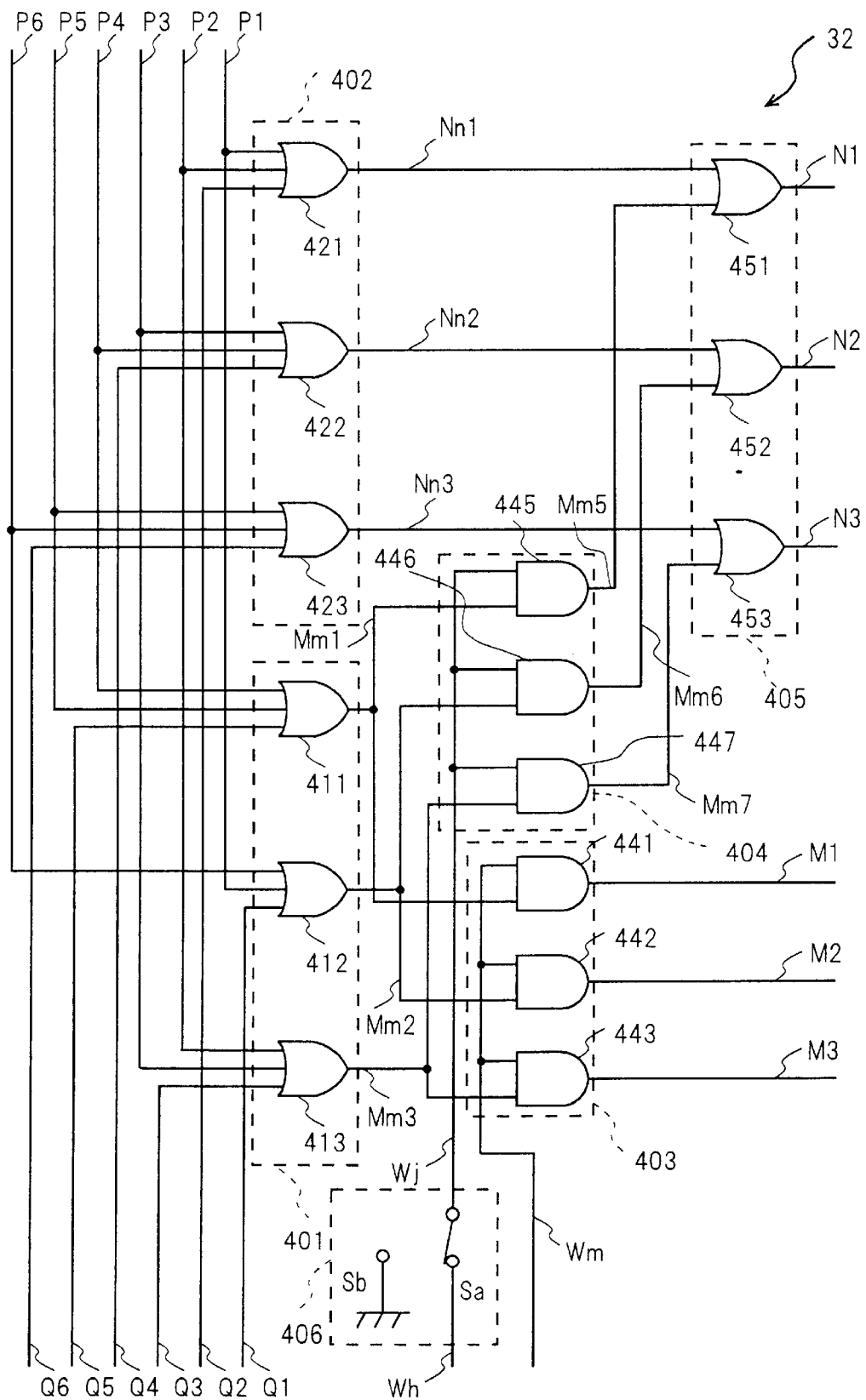
FIG. 8 is a circuit diagram showing an activation control part 32 in accordance with Embodiment 1.

The activation control part 32 shown in FIG. 1 outputs the three-phase low-side activation control signals M1, M2 and M3 and the three-phase high-side activation control signals N1, N2 and N3 responding with the holding state of the state holding part 44 (the first state signals P1 to P6 and the second state signals Q1 to Q2). Hence, the periods of activation to the three-phase windings 12, 13 and 14 are determined by the first state signals and the second state signals. Furthermore, the activation control part 32 converts the low-side activation control signals M1, M2 and M3 and the high-side activation control signals N1, N2 and N3 into PWM pulse signals responding with the main PWM pulse signal Wm and the auxiliary PWM pulse signal Wh of the switching control part 22. FIG. 8 shows a configuration of the activation control part 32.

The first selecting circuit 401 of the activation control part 32 shown in FIG. 8 produces first selecting signals Mm1, Mm2 and Mm3 by using the first state signals P1 to P6 and the second state signals Q1 to Q2 of the state shifting part 31. The periods during which the three-phase first selecting signals Mm1, Mm2 and Mm3 become "H" correspond to the active periods of the three low-side power transistors 101, 102 and 103 of the power supplying part 20. The periods also correspond to active periods during which the negative parts of the drive current signals I1, I2 and I3 flow to the three-phase windings 12, 13 and 14, respectively. A second selecting circuit 402 produces second selecting signals Nn1, Nn2 and Nn3 by using the first state signals P1 to P6 and the second state signals Q1 to Q6 of the state shifting part 31. The periods during which the second selecting signals Nn1, Nn2 and Nn3 become "H" correspond to the active periods of the high-side power transistors 105, 106 and 107 of the power supplying part 20. The periods also correspond to active periods during which the positive parts of the drive current signals I1, I2 and I3 flow to the three-phase windings 12, 13 and 14, respectively.

A first pulse composing circuit 403 logically composes the main PWM pulse signal Wm of the switching control part 22 with the first selecting signals Mm1, Mm2 and Mm3. The first pulse composing circuit 403 outputs the low-side activation control signals M1, M2 and M3, each of which is obtained by converting the active period part of each of the first selecting signals Mm1, Mm2 and Mm3 into pulses responding with the main PWM pulse signal Wm, respectively. A second pulse composing circuit 404 logically composes a high-side auxiliary signal Wj with the first selecting signals Mm1, Mm2 and Mm3, and outputs auxiliary activation control signals Mm5, Mm6 and Mm7. When a switch circuit 461 of a auxiliary selecting circuit 406 is connected to its contact Sa, the high-side auxiliary signal Wj becomes coincident with the auxiliary PWM pulse signal Wh. The second pulse composing circuit 404 outputs the auxiliary activation control signals Mm5, Mm6 and Mm7, each of which is obtained by converting the "H" period part of the first selecting signals Mm1, Mm2 and Mm3 into pulses responding with the auxiliary PWM pulse signal Wh. When the switch circuit 461 of the auxiliary selecting circuit 406 is connected to its contact Sb, the high-side auxiliary signal Wj becomes "L," and the auxiliary activation control signals Mm5, Mm6 and Mm7 of the second pulse composing circuit 404 become "L." A third pulse composing circuit 405 includes OR circuits 451, 452 and 453, each of which executes logical OR operation of each of the second selecting signals Nn1, Nn2 and Nn3 and each of the auxiliary activation control signals Mm5, Mm6 and Mm7. The third pulse composing circuit 405 outputs the high-side activation control signals N1, N2 and N3 from the OR circuits 451, 452 and 453.

Figure 16:
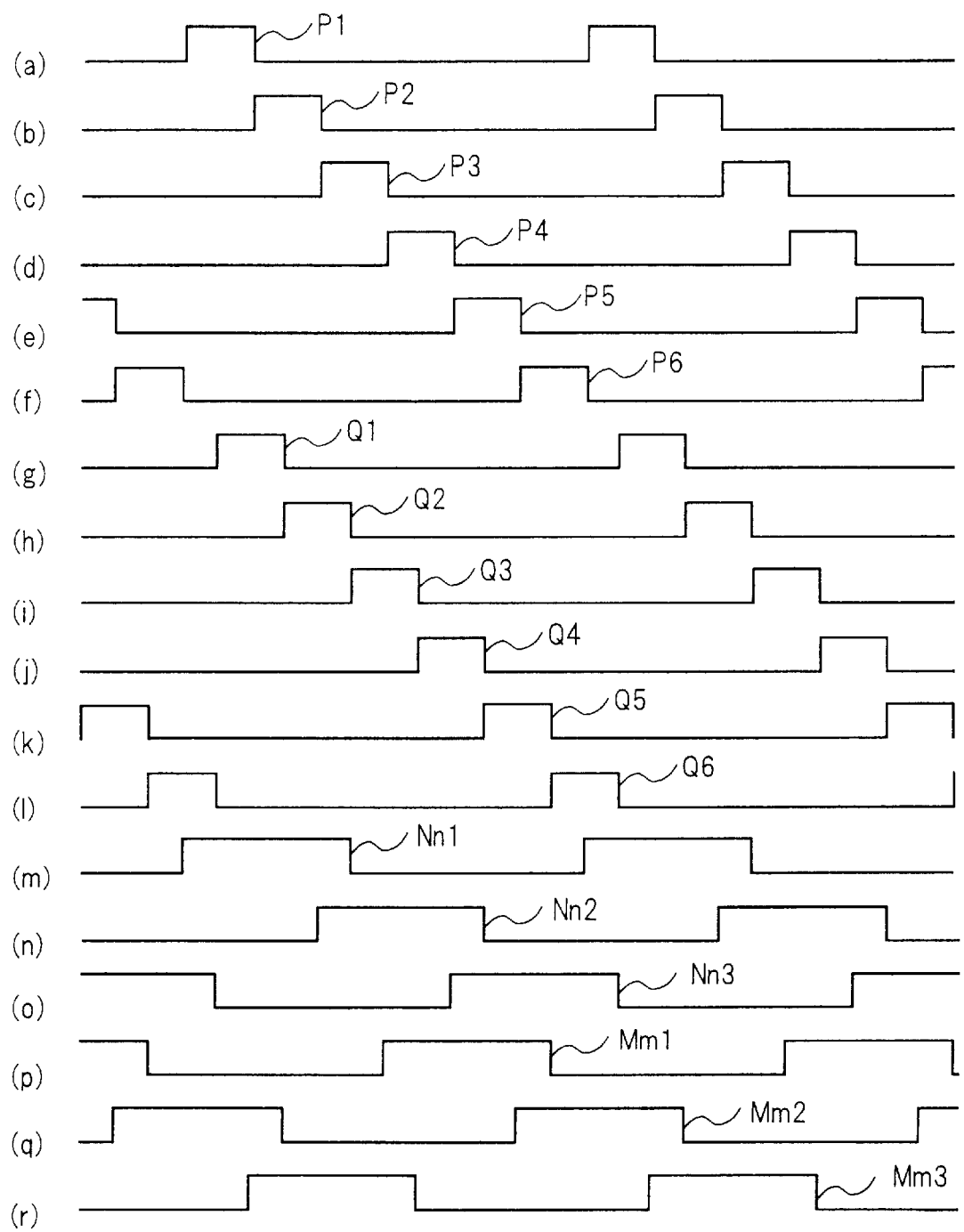
FIG. 16 is a waveform diagram illustrating the operations of the state holding part 44 of the state shifting part 31 and the first selecting circuit 401 and the second selecting circuit 402 of the activation control part 32 in accordance with Embodiment 1.

FIG. 16 shows the relationship among the first selecting signals Mm1, Mm2 and Mm3, the second selecting signals Nn1, Nn2 and Nn3, the first state signals P1 to P6 and the second state signals Q1 to Q6. In FIG. 16, the abscissa represents time. The first state signals P1 to P6 are six-phase signals. One of the signals, which becomes "H," is shifted at each generation of the first timing adjust signal F1 (see the parts (a) to (f) of FIG. 16). The second state signals Q1 to Q6 are six-phase signals. One of the signals, which becomes "H," is shifted at each generation of the second timing adjust signal F2 (see the parts (g) to (l) of FIG. 16). Each of the first selecting signals Mm1, Mm2 and Mm3 is produced by logically composing two of the first state signals P1 to P6 with at least one of the second state signals Q1 to Q6. The first selecting signals Mm1, Mm2 and Mm3 are set as three-phase signals, each having an "H" period larger than the period of an electrical angle of (360/3) degrees (see the parts (p) to (r) of FIG. 16). More specifically, the first selecting signals Mm1, Mm2 and Mm3 are set as three-phase signals, each having an "H" period of about 140 degrees. An electrical angle of 360 degrees herein corresponds to the angle for one set of the N and S magnetic poles of the rotor. In a similar way, each of the second selecting signals Nn1, Nn2 and Nn3 is produced by logically composing two of the first state signals P1 to P6 with at least one of the second state signals Q1 to Q6. The second selecting signals Nn1, Nn2 and Nn3 are set as three-phase signals, each having an "H" period larger than the period of an electrical angle of (360/3) degrees (see the parts (m) to (o) of FIG. 16). More specifically, the second selecting signals Nn1, Nn2 and Nn3 are set as three-phase signals, each having an "H" period of about 140 degrees.

A commanding part 35 shown in FIG. 1 comprises a speed control circuit, for example. The command signal Ac of the commanding part 35 is a voltage signal produced by the speed control circuit. The commanding part 35 detects the rotational speed of the disk 1 or the rotor 11 by using the phase pulse signal Pt of a phase detecting part 36, and produces the command signal Ac responding with the difference between the rotational speed of the disk 1 and an aimed speed. Hence, the command signal Ac of the commanding part 35 is a voltage signal responding with the phase pulse signal Pt of the phase detecting part 36. The command signal of the commanding part 35 can be changed responding with not only the rotational speed of the disk 1 or the rotor 11, but also the rotation phase thereof. This configuration is also included in the scope of the present invention.

Figure 9:
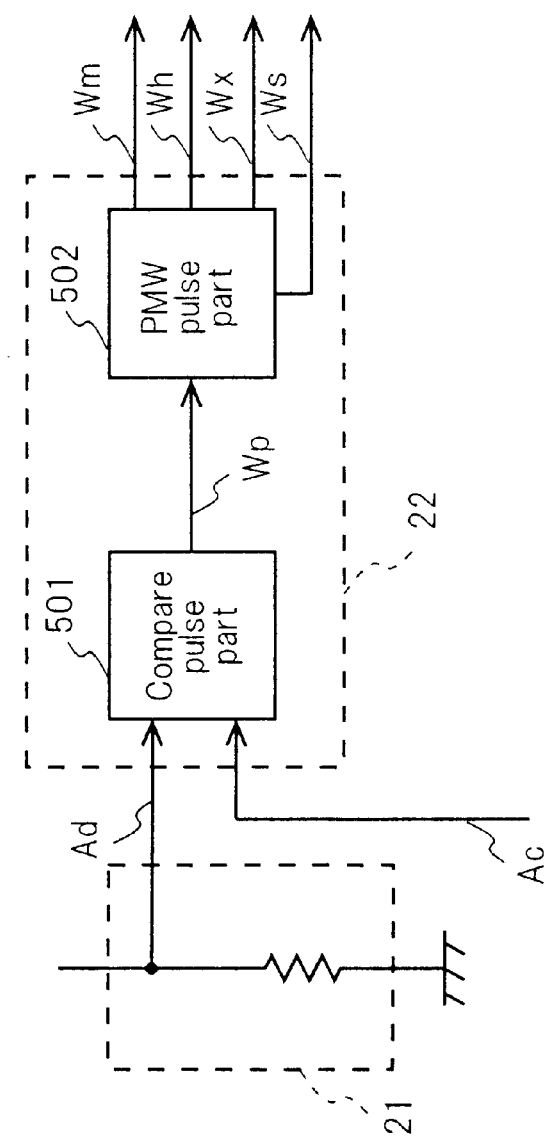
FIG. 9 is a circuit diagram showing a switching control part 22 in accordance with Embodiment 1.

The switching control part 22 shown in FIG. 1 compares the current detection signal Ad of the current detecting part 21 with the command signal Ac of the commanding part 35. Hence, the switching control part 22 produces the main PWM pulse signal Wm, the auxiliary PWM pulse signal Wh, the noise eliminating signal Wx and a synchronous pulse signal Ws responding with the current detection signal Ad and the command signal Ac. The switching control part 22 outputs the main PWM pulse signal Wm and the auxiliary PWM pulse signal Wh to the activation control part 32. In addition, the switching control part 22 outputs the noise eliminating signal Wx to the detected pulse producing part 42 of the voltage detecting part 30. Furthermore, the switching control part 22 outputs the main PWM pulse signal Wm and the synchronous pulse signal Ws to the slant producing part 47 of the phase detecting part 36. FIG. 9 shows a configuration of the switching control part 22.

Figure 10:
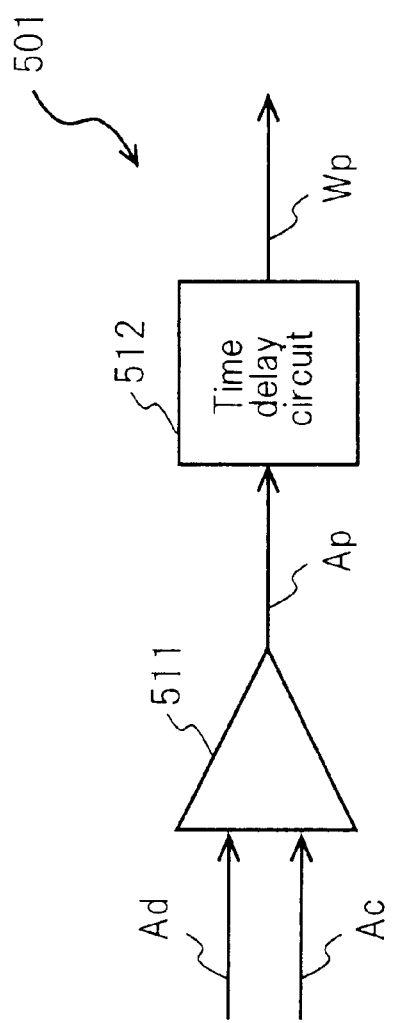
FIG. 10 is a circuit diagram showing the compare pulse part 501 of the switching control part 22 in accordance with Embodiment 1.
Figure 11:
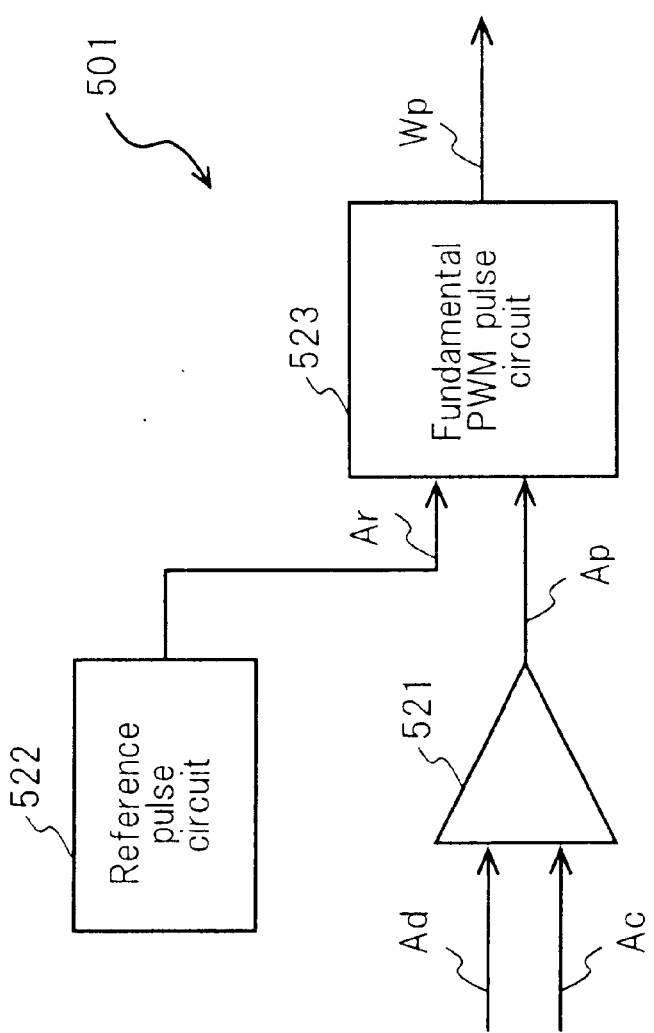
FIG. 11 is a circuit diagram showing another configuration of the compare pulse part 501 of the switching control part 22 in accordance with Embodiment 1.

The switching control part 22 shown in FIG. 9 comprises a compare pulse part 501 and a PWM pulse part 502. The compare pulse part 501 compares the command signal Ac with the current detection signal Ad, and outputs a fundamental PWM pulse signal Wp responding with the result of the comparison. The PWM pulse part 502 produces the main PWM pulse signal Wm, the auxiliary PWM pulse signal Wh, the noise eliminating signal Wx and the synchronous pulse signal Ws from the fundamental PWM pulse signal Wp. FIG. 10 or FIG. 11 shows a configuration of the compare pulse part 501, and FIG. 12 shows a configuration of the PWM pulse part 502.

Figure 17:
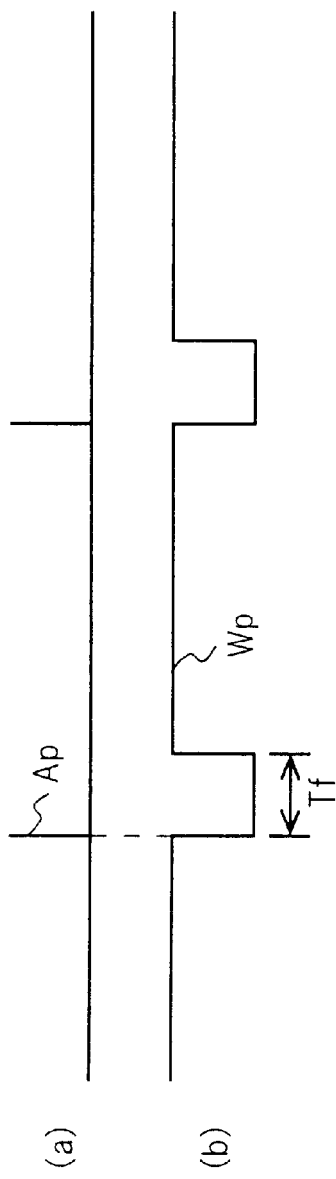
FIG. 17 is a waveform diagram illustrating the operation of the compare pulse part 501 shown in FIG. 10 in accordance with Embodiment 1.

The compare pulse part 501 shown in FIG. 10 comprises a compare circuit 511 and a time delay circuit 512. The compare circuit 511 compares the command signal Ac with the current detection signal Ad. When the current detection signal Ad becomes larger than the command signal Ac, a compared signal Ap is changed to "H." The fundamental PWM pulse signal Wp of the time delay circuit 512 becomes "L" for a predetermined time Tf from the arrival of the rising edge of the compared signal Ap, and becomes "H" after the lapse of the predetermined time Tf. The parts (a) and (b) of FIG. 17 show the relationship between the compared signal Ap and the fundamental PWM pulse signal Wp. Herein, the abscissa of FIG. 17 represents time. The compared signal Ap is "L" when the current detection signal Ad is smaller than the command signal Ac, and changes to "H" when the current detection signal Ad becomes larger than the command signal Ac. The fundamental PWM pulse signal Wp becomes "L" for the predetermined time Tf from the time when the compared signal Ap has changed to "H". When the fundamental PWM pulse signal Wp becomes "L," activation by the low-side power transistors is stopped, the current detection signal Ad becomes zero, and the compared signal Ap becomes "L." After the lapse of the predetermined time Tf, the fundamental PWM pulse signal Wp becomes "H," thereby restarting activation to the windings by the low-side power transistors. In this way, the fundamental PWM pulse signal Wp becomes a PWM signal (pulse width modulation signal) responding width the comparison result between the current detection signal Ad and the command signal Ac. The fundamental PWM pulse signal Wp is a high-frequency switching signal, the frequency of which is about 100 kHz, for example.

Figure 18:
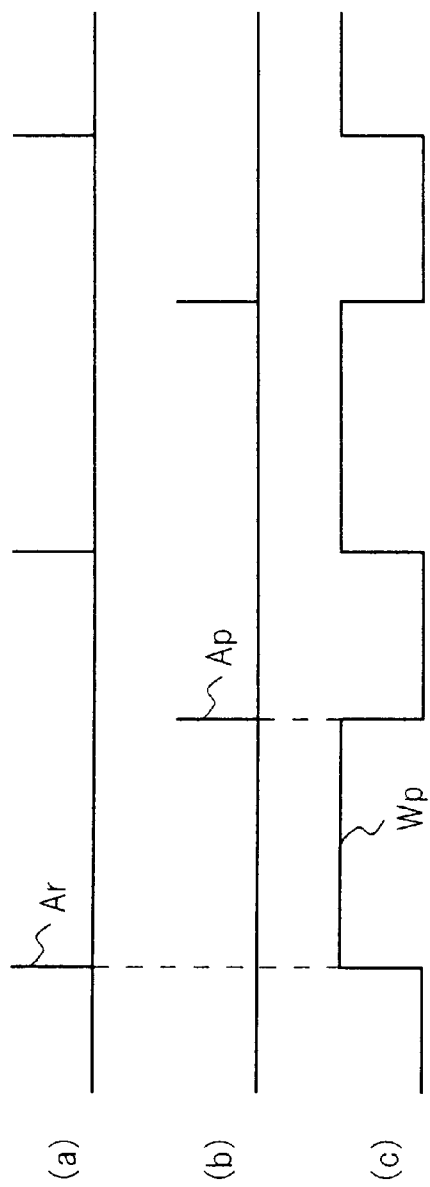
FIG. 18 is a waveform diagram illustrating the operation of the compare pulse part 501 shown in FIG. 11 in accordance with Embodiment 1.

FIG. 11 shows another configuration of the compare pulse part 501. The compare pulse part 501 shown in FIG. 11 comprises a compare circuit 521, a reference pulse circuit 522 and a fundamental PWM pulse circuit 523. The compare circuit 521 compares the command signal Ac with the current detection signal Ad. When the current detection signal Ad becomes larger than the command signal Ac, a compared signal Ap is changed to "H." The reference pulse circuit 522 outputs a trigger pulse signal Ar at predetermined time intervals. The fundamental PWM pulse circuit 523 comprises a flip-flop, for example. The internal state of the fundamental PWM pulse circuit 523 becomes "H" at the rising edge of the trigger pulse signal Ar, thereby setting the fundamental PWM pulse signal Wp at "H." The internal state of the fundamental PWM pulse circuit 523 becomes "L" at the rising edge of the compared signal Ap, thereby setting the fundamental PWM pulse signal Wp at "L." The parts (a) to (c) of FIG. 18 show the relationship among the trigger pulse signal Ar, the compared signal Ap and fundamental PWM pulse signal Wp. Herein, the abscissa of FIG. 18 represents time. The fundamental PWM pulse signal Wp becomes "H" by the generation of the rising edge of the trigger pulse signal Ar, and becomes "L" by the generation of the rising edge of the compared signal Ap. In this way, the fundamental PWM pulse signal Wp becomes a PWM signal responding width the comparison result between the current detection signal Ad and the command signal Ac. Furthermore, the fundamental PWM pulse signal Wp is forcibly set at "L" in periods wherein the trigger pulse signal Ar becomes "H." Hence, the fundamental PWM pulse signal Wp becomes a high-ferquency switching signal, the frequency of which is about 100 kHz, for example.

Figure 12:
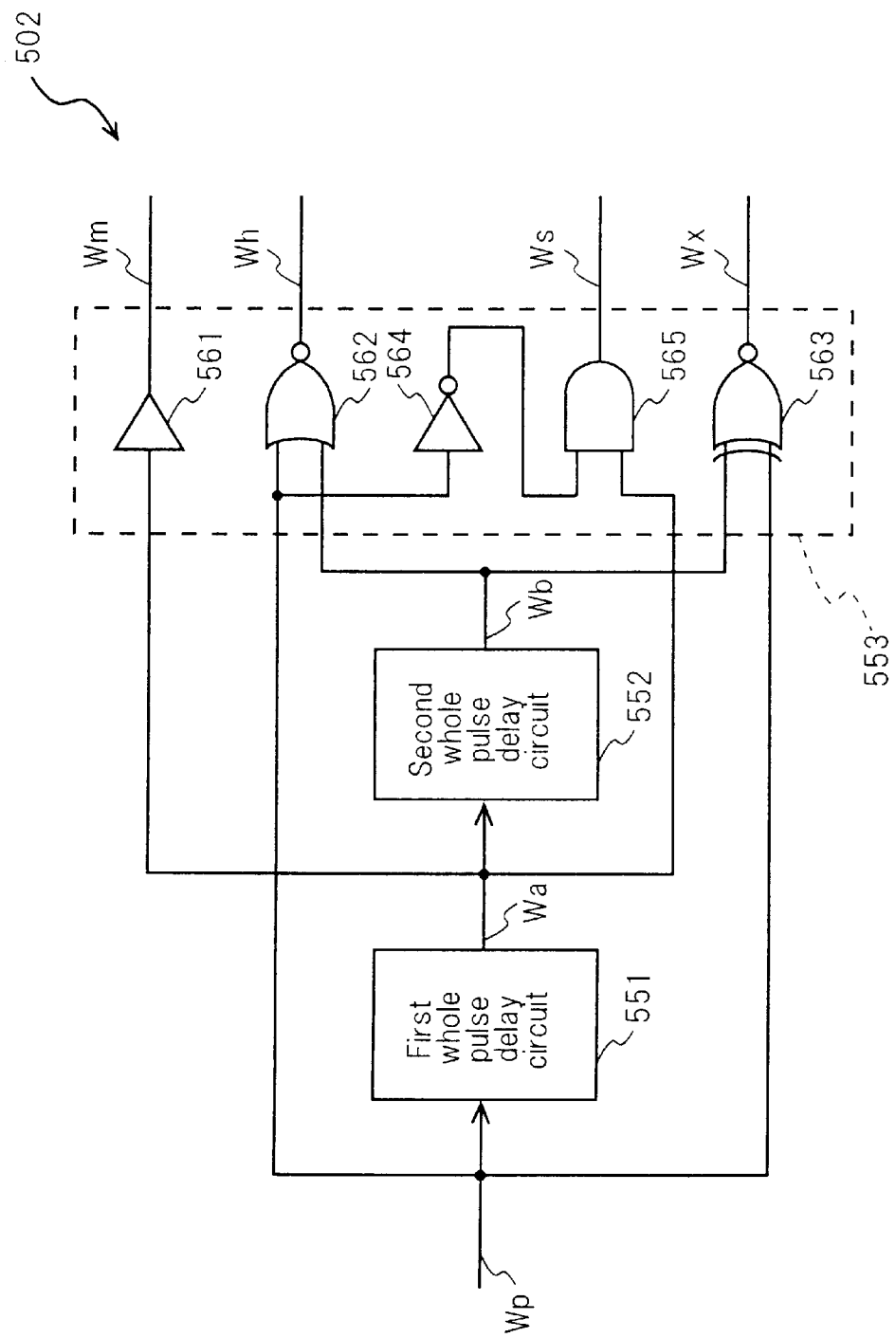
FIG. 12 is a circuit diagram showing the PWM pulse part 502 of the switching control part 22 in accordance with Embodiment 1.

The PWM pulse part 502 shown in FIG. 12 comprises a first whole pulse delay circuit 551, a second whole pulse delay circuit 552 and a logic composing output circuit 553. The first whole pulse delay circuit 551 outputs a first whole pulse delay signal Wa which is obtained by wholly delaying the fundamental PWM pulse signal Wp by a first required time Ta. The second whole delay circuit 552 outputs a second whole pulse delay signal Wb which is obtained by wholly delaying the first whole pulse delay signal Wa by a second required time Tb. The logic composing output circuit 553 logically composes the fundamental PWM pulse signal Wp, the first whole pulse delay signal Wa and the second whole pulse delay signal Wb. Hence, the logic composing output circuit 553 outputs the main PWM pulse signal Wm, the auxiliary PWM pulse signal Wh, the noise eliminating signal Wx and the synchronous pulse signal Ws.

Figure 19:
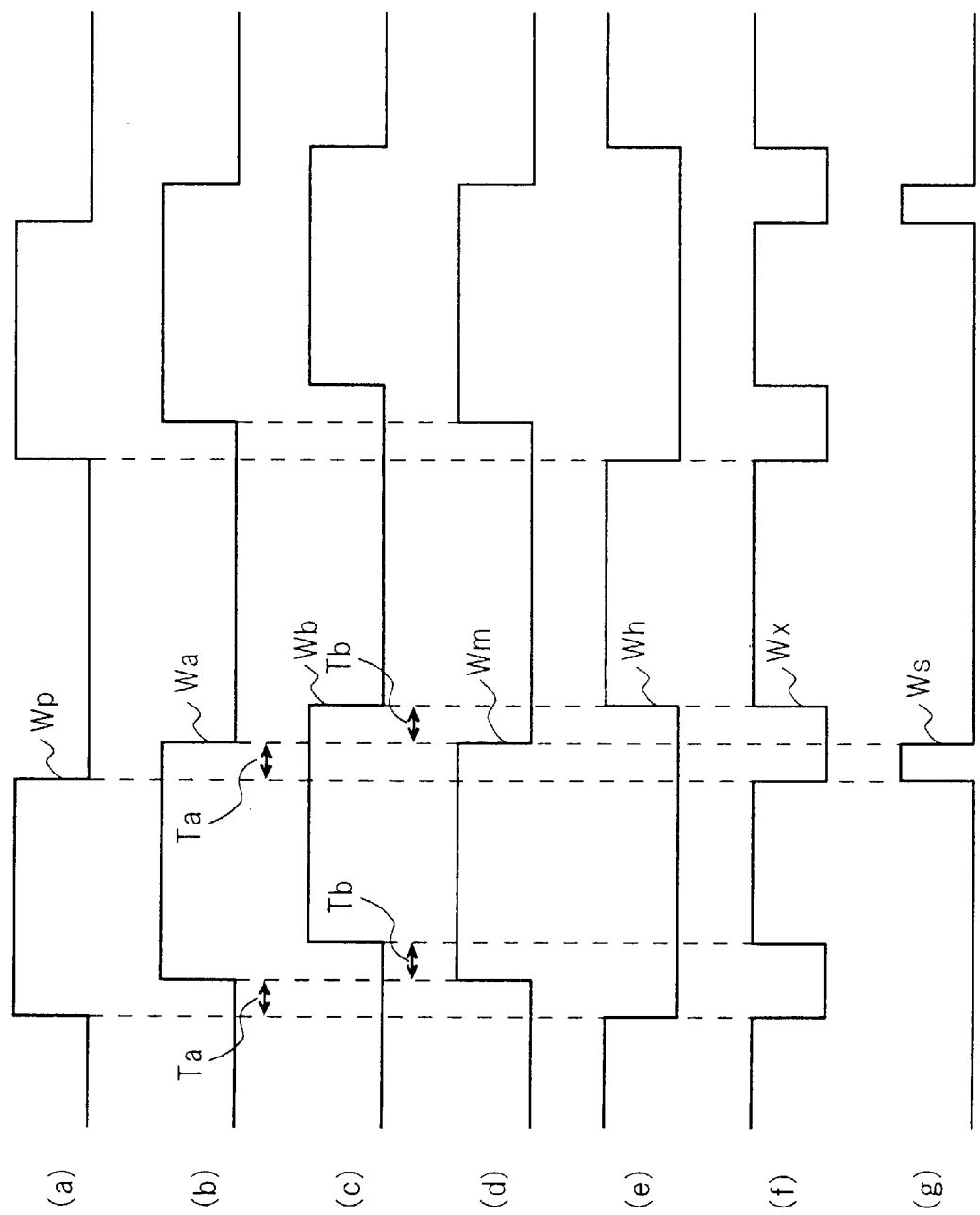
FIG. 19 is a waveform diagram illustrating the operation of the PWM pulse part 502 shown in FIG. 12 in accordance with Embodiment 1.

The parts (a) to (g) of FIG. 19 show the relationship among the fundamental PWM pulse signal Wp, the first whole pulse delay signal Wa, the second whole pulse delay signal Wb, the main PWM pulse signal Wm, the auxiliary PWM pulse signal Wh, the noise eliminating signal Wx and the synchronous pulse signal Ws. Herein, the abscissa of FIG. 19 represents time. The first whole pulse delay signal Wa is the wholly delayed signal of the fundamental PWM pulse signal Wp by the first predetermined time Ta. The second whole pulse delay signal Wb is the wholly delayed signal of the first whole pulse delay signal Wa by the second predetermined time Tb (see the parts (a) to (c) of FIG. 19). Since the main PWM pulse signal Wm is obtained by outputting the first whole pulse delay signal Wa via a buffer circuit 561, the waveform of the main PWM pulse signal Wm becomes identical with that of the first whole pulse delay signal Wa (see the parts (b) and (d) of FIG. 19). The auxiliary PWM pulse signal Wh is a signal obtained by logically composing the fundamental PWM pulse signal Wp and the second whole pulse delay signal Wb by using a NOR circuit 562, and has a waveform shown in the part (e) of FIG. 19. Furthermore, the "H" period of the auxiliary PWM pulse signal Wh is within the "L" period of the main PWM pulse signal Wm. Hence, the main PWM pulse signal Wm and the auxiliary PWM pulse signal Wh do not become "H" at the same time. In other words, a time difference, that is, the first required time Ta or the second required time Tb, is provided between the "H" period of the auxiliary PWM pulse signal Wh and the "H" period of the main PWM pulse signal Wm. The noise eliminating signal Wx is a signal obtained by logically composing the fundamental PWM pulse signal Wp and the second whole pulse delay signal Wb by using an exclusive NOR circuit 563, and has a waveform shown in the part (f) of FIG. 19. The "L" period of this noise eliminating signal Wx includes the change moment of the main PWM pulse signal Wm, and has at least the predetermined time Tb from the change moment. This noise eliminating signal Wx is input to the noise eliminating circuit 201 of the detected pulse producing part 42 of the voltage detecting part 30. The noise eliminating signal Wx eliminates a PWM switching noise of the compared detection signal of the winding terminal voltages responding with the high-frequency PWM switching of the power transistors. The noise eliminating signal Wx can be produced by logically composing the main PWM pulse signal Wm and the second whole pulse delay signal Wb by using the exclusive NOR circuit. In this case, the "L" period of the noise eliminating signal Wx substantially includes the OFF-ON or ON-OFF change of the PWM switching of the power transistors. In other words, the noise eliminating signal Wx is produced responding with the fundamental PWM pulse signal Wp so as to becomes "L" in a predetermined period including the change moment of the high-frequency switching of the power transistors. The synchronous pulse signal Ws is produced by logically composing the fundamental PWM pulse signal Wp and the first whole pulse delay signal Wa with an inverter circuit 564 and an AND circuit 565, and has a waveform shown in the part (g) of FIG. 19. The synchronous pulse signal Ws becomes "H" for a short period immediately before the "H-to-L" change of the main PWM pulse signal Wm. In other words, the synchronous pulse signal Ws has an "H" period having a required width immediately before the ON-to-OFF change of the power transistors.

Figure 13:
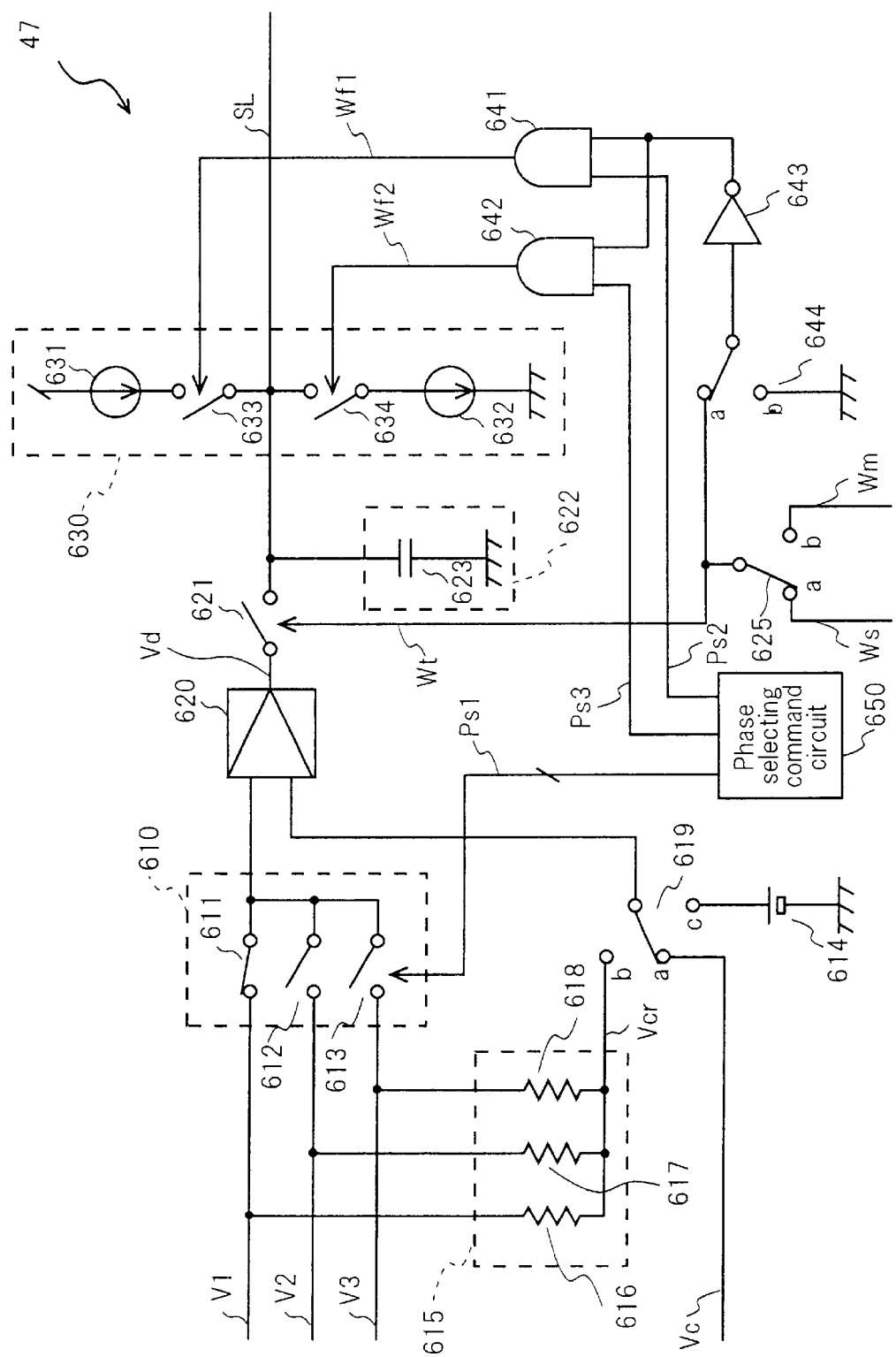
FIG. 13 is a circuit diagram showing the slant producing part 47 of a phase detecting part 36 in accordance with Embodiment 1.
Figure 14:
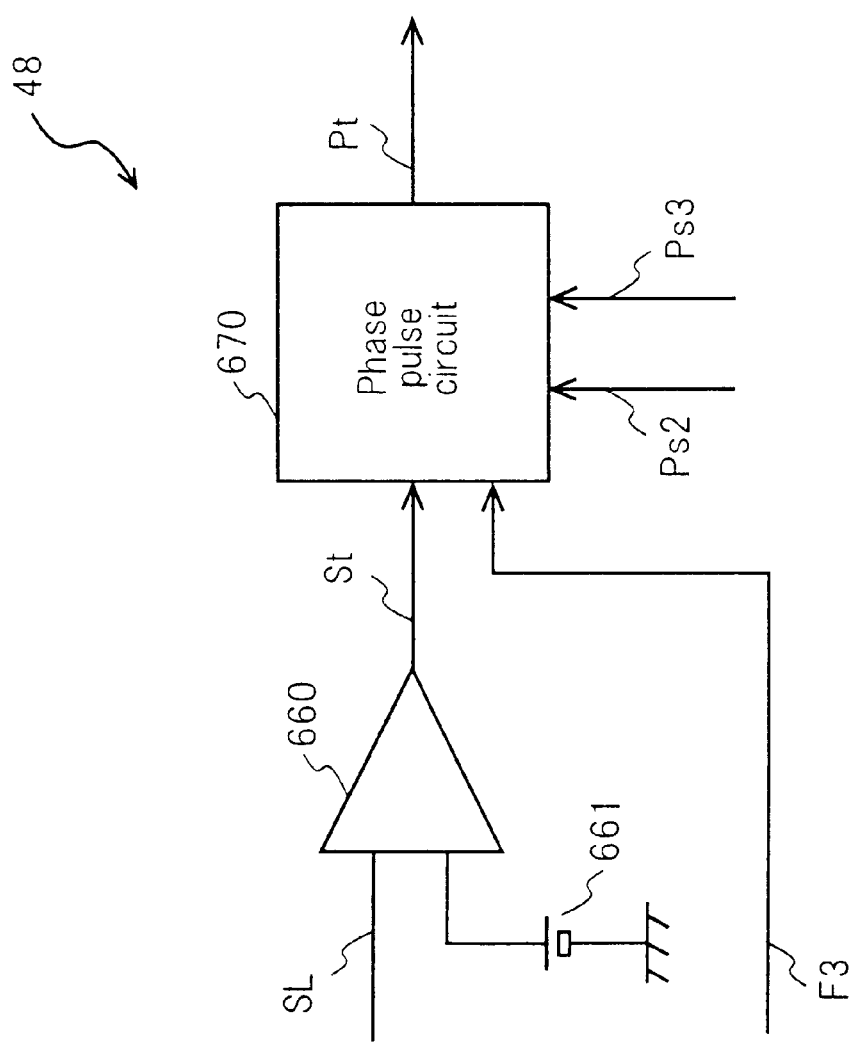
FIG. 14 is a circuit diagram showing the phase pulse producing part 48 of the phase detecting part 36 in accordance with Embodiment 1.

The phase detecting part 36 shown in FIG. 1 comprises the slant producing part 47 and a phase pulse producing part 48. The slant producing part 47 samples the voltage difference of the winding terminal voltages, and produces a slant voltage signal SL by providing a required voltage slant for a sample voltage. The phase pulse producing part 48 produces the phase pulse signal Pt responding with the slant voltage signal SL of the slant producing part 47. FIG. 13 shows a configuration of the slant producing part 47, and FIG. 14 shows a configuration of the phase pulse producing part 48.

The slant producing part 47 shown in FIG. 13 selectively detects the power supplying terminal voltages V1, V2 and V3 of the three-phase windings 12, 13 and 14. The switch circuits 611, 612 and 613 of a signal selecting circuit 610 select one of the power supplying terminal voltages V1, V2 and V3 responding with the phase selecting command signal Ps1 of a phase selecting command circuit 650, and input the voltage to an analog buffer circuit 620. The phase selecting command circuit 650 outputs a phase selecting command signal Ps1, a first polarity selecting signal Ps2 and a second polarity selecting signal Ps3 responding with the holding state of the state holding part 44 of the state shifting part 31 of the activation operation block. Hence, the signal selecting circuit 610 selectively detects one of the power supplying terminal voltages V1, V2 and V3 responding with the state of activation to the three-phase windings 12, 13 and 14. A switch circuit 619 selects the common terminal voltage Vc of the common terminal or the composed common terminal voltage Vcr of a voltage composing circuit 615 (or the reference voltage of a reference voltage source 614), and outputs one of the voltages to the analog buffer circuit 620. Herein, a case wherein the switch circuit 619 has selected the common terminal voltage Vc of the common terminal will be described as a preferable example. The analog buffer circuit 620 outputs a voltage signal Vd which corresponds to the voltage difference between one of the power supplying terminal voltages V1, V2 and V3 and the common terminal voltage Vc of the three-phase windings 12, 13 and 14. The voltage composing circuit 615 produces the composed common terminal voltage Vcr obtained by composing the power supplying terminal voltages V1, V2 and V3 of the three-phase windings 12, 13 and 14 via resistors 616, 617 and 618. The composed common terminal voltage Vcr is nearly coincident with the common terminal voltage Vc substantially, although slightly different from the real common terminal voltage Vc. Hence, the common terminal voltage Vc can be replaced with the composed common terminal voltage Vcr in the following explanations.

A switch circuit 625 selects the synchronous pulse signal Ws or the main PWM pulse signal Wm, and outputs the selected signal as a sampling pulse signal Wt. Herein, a case wherein the switch circuit 625 has selected the synchronous pulse signal Ws will be explained below as a preferable example. However, the main PWM pulse signal may be used. A sampling switch circuit 621 becomes ON (closed) when the sampling pulse signal Wt is "H," and becomes OFF (open) when the sampling pulse signal Wt is "L." A capacitor circuit 622 having a capacitor 623 samples the voltage signal Vd of the analog buffer circuit 620 when the sampling switch circuit 621 turns ON. In other words, the capacitor circuit 622 samples the voltage signal Vd responding with the voltage difference between one of the power supplying terminal voltages and the common terminal voltage in a period when the sampling pulse signal Wt is "H." As a result, the slant voltage signal SL, that is, the output signal of the capacitor circuit 622, intermittently responds with the voltage difference.

A charge circuit 630 comprises a high-side current source circuit 631, a low-side current source circuit 632, a high-side switch circuit 633 and a low-side switch circuit 634. The phase selecting command circuit 650 outputs the first polarity selecting signal Ps2 and the second polarity selecting signal Ps3. The second polarity selecting signal Ps3 can be an inverted signal of the first polarity selecting signal Ps2. A switch circuit 644 selects the sampling pulse signal Wt or a negative potential, and the selected signal is used as the input signal of an inverter circuit 643. An AND circuit 641 logically composes the output signal of the inverter circuit 643 and the first polarity selecting signal Ps2, and outputs a high-side switch signal Wf1. The high-side switch signal Wf1 can be the first polarity selecting signal Ps2. When the high-side switch signal Wf1 becomes "H," the high-side switch 633 of the charge circuit 630 turns ON. Hence, the high-side current source circuit 631 charges the capacitor circuit 622 by a predetermined current value. In other words, the high-side current source circuit 631 performs charging so as to make the slant voltage signal SL large. An AND circuit 642 logically composes the output signal of the inverter circuit 643 and the second polarity selecting signal Ps3, and outputs a low-side switch signal Wf2. The low-side switch signal Wf2 can be the second polarity selecting signal Ps3. When the low-side switch signal Wf2 becomes "H," the low-side switch circuit 634 of the charge circuit 630 turns ON, whereby a low-side current source circuit 632 charges the capacitor circuit 622 by a predetermined current value. In other words, the low-side current source circuit 632 performs charging so as to make the slant voltage signal SL small. As a result, the slant voltage signal SL of the capacitor circuit 622 intermittently responds with the voltage difference between one of the power supplying terminal voltages and the common terminal voltage, and has a voltage slant which corresponds to the current value of the high-side current source circuit 631 or the low-side current source circuit 632 occasionally. The charge currents of the high-side and low-side current source circuits 631 and 632 of the charge circuit 630, each of which occasionally charges the capacitor 623 of the capacitor circuit 622, are proportional or nearly proportional to the aimed rotational speed of the disk 1 and the rotor 11 of the commanding part 35. This changes the voltage slant of the slant voltage signal SL responding with the aimed rotational speed of the commanding part 35.

The phase pulse producing part 48 shown in FIG. 14 comprises a comparator circuit 660 and a phase pulse circuit 670. The phase pulse producing part 48 outputs the phase pulse signal Pt responding with the comparison result between the slant voltage signal SL of the slant producing part 47 and the reference voltage value. The comparator circuit 660 compares the slant voltage signal SL of the slant producing part 47 with the predetermined voltage value of a reference voltage circuit 661, and outputs a compared signal St. The phase pulse circuit 670 produces a polarity selecting comparison signal which is obtained by inverting or noninverting the compared signal St of the comparator circuit 660 responding with the first polarity selecting signal Ps2 and the second polarity selecting signal Ps3. The phase pulse circuit 670 comprises a flip-flop circuit. The flip-flop circuit is reset at the arrival of the third timing adjust signal F3 of the timing adjusting part 43, and then set at the arrival of the detecting edge of the polarity selecting comparison signal. The phase pulse circuit 670 outputs the phase pulse signal Pt responding with the state of this flip-flop circuit.

Figure 20:
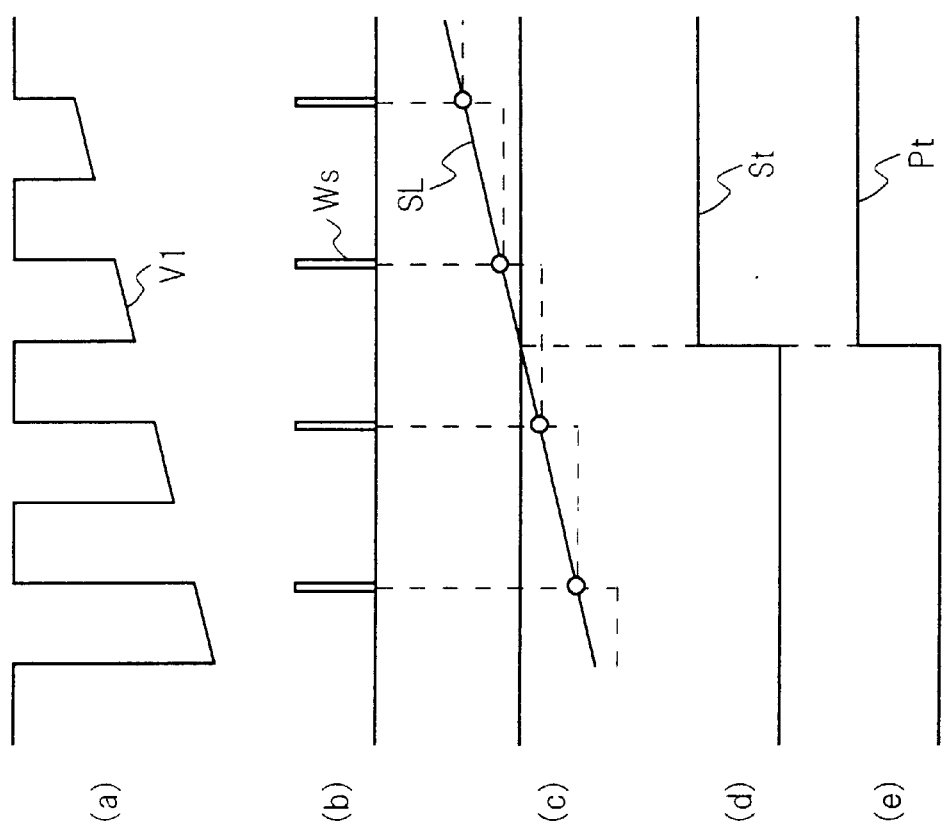
FIG. 20 is a waveform diagram illustrating the operation of the phase detecting part 36 in accordance with Embodiment 1.

FIG. 20 shows signal waveforms for illustrating operation of the slant producing part 47 and the phase pulse producing part 48. A case wherein the phase selecting command signal Ps1, the first polarity selecting signal Ps2 and the second polarity selecting signal Ps3 of the phase selecting command circuit 650 have selected the positive polarity change of the voltage difference between the power supplying terminal voltage V1 of the winding 12 and the common terminal voltage Vc will be described below. The part (a) of FIG. 20 shows the waveform of the power supplying terminal voltage V1 of the winding 12 at the time when the drive current signal I1 does not flow. The abscissa of FIG. 20 represents time. At least one of the low-side power transistors 101, 102 and 103 turns ON and OFF responding with the main PWM pulse signal Wm. Hence, when the at least one of the low-side power transistors is ON, the power supplying terminal voltage V1 becomes a value corresponding to an induced voltage (a counter electromotive force) of the winding 12. When the at least one of the low-side power transistors is OFF, the power supplying terminal voltage V1 becomes close to the positive potential of the voltage supplying part 25. In a similar way, when the at least one of the low-side power transistors is ON, the common terminal voltage Vc becomes a nearly intermediate value. When the at least one of the low-side power transistors is OFF, the common terminal voltage Vc becomes close to the positive potential of the voltage supplying part 25. The synchronous pulse signal Ws is produced in synchronization with the main PWM pulse signal Wm, and becomes "H" immediately before the at least one of the low-side power transistors is turned OFF (see the part (b) of FIG. 20). Since the synchronous pulse signal Ws is used as the sampling pulse signal Wt, the capacitor circuit 622 intermittently samples the voltage signal Vd which responds with the voltage difference between the power supplying terminal voltage V1 of the winding 12 and the common terminal voltage Vc (the round points in the part (c) of FIG. 20). When charging to the capacitor circuit 622 is not performed, the output signal SL of the capacitor circuit 622 becomes a staircase voltage signal shown in a broken line in the part (c) of FIG. 20.

The capacitor circuit 622 is charged by a current from the charge circuit 630. The phase selecting command circuit 650 changes the first polarity selecting signal Ps2 and the second polarity selecting signal Ps3 responding with the holding state of the state holding part 44 of the state shifting part 31 of the activation operation block. In a period wherein the voltage difference between the power supplying terminal voltage V1 of the winding 12 and the common terminal voltage Vc has a positive polarity slant, the first polarity selecting signal Ps2 becomes "H," and the second polarity selecting signal Ps3 becomes "L." Hence, the charge circuit 630 charges the capacitor circuit 622 from the high-side current source circuit 631, thereby making the slant voltage signal SL of the capacitor circuit 622 gradually larger (see the part (c) of FIG. 20). In other words, the output signal SL at the terminal of the capacitor circuit 622 intermittently responds with the voltage difference between the power supplying terminal voltage V1 of the winding 12 and the common terminal voltage Vc, and has a voltage slant during at least one of the rest periods except the sampling periods. The voltage slant of the slant voltage signal SL responds with the current value from the charge circuit 630. The comparator circuit 660 of the phase pulse producing part 48 compares the slant voltage signal SL of the capacitor circuit 622 with the predetermined reference voltage of the reference voltage circuit 661, and outputs the compared signal St which responds with the comparison result. The part (d) of FIG. 20 shows the waveform of the compared signal St of the comparator circuit 660. The phase pulse circuit 670 produces the polarity selecting comparison signal obtained by noninverting (or inverting) the compared signal St responding with the first polarity selecting signal Ps2 and the second polarity selecting signal Ps3. In the phase pulse circuit 670, its flip-flop circuit is reset by the third timing adjust signal F3 and set by the polarity selecting comparison signal. The state of this flip-flop circuit is output as the phase pulse signal Pt (see the part (e) of FIG. 20).

Figure 21:
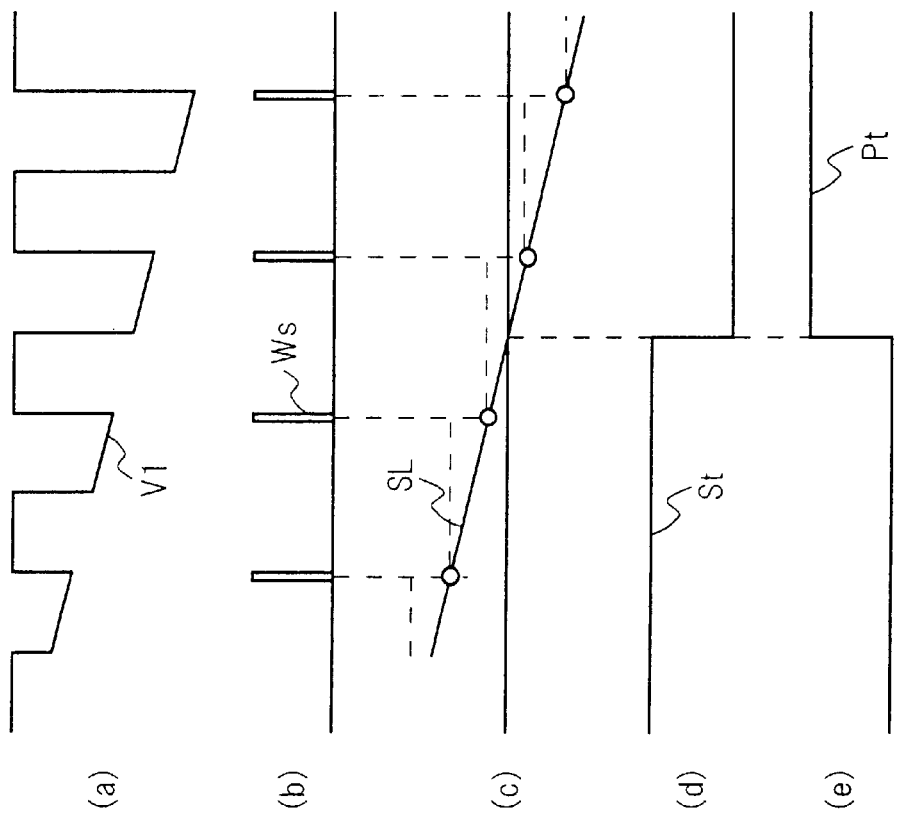
FIG. 21 is another waveform diagram illustrating the operation of the phase detecting part 36 in accordance with Embodiment 1.

FIG. 21 shows signal waveforms for illustrating another operation of the slant producing part 47 and the phase pulse producing part 48. A case wherein the phase selecting command signal Ps1, the first polarity selecting signal Ps2 and the second polarity selecting signal Ps3 of the phase selecting command circuit 650 have selected the negative polarity change of the voltage difference between the power supplying terminal voltage V1 of the winding 12 and the common terminal voltage Vc will be described below. The part (a) of FIG. 21 shows the waveform of the power supplying terminal voltage V1 of the winding 12 at the time when the drive current signal I1 does not flow. Herein, the abscissa of FIG. 21 represents time. The synchronous pulse signal Ws is produced in synchronization with the main PWM pulse signal Wm. The synchronous pulse signal Ws becomes "H" immediately before the low-side power transistors are turned OFF (see the part (b) of FIG. 21). The capacitor circuit 622 samples the voltage signal Vd which responds with the voltage difference between the power supplying terminal voltage V1 of the winding 12 and the common terminal voltage Vc (the round points in the part (c) of FIG. 21). When charging to the capacitor circuit 622 is not performed, the output signal SL of the capacitor circuit 622 becomes a staircase voltage signal shown in a broken line in the part (c) of FIG. 21.

In a period wherein the voltage difference between the power supplying terminal voltage V1 of the winding 12 and the common terminal voltage Vc has a negative polarity slant, the phase selecting command circuit 650 changes the state of the first polarity selecting signal Ps2 to "L" and changes the state of the second polarity selecting signal Ps3 to "H." Hence, the charge circuit 630 charges the capacitor circuit 622 from the low-side current source circuit 632, thereby making the slant voltage signal SL of the capacitor circuit 622 gradually smaller (see the part (c) of FIG. 21). In other words, the slant voltage signal SL of the capacitor circuit 622 intermittently responds with the voltage difference between the power supplying terminal voltage V1 of the winding 12 and the common terminal voltage Vc, and has a voltage slant which responds with the current value from the charge circuit 630. The comparator circuit 660 of the phase pulse producing part 48 compares the slant voltage signal SL of the capacitor circuit 622 with the predetermined reference voltage of the reference voltage circuit 661, and outputs the compared signal St responding with the result of the comparison. The part (d) of FIG. 21 shows the waveform of the compared signal St of the comparator circuit 660. The phase pulse circuit 670 produces the polarity selecting comparison signal obtained by inverting (or noninverting) the compared signal St responding with the first polarity selecting signal Ps2 and the second polarity selecting signal Ps3. In the phase pulse circuit 670, its flip-flop circuit is reset by the third timing adjust signal F3 and set by the polarity selecting comparison signal. The state of this flip-flop circuit is output as the phase pulse signal Pt (see the part (e) of FIG. 21).

As a result, the change moment of the phase pulse signal Pt corresponds to the timing when the voltage difference between one of the power supplying terminal voltages and the common terminal voltage of the three-phase windings 12, 13 and 14 becomes a predetermined value. For example, the change moment of the phase pulse signal Pt corresponds to the zero-cross phase of the induced voltage (the counter electromotive force) of a winding, that is, corresponds to the timing when its counter electro-motive force becomes zero. The slant producing part 47 produces the slant voltage signal SL which changes smoothly in one cycle of the high-frequency switching of the power transistors. The phase pulse producing part 48 outputs the phase pulse signal Pt at accurate timing responding with the slant voltage signal SL. Hence, the phase pulse signal Pt of the phase detecting part 36 is not affected by the high-frequency switching of the power transistors, and becomes a timing signal more accurate than the detected pulse signal Dt of the voltage detecting part 30.

Figure 22:
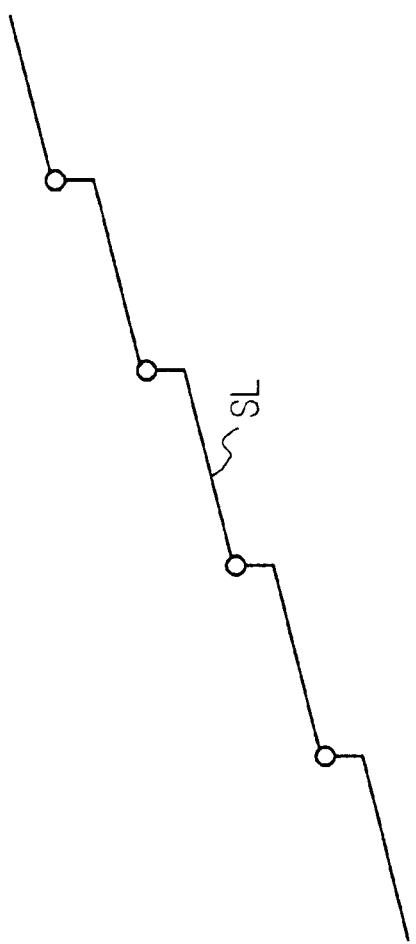
FIG. 22 is a waveform diagram at the time when the charge current of the slant producing part 47 of the phase detecting part 36 in accordance with Embodiment 1 is small.
Figure 23:
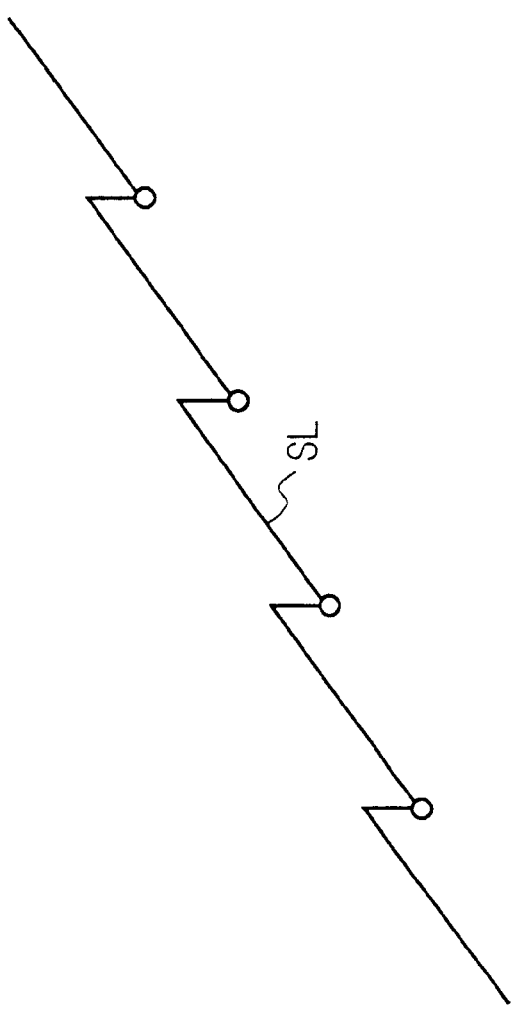
FIG. 23 is a waveform diagram at the time when the charge current of the slant producing part 47 of the phase detecting part 36 in accordance with Embodiment 1 is large.

FIG. 22 shows the slant voltage signal SL of the slant producing part 47 in the case when the charge current of the charge circuit 630 is small. The slant voltage signal SL intermittently responds with the voltage difference between one of the power supplying terminal voltages and the common terminal voltage at the timing of the synchronous pulse signal Ws. Therefore, an error of the slant voltage signal SL is small even when the charge current and the voltage slant are small. FIG. 23 shows the slant voltage signal SL of the slant producing part 47 in the case when the charge current of the charge circuit 630 is large. The slant voltage signal SL intermittently responds with the voltage difference between one of the power supplying terminal voltages and the common terminal voltage at the timing of the synchronous pulse signal Ws. Therefore, an error of the slant voltage signal SL is reduced even when the charge current and the voltage slant are large. The abscissas of FIG. 22 and FIG. 23 represent time.

Figure 24:
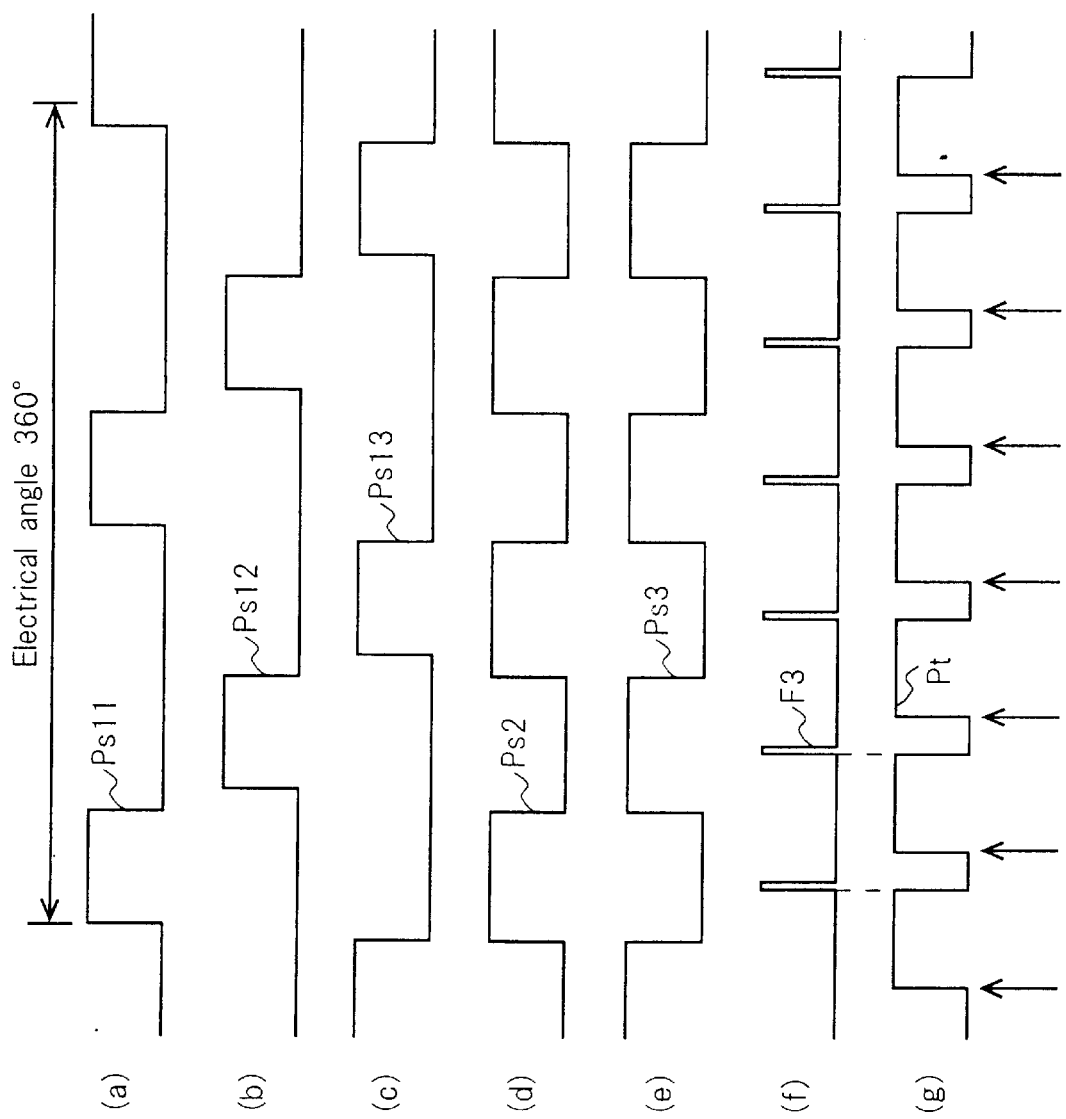
FIG. 24 is still another waveform diagram illustrating the operation of the phase detecting part 36 in accordance with Embodiment 1.

FIG. 24 shows the phase selecting command signal Ps1 (three-phase phase selecting command signals Ps11, Ps12 and Ps13), the first polarity selecting signal Ps2 and the second polarity selecting signal Ps3 in the range of an electrical angle of 360 degrees. The phase selecting command signal Ps1 (the three-phase phase selecting command signals Ps11, Ps12 and Ps13) responding with the rotation of the disk 1 or the rotor 11 sequentially selects one of the power supplying terminal voltages V1, V2 and V3 of the windings 12, 13 and 14. The slant producing part 47 samples the voltage difference between selected one of the power supplying terminal voltages of the windings and the common terminal voltage, and producing the slant voltage signal SL at the terminal (across the terminals) of the capacitor 623. The state holding part 44 of the state shifting part 31 of the activation operation block shifts its holding state in sequence responding with the rotation of the rotor 11. The three-phase phase selecting command signals Ps11, Ps12 and Ps13 of the phase selecting command circuit 650 change the states in sequence at every electrical angle of 60 degrees responding with the holding state of the state holding part 44 (see the parts (a) to (c) of FIG. 24). The switch circuits 611, 612 and 613 of the switch circuit 610 turn ON or OFF responding with the phase selecting command signals Ps11, Ps12 and Ps13, respectively, and sequentially select one of the power supplying terminal voltages V1, V2 and V3 of the three-phase windings 12, 13 and 14 responding with the rotation of the rotor 11. The first polarity selecting signal Ps2 and the second polarity selecting signal Ps3 of the phase selecting command circuit 650 change between "H" and "L" at every electrical angle of 60 degrees responding with the holding state of the state holding part 44 (see the parts (d) and (e) of FIG. 24). Herein, the second polarity selecting signal Ps3 can be a signal which is obtained by inverting the first polarity selecting signal Ps2. The first polarity selecting signal Ps2 corresponds to the slant polarity of the voltage difference between one of the three-phase power supplying terminal voltages to be detected and the common terminal voltage. The state shifting part 31 of the activation operation block outputs the third timing adjust signal F3 responding with the generation of the detected pulse signal Dt of the voltage detecting part 30 (see the part (f) of FIG. 24). The state shifting part 31 outputs the third timing adjust signal F3 considerably earlier than the generation of the next phase pulse signal Pt. Hence, the detecting edge of the phase pulse signal Pt occurs after the arrival of the third timing adjust signal F3 (see the arrows in the part (g) of FIG. 24). As a result, the phase pulse signal Pt of the phase detecting part 36 occurs at an accurate timing responding with the slant voltage signal SL. The rising edge of the phase pulse signal Pt is the detecting edge, which occurs at every electrical angle of 60 degrees or nearly 60 degrees.

The whole operation and advantages of Embodiment 1 will be described next. The activation control part 32 outputs the low-side activation control signals M1, M2 and M3 and the high-side activation control signals N1, N2 and N3 responding with the holding state the first state signals P1 to P6 and the second state signals Q1 to Q6) of the state shifting part 31, thereby selecting windings to be activated. The power supplying part 20 turns ON and OFF the three low-side power transistors 101, 102 and 103 and the three high-side power transistors 105, 106 and 107 responding with the low-side activation control signals M1 to M3 and the three-phase high-side activation control signals N1 to N3, thereby supplying power to the three-phase windings 12, 13 and 14.

The switching control part 22 and the current detecting part 21 form a switching operation block and operate so as to supply the PWM or high-frequency switching drive voltages to the three-phase windings 12, 13 and 14. Since one or two of the low-side activation control signals M1, M2 and M3 of the activation control part 32 are PWM pulse signals responding with the main PWM pulse signal Wm of the switching control part 22, one or two of the low-side power transistors 101, 102 and 103 of the power supplying part 20 perform high-frequency switching simultaneously. Hence, the negative parts of the three-phase drive current signals I1, I2 and I3 are supplied to the three-phase windings 12, 13 and 14. When all the low-side power transistors 101, 102 and 103 of the power supplying part 20 turn OFF, one or two of the high-side power diodes 105d, 106d and 107d, connected to the windings of the activated phases, turn ON by the inductive reaction of the windings. Hence, the negative parts of the three-phase drive currents I1, I2 and I3 are continuously supplied to the three-phase windings 12, 13 and 14. As a result, the power supplying terminal voltages V1, V2 and V3 of the three-phase windings 12, 13 and 14 become PWM or high-frequency switching voltages. Hence, the power losses of the low-side power transistors 101, 102 and 103 of the power supplying part 20 decrease significantly.

The high-side power transistors 105, 106 and 107 of the power supplying part 20 supply the positive parts of the drive current signals I1, I2 and I3 to the three-phase windings 12, 13 and 14. A case wherein the high-side auxiliary signal Wj of the activation control part 32 is fixed to "L" will be described below. This corresponds to a case wherein the switch circuit 461 of the auxiliary selecting circuit 406 is connected to the contact Sb. In this case, since one or two of the high-side activation control signals N1, N2 and N3 of the activation control part 32 becomes "H," one or two of the high-side power transistors 105, 106 and 107 of the power supplying part 20 turn ON simultaneously. Hence, the positive parts of the three-phase drive current signals I1, I2 and I3 are supplied to the three-phase windings 12, 13 and 14. As a result, the power losses of the high-side power transistors 105, 106 and 107 of the power supplying part 20 decrease significantly. In addition, the low-side power transistors 101, 102 and 103 and the high-side power transistors 105, 106 and 107 of the power supplying part 20 supply the three-phase alternating drive current signals I1, I2 and I3 to the three-phase windings 12, 13 and 14 responding with the rotation of the rotor 11.

A case wherein the high-side auxiliary signal Wj of the activation control part 32 is coincident with the auxiliary PWM pulse signal Wh of the switching control part 22 will be described below. This corresponds to a case wherein the switch circuit 461 of the auxiliary selecting circuit 406 is connected to the contact Sa. The auxiliary PWM pulse signal Wh is a high-frequency switching signal that turns OFF-ON complementarily to the ON-OFF high-frequency switching of the main PWM pulse signal Wm. At least one of the high-side activation control signals N1, N2 and N3 of the activation control part 32 becomes a PWM pulse signal responding with the auxiliary PWM pulse signal Wh, and at least one of the high-side power transistors is turned ON in the ON period of the high-side power diode. In other words, at least one of the high-side power transistors in phase with one of the active low-side power transistors performing ON-OFF high-frequency switching is subjected to OFF-ON high-frequency switching complementarily to the ON-OFF high-frequency switching of the one of the active low-side power transistors. Hence, the power losses of the high-side power diodes are reduced remarkably, whereby power losses and heat generation can be reduced further. Since the auxiliary PWM pulse signal Wh is auxiliary, the operation of this signal may be eliminated as described above (the switch circuit 461 is connected to the contact Sb).

The current detecting part 21 detects the composed supply current Ig which is supplied from the voltage supplying part 25 to the three-phase windings 12, 13 and 14 via the three low-side power transistors 101, 102 and 103 of the power supplying part 20. The current detecting part 21 outputs the current detection signal Ad which responds or corresponds to the composed supply current Ig. This composed supply current Ig corresponds to the composed value of the negative parts of the three-phase drive current signals I1, I2 and I3 to the three-phase windings 12, 13 and 14. The switching control part 22 compares the current detection signal Ad with the command signal Ac, and outputs the main PWM pulse signal Wm and the auxiliary PWM pulse signal Wh responding with the comparison result. The low-side power transistors 101, 102 and 103 of the power supplying part 20 perform ON-OFF high-frequency switching responding with the main PWM pulse signal Wm, thereby converting the power supplying terminal voltages V1, V2 and V3 to the three-phase windings 12, 13 and 14 into PWM voltages. As a result, the composed supply current Ig is controlled responding with the command signal Ac. Hence, the drive current signals I1, I2 and I3 to the three-phase windings 12, 13 and 14 can be controlled accurately responding with the command signal Ac, whereby the pulsation of the generated drive force can be reduced significantly. In other words, it is possible to remarkably eliminate vibration and acoustic noise of the disk 1 and the rotor 11.

The low-side power transistors of the power supplying part 20 perform ON-OFF high-frequency switching simultaneously responding with the main PWM pulse signal Wm, that is, the single high-frequency pulse signal of the switching control part 22. Hence, their configurations are simple. When the high-side auxiliary signal Wj is fixed to "L," the high-side power transistors of the power supplying part 20 do no perform PWM operation. Hence, the operation of the high-side power transistors is very simple. When the high-side auxiliary signal Wj is coincident with the auxiliary PWM pulse signal Wh, a clearance time can be provided easily between the main PWM pulse signal Wm and the auxiliary PWM pulse signal Wh, both of which respond with the main PWM pulse signal Wm (the single high-frequency pulse signal) of the switching control part 22. It is thus possible to easily prevent the low-side power transistors and the high-side power transistors in phase therewith from turning ON simultaneously.

The voltage comparing part 41 of the voltage detecting part 30 directly compares one of the three-phase power supplying terminal voltages V1, V2 and V3 with the common terminal voltage Vc substantially. The selecting command circuit selects the one of the three-phase power supplying terminal voltages V1, V2 and V3 responding with the holding state (the first state signals P1 to P6 and/or the second state signals Q1 to Q6) of the state shifting part 31. The voltage comparing part 41 outputs the selected compared signal Bj responding with the comparison result. As a result, the power supplying terminal voltage of the winding corresponding to the holding state of the state shifting part 31 can be selected, detected and compared easily, thereby obtaining the pulse-wise selected compared signal Bj responding with the result of the selection, detection and comparison. In other words, the power supplying terminal voltages of the windings 12, 13 and 14 to be detected and compared are selected responding with the rotation of the disk 1 or the rotor 11. Hence, it is possible to obtain the selected compared signal Bj directly responding with the comparison result of the selected and detected terminal voltages.

The noise eliminating circuit 201 of the detected pulse producing part 42 of the voltage detecting part 30 logically composes the selected compared signal Bj of the voltage comparing part 41 with the noise eliminating signal Wx, and produces the output signal Ca which is free from a switching noise included in the selected compared signal Bj. The noise eliminating signal Wx of the switching control part 22 is held at "L" in a predetermined period including at least the change moment of the main PWM pulse signal Wm. The noise eliminating circuit 201 executes the AND operation of the noise eliminating signal Wx and the selected compared signal Bj, thereby eliminating a switching noise of the selected compared signal Bj owing to the PWM operation of the power transistors. As a result, the output signal Ca of the noise eliminating circuit 201 accurately reflects the result of the comparison between the one of the power supplying terminal voltages and the common terminal voltage. In particular, since the power transistors of the power supplying part 20 perform high-frequency switching responding with the main PWM pulse signal Wm, that is, the single high-frequency pulse signal, the noise eliminating signal Wx for eliminating the influence of the PWM noise can be produced easily.

The pulse producing circuit 202 of the detected pulse producing part 42 changes the detected pulse signal Dt to "H" at the arrival of the rising edge of the output signal Ca of the noise eliminating circuit 201. The detected pulse signal Dt is reset to "L" by the third timing adjust signal F3 after the third adjust time T3 from the change moment of the detected pulse signal Dt. Hence, even if the rising edge of the output signal Ca of the noise eliminating circuit 201 occurs two or more times by mistake, for example, owing to chattering in the output of the comparison between one of the power supplying terminal voltages and the common terminal voltage, the detected pulse signal Dt of the pulse producing circuit 202 changes only once. Hence, the state shifting part 31 using the detected pulse signal Dt is prevented from malfunctioning.

The timing adjusting part 43 of the state shifting part 31 detects the arrival of the rising edge of the detected pulse signal Dt, and the first count circuit 303 measures the time interval T0 between the detection edges of the detected pulse signal Dt. The second count circuit 304 outputs the first timing adjust signal F1 which is a pulse signal delayed by the first adjust time T1 from the arrival of the edge of the detected pulse signal Dt. Furthermore, the second count circuit 304 and the third count circuit 305 output the second timing adjust signal F2 which is a pulse signal delayed by the second adjust time T2 from the arrival of the edge of the detected pulse signal Dt. Still further, the delay pulse circuit 310 outputs the third timing adjust signal F3 which is a pulse signal delayed by the third adjust time T3 from the arrival of the edge of the detected pulse signal Dt (see the part (f) of FIG. 15). The first adjust time T1, the second adjust time T2 and the third adjust time T3 respond with the time interval T0. The adjust times have a relationship of T1<T2<T3<T0.

The state holding part 44 of the state shifting part 31 shifts the first state signals P1 to P6 of the first state holding circuit 320 responding with the first timing adjust signal F1, thereby changing the holding state. In addition, the state holding part 44 of the state shifting part 31 shifts the second state signals Q1 to Q6 of the second state holding circuit 330 responding with the second timing adjust signal F2, thereby changing the holding state. The first state signals P1 to P6 and the second state signals Q1 to Q6 are thus shifted sequentially at the arrival of the first timing adjust signal F1 and the second timing adjust signal F2, respectively (see FIG. 16).

The first selecting circuit 401 and the second selecting circuit 402 of the activation control part 32 produce the first selecting signals Mm1, Mm2 and Mm3 and the second selecting signals Nn1, Nn2 and Nn3 responding with the holding state (the first state signals P1 to P6 and the second state signals Q1 to Q6) of the state shifting part 31. The first selecting signals Mm1, Mm2 and Mm3 determine the active periods of the low-side power transistors 101, 102 and 103 of the power supplying part 20, respectively, and also determine active periods during which the negative parts of the drive current signals I1, I2 and I3 are supplied to the three-phase windings 12, 13 and 14, respectively. The second selecting signals Nn1, Nn2 and Nn3 determine the active periods of the high-side power transistors 105, 106 and 107 of the power supplying part 20, respectively, and also determine active periods during which the positive parts of the drive current signals I1, I2 and I3 are supplied to the three-phase windings 12, 13 and 14, respectively. The activation control part 32 logically composes the first selecting signals Mm1, Mm2 and Mm3 with the main PWM pulse signal Wm of the switching control part 22, thereby producing the low-side activation control signals M1, M2 and M3. The low-side power transistors 101, 102 and 103 of the power supplying part 20 are thus subjected to ON-OFF PWM switching responding with the low-side activation control signals M1, M2 and M3. Hence, the power losses and heat generation of the low-side power transistors reduce significantly.

When the switch circuit 461 of the auxiliary selecting circuit 406 is connected to the contact Sb, the high-side auxiliary signal Wj becomes "L," and the auxiliary activation control signals Mm5, Mm6 and Mm7 also become "L." Hence, the activation control part 32 produces the high-side activation control signals N1, N2 and N3 coincident with the second selecting signals Nn1, Nn2 and Nn3, respectively. The high-side activation control signals N1, N2 and N3 turn ON-OFF the high-side power transistors 105, 106 and 107 of the power supplying part 20 (high-frequency switching is not performed). This reduces power losses and heat generation at the high-side power transistors.

Furthermore, when the switch circuit 461 of the auxiliary selecting circuit 406 is connected to the contact Sa, the high-side auxiliary signal Wj becomes coincident with the auxiliary PWM pulse signal Wh. The second pulse composing circuit 404 produces the auxiliary activation control signals Mm5, Mm6 and Mm7 which are obtained by converting the "H" period portions of the first selecting signals Mm1, Mm2 and Mm3 into pulse signals. The third pulse composing circuit 405 logically composes the second selecting signals Nn1, Nn2 and Nn3 with the auxiliary activation control signals Mm5, Mm6 and Mm7, thereby producing the high-side activation control signals N1, N2 and N3. In the periods coincident with the periods of the second selecting signals Nn1, Nn2 and Nn3, the high-side power transistors 105, 106 and 107 of the power supplying part 20 are turned ON-OFF (high-frequency switching is not performed). In the periods coincident with the periods of the first selecting signals Mm1, Mm2 and Mm3, the high-side power transistors 105, 106 and 107 of the power supplying part 20 are subjected to OFF-ON high-frequency switching responding with the auxiliary PWM pulse signal Wh. This significantly reduces power losses and heat generation at the high-side power transistors 105, 106 and 107 and the high-side power diodes 105d, 106d and 107d.

The slant producing part 47 of the phase detecting part 36 intermittently samples the voltage signal Vd which responds with the voltage difference between one of the power supplying terminal voltages V1, V2 and V3 and the common terminal voltage Vc of the three-phase windings 12, 13 and 14. The sample voltage of the slant producing part 47 is intermittently obtained at the terminal (across the terminals) of the single capacitor 623 of the capacitor circuit 622 in synchronization with the switching pulse signal which subjects the power transistors to high-frequency switching. The synchronous pulse signal Ws or the main PWM pulse signal Wm samples the voltage signal Vd in the ON period during which the power transistors are ON. The charge circuit 630 supplies a charge current to the capacitor 623 of the capacitor circuit 622. Hence, the slant voltage signal SL having an adequate voltage slant is obtained across the terminals of the capacitor 623. In other words, the slant voltage signal SL becomes a sample voltage intermittently responding with the voltage difference between one of the power supplying terminal voltages V1, V2 and V3 and the common terminal voltage Vc of the three-phase windings 12, 13 and 14 in the sampling period. The slant voltage signal SL substantially provides an adequate voltage slant in a period other than the sampling period. As a result, even when the power transistors of the power supplying part 20 perform high-frequency switching, the slant voltage signal SL has a waveform which substantially or partially corresponds to the counter electromotive force of the winding. The phase pulse producing part 48 compares the slant voltage signal SL of the slant producing part 47 with the predetermined reference voltage, and produces the phase pulse signal Pt responding with the result of the comparison. Hence, even when the power transistors perform high-frequency switching, the detecting edge of the phase pulse signal Pt are generated at accurate timing responding with the counter electromotive force of the winding.

The phase selecting command circuit 650 changes the phase selecting command signal Ps1, the first polarity selecting signal Ps2 and the second polarity selecting signal Ps3 responding with the holding state of the state shifting part 31 of the activation operation block. Hence, the voltage difference between one of the power supplying terminal voltages and the common terminal voltage, which should be detected sequentially, is selected in synchronization with the rotation of the rotor. In other words, the counter electromotive force of the winding, the phase of which should be detected, is selected responding with the rotation of the rotor, thereby obtaining the detecting edge of the phase pulse signal Pt at every electrical angle of 60 degrees or nearly 60 degrees.

The commanding part 35 detects the rotational speed of the disk 1 or the rotor 11 by using the phase pulse signal Pt of the phase detecting part 36, and outputs the command signal Ac responding with the rotational speed. In other words, the rotational speed of the disk 1 or the rotor 11 is controlled. Since the detecting edge of the phase pulse signal Pt occurs at accurate rotation phase timing, the rotational speed of the disk 1 or the rotor 11 can be controlled accurately, whereby the jitter (the speed fluctuation) of the disk 1 can be reduced remarkably. This can improve the accuracy of recording on the disk 1 by the head 2 and the processing part 3, and/or can reduce the bit error in a reproduced signal. It is thus possible to realize a disk drive apparatus which is capable of recording and/or reproducing data on the disk 1 at high density.

In Embodiment 1, the detected pulse signal and the phase pulse signal are produced by comparing one of the power supplying terminal voltages with the common terminal voltage Vc substantially. The rotor 11 and the disk 1 are rotated responding with the detected pulse signal and the phase pulse signal. Hence, position sensors and a speed sensor for detecting the rotational position and the rotational speed of the rotor 11 and the disk 1 are unnecessary in Embodiment 1. Furthermore, the power transistors for supplying bi-directional drive currents to the three-phase windings are subjected to ON-OFF high-frequency switching, whereby the power losses of the power transistors are reduced remarkably. The low-side power transistors are subjected to ON-OFF high-frequency switching, and the high-side power transistors are subjected to ON-OFF operation, thereby altering current paths. Hence, the power losses of the power transistors are reduced remarkably.

In Embodiment 1, the phase detecting part 36 produces the phase pulse signal Pt by using a single capacitor. The slant producing part 47 produces the slant voltage signal SL at the terminal of the single capacitor. The slant voltage signal SL intermittently responds with the voltage difference between one of the power supplying terminal voltages V1, V2 and V3 and the common terminal voltage Vc of the three-phase windings 12, 13 and 14 and has an adequate voltage slant. The phase pulse signal Pt responds with the slant voltage signal SL. Actually, the phase pulse signal Pt is produced by comparing the slant voltage signal SL with the required reference voltage. Hence, the phase pulse signal Pt changes at accurate timing responding with the counter electromotive force of the winding being detected. The commanding part 35 produces the command signal responding with the phase pulse signal Pt so as to control the rotational speed of the disk 1 and the rotor 11. The switching operation block subjects the power transistors to high-frequency switching responding with the command signal. Hence, the rotational speed of the disk 1 and the rotor 11 can be controlled accurately. In other words, in Embodiment 1, even when the power transistors perform high-frequency switching, the phase pulse signal Pt changes at accurate timing, whereby the fluctuation of the rotational speed of the disk 1 becomes very small. As a result, a high-performance disk drive apparatus capable of high-density recording on the disk 1 and low-jitter reproduction from the disk 1 can be realized easily.

The slant producing part 47 comprises the single capacitor 623 and the sampling circuit (including the switch circuit 610, the switch circuit 619, the analog buffer circuit 620 and the sampling switch circuit 621). The sampling circuit intermittently samples the sample voltage responding with the voltage difference between one of the power supplying terminal voltages and the common terminal voltage of the three-phase windings in synchronization with the sampling pulse signal Wt across the terminals of the capacitor 623. The slant producing part 47 further comprises the charge circuit 630 which supplies a charge current to the capacitor 623 continuously or intermittently. Hence, the above-mentioned slant voltage signal SL can be produced easily. When the synchronous pulse signal Ws in synchronization with the switching pulse signal is used as the sampling pulse signal Wt, the sample voltage responding with the voltage difference between one of the power supplying terminal voltages and the common terminal voltage of the three-phase windings can be sampled immediately before the power transistors performing high-frequency switching turn OFF. Hence, an accurate sample voltage free from the influence of the high-frequency switching can be obtained at the terminal of the capacitor 623. As a result, the accurate phase pulse signal Pt can be produced by the simple configuration.

The voltage difference between one of the power supplying terminal voltages V1, V2 and V3 and the common terminal voltage Vc of the three-phase windings 12, 13 and 14 is sampled via the analog buffer circuit 620. However, the present invention is not limited to such a case. Furthermore, the composed common terminal voltage Vcr is produced by composing the power supplying terminal voltages V1, V2 and V3 of the three-phase windings, and this composed common terminal voltage Vcr can be used as the common terminal voltage, although the performance lowers slightly. Still further, the number of the detection points of the phase pulse signal Pt is increased by sequentially changing the power supplying terminal voltages V1, V2 and V3 to be detected responding with the operation of the activation operation block. Hence, the control performance of the rotational speed is improved. However, the present invention is not limited to such a case. For example, the slant voltage signal can be produced by intermittently detecting the voltage difference between one specific power supplying terminal voltage and the common terminal voltage Vc, and the phase pulse signal responding with the slant voltage signal can be produced. The charge currents of the high-side and low-side current source circuits 631 and 632 of the charge circuit 630 are changed so as to be proportional or nearly proportional to the aimed rotational speed of the disk 1 and the rotor 11 of the commanding part 35. The voltage slant of the slant voltage signal SL is changed adequately responding with the aimed rotational speed of the commanding part 35. So the phase pulse signal Pt of the phase detecting part 36 is detected at accurate timing, even when the aimed speed of the commanding part 35 is changed responding with the position of the head 2.

The switching operation block comprises the current detecting part 21 and the switching control part 22. The current detecting part 21 produces the current detection signal Ad responding with the composed supply current Ig from the voltage supplying part 25 to the three-phase windings 12, 13 and 14. The switching control part 22 produces the switching pulse signal responding with the current detection signal Ad and the command signal Ac. At least one of the three low-side power transistors 101, 102 and 103 and the three high-side power transistors 105, 106 and 107 is subjected to high-frequency switching responding with the switching pulse signal. With this configuration, the three-phase drive currents I1, I2 and I3 to the three-phase windings 12, 13 and 14 can be controlled accurately responding with the command signal. Furthermore, by simultaneously activating two of the three low-side power transistors or the three high-side power transistors in the current path alteration operation, the drive currents to the three-phase windings can easily be controlled accurately responding with the command signal. In particular, by causing the three low-side power transistors or the three high-side power transistors or both the low-side and high-side power transistors to perform high-frequency switching responding with the single switching pulse signal, the drive currents to the three-phase windings can be controlled accurately responding with the command signal in a simple configuration. Furthermore, since the plurality of the power transistors perform high-frequency switching responding with the substantially single switching pulse signal, the sampling operation of the above-mentioned phase detecting part 36 becomes simple and stable.

In Embodiment 1, the activation operation block comprises the state shifting part 31 and the activation control part 32. The state shifting part 31 changes its holding state from a first holding state to a second holding state responding with the first timing adjust signal F1 which is generated after the first adjust time T1 from the arrival of the detected pulse signal. Next, the state shifting part 31 changes its holding state from the second holding state to a third holding state responding with the second timing adjust signal F2 which is generated after the second adjust time T2 (T2>T1) from the arrival of the detected pulse signal. The activation control part 32 produces the three-phase low-side activation control signals and the three-phase high-side activation control signals responding with the holding state of the state shifting part 31, and controls the active periods of the three low-side power transistors and the three high-side power transistors. Hence, the active period of each of the three low-side power transistors and the three high-side power transistors is made larger than the period of an electrical angle of 360/3=120 degrees. Furthermore, the switching operation block controls the composed supply current from the voltage supplying part 25 to the three-phase windings responding with the command signal, while subjecting at least one of the three low-side power transistors and the three high-side power transistors to high-frequency switching. Hence, while controlling the composed supply current responding with the command signal by subjecting at least one power transistor to high-frequency switching, two of the three low-side power transistors or the three high-side power transistors are activated simultaneously in a period of the current path alteration operation. In other words, even when two power transistors become active simultaneously, the drive currents to the three-phase windings are controlled accurately responding with the command signal. Thus, the current path alteration operation becomes smooth by simultaneously making two of the power transistors active, the pulsation of the generated drive force is reduced remarkably. According to the present invention, a motor and a disk drive apparatus with high-performance, low power consumption, low disk vibration and low acoustic noise can be attained without position sensors and a speed sensor. In addition, the vibration and acoustic noise of the disk are reduced significantly, thereby making recording and reproduction on the disk stable.

Furthermore, the state shifting part 31 changes the first adjust time T1 and the second adjust time T2 responding with the time interval T0 of the detected pulse signal. Hence, even when the rotational speed of the disk changes in a wide range, each active period of the three low-side power transistors and the three high-side power transistors can be securely made larger than the period of an electrical angle of 360/3=120 degrees. In Embodiment 1, each active period of the high-side and low-side power transistors is set at about 140 degrees (130 to 150 degrees). In order to reduce vibration and acoustic noise, this active period may be made wider within a range of 125 to 180 degrees. An example wherein each active period of the power transistors changes accurately responding with the rotational speed is described in the explanations of Embodiment 1. However, the present invention is not limited to such a case.

Furthermore, one or two of the three low-side power transistors are subjected to ON-OFF high-frequency switching, thereby attaining a first switching operation wherein one power supplying terminal voltage is subjected to high-frequency switching and a second switching operation wherein two power supplying terminal voltages are subjected to high-frequency switching. The first switching operation and the second switching operation are carried out alternately responding with the rotation of the rotor 11. Since only the low-side power transistors are subjected to high-frequency switching, the power supplying terminal voltages V1, V2 and V3 are not lowered to the ground potential or less. As a result, when the low-side power transistors, the high-side power transistors and other numerous transistors and resistors are integrated into a one-chip IC on a single silicon substrate, an undesirable operation of parasitic transistors owing to the high-frequency switching of the power transistors are eliminated. The operations of the other integrated transistors are therefore not impaired. In other words, the whole operation becomes very stable. However, the present invention is not limited to this configuration. The currents supplied to the windings can be controlled by subjecting at least one of the low-side and high-side power transistors to high-frequency switching.

In Embodiment 1, the detection operation of the detected pulse signal is stopped during a first stop period including the OFF-ON change moment of a power transistor performing high-frequency switching and during a second stop period including the ON-OFF change moment thereof. During the remaining periods other than the first stop period and the second stop period, the detection operation of the detected pulse signal is carried out responding with the comparison result of the terminal voltages of the windings. This easily prevents improper detection and operation owing to a switching noise caused by the PWM switching of the power transistors. As a result, the current paths to the windings can be altered properly responding with the detected pulse signal. Hence, the rotor 11 and the disk 1 are rotated accurately. In other words, it is possible to realize a disk drive apparatus that rotates the disk 1 at high accuracy.

The voltage detecting part 30 comprises the voltage comparing part 41 and the detected pulse producing part 42 including the noise eliminating circuit 201. The noise eliminating circuit 201 composes logically the selected compared signal of the voltage comparing part 41 with the noise eliminating signal which responds with the high-frequency switching pulse signal. Hence, the output signal of the noise eliminating circuit 201 is made ineffective during the first predetermined period including the OFF-to-ON change moment of the switching pulse signal and the second predetermined period including the ON-to-OFF change moment thereof. Therefore, improper detection owing to a switching noise caused by the PWM switching can be prevented easily.

The voltage detecting part 30 includes the detected pulse producing part 42 and changes the state of its flip-flop responding with the rising or falling edge of the output signal of the noise eliminating circuit 201, thereby producing the detected pulse signal responding with the state of the flip-flop. This prevents the detected pulse signal from generating excessively, thereby making the activation control stable. In other words, the disk 1 and the rotor 11 is rotated stably. The flip-flop is reset by the third timing adjust signal F3 after the third adjust time T3 from the edge of the detected pulse signal Dt. Since the third adjust time T3 changes responding with the interval T0 between the edges of the detected pulse signal, the excessive generation of the detected pulse signal Dt can be prevented securely even when the rotational speed of the rotor 11 changes. This effect is significant during the start and acceleration of the disk 1 and the rotor 11 in particular.

In Embodiment 1, responding with the ON-OFF high-frequency switching of the low-side power transistors, one or two of the high-side power transistors in phase therewith are subjected to complementary OFF-ON high-frequency switching. This reduces the power losses of the high-side power diodes. In addition, a clearance time is provided between the ON period of the low-side power transistors and the ON period of the high-side power transistors so that the low-side power transistor and the high-side power transistor do not turn ON simultaneously. During this clearance time, the ON voltage of the high-side diode causes an adverse influence. In order to eliminate this influence, the operation for detecting the terminal voltages of the windings is stopped during the clearance time by the noise eliminating signal Wx. Furthermore, these operations are carried out responding with the single switching pulse signal, and can be attained by a very simple circuit configuration. Furthermore, in Embodiment 1, one or two of the high-side power transistors are subjected to complementary OFF-ON high-frequency switching simultaneously. However, the present invention is not limited to such a case. Only one of the high-side power transistors can be subjected to complementary OFF-ON high-frequency switching.

In the case when the high-side auxiliary signal Wj in Embodiment 1 is fixed to "L," the high-side power diodes turn ON when the low-side power transistors turn ON in high-frequency switching operation. When the voltage detecting part 30 detects the terminal voltages, improper detection may occur owing to the influence of the ON voltages of the high-side power diodes. In order to prevent improper detection of the terminal voltages of the windings due to the ON voltages of the high-side power diodes, the voltage detecting part 30 can detect the terminal voltages of the windings only during the ON periods of the low-side power transistors which perform high-frequency switching. The above-mentioned operation can be attained by changing the configuration of the PWM pulse part 502 of the switching control part 22 shown in FIG. 12 to the configuration shown in FIG. 25. This will be described below.

Figure 25:
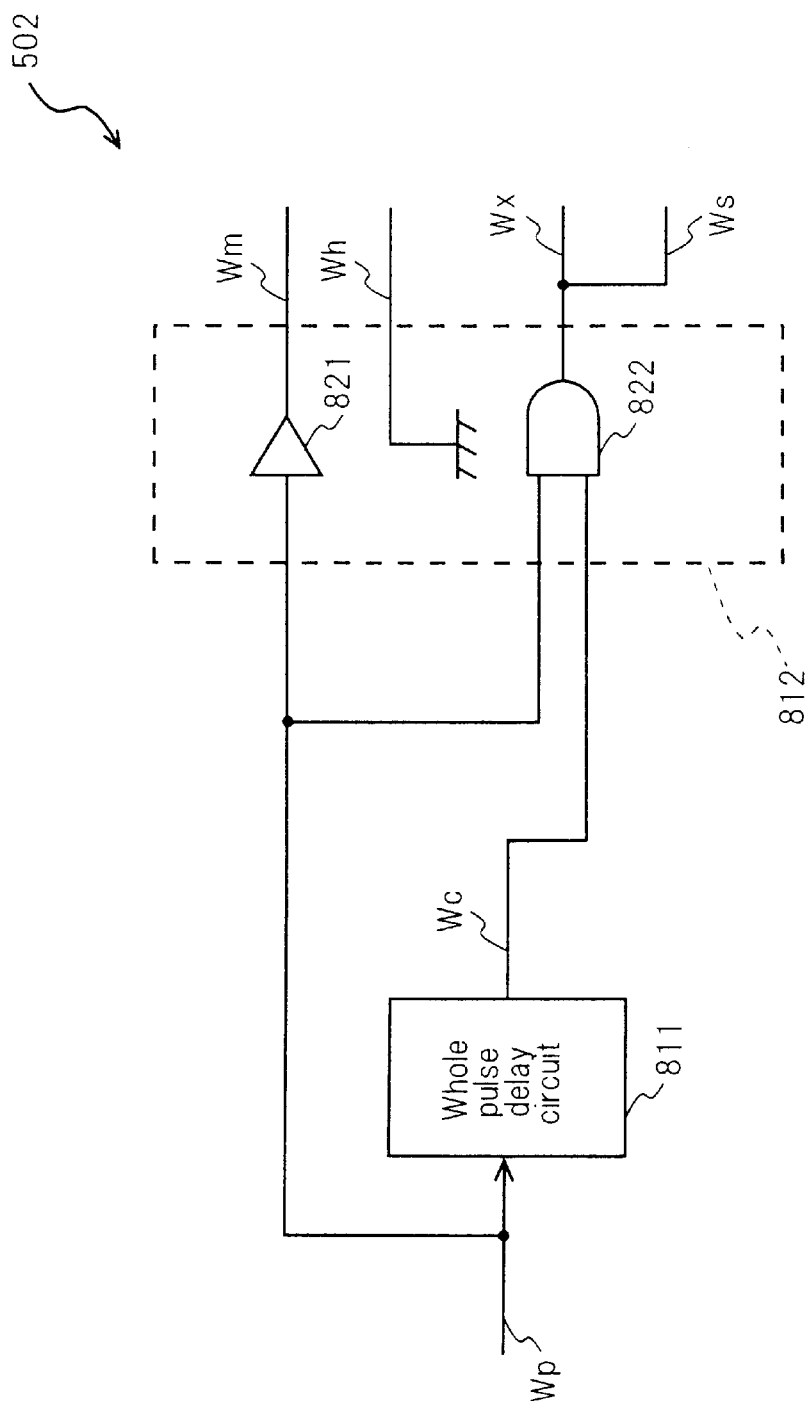
FIG. 25 is a circuit diagram showing another configuration of the PWM pulse part 502 of the switching control part 22 in accordance with Embodiment 1.
Figure 26:
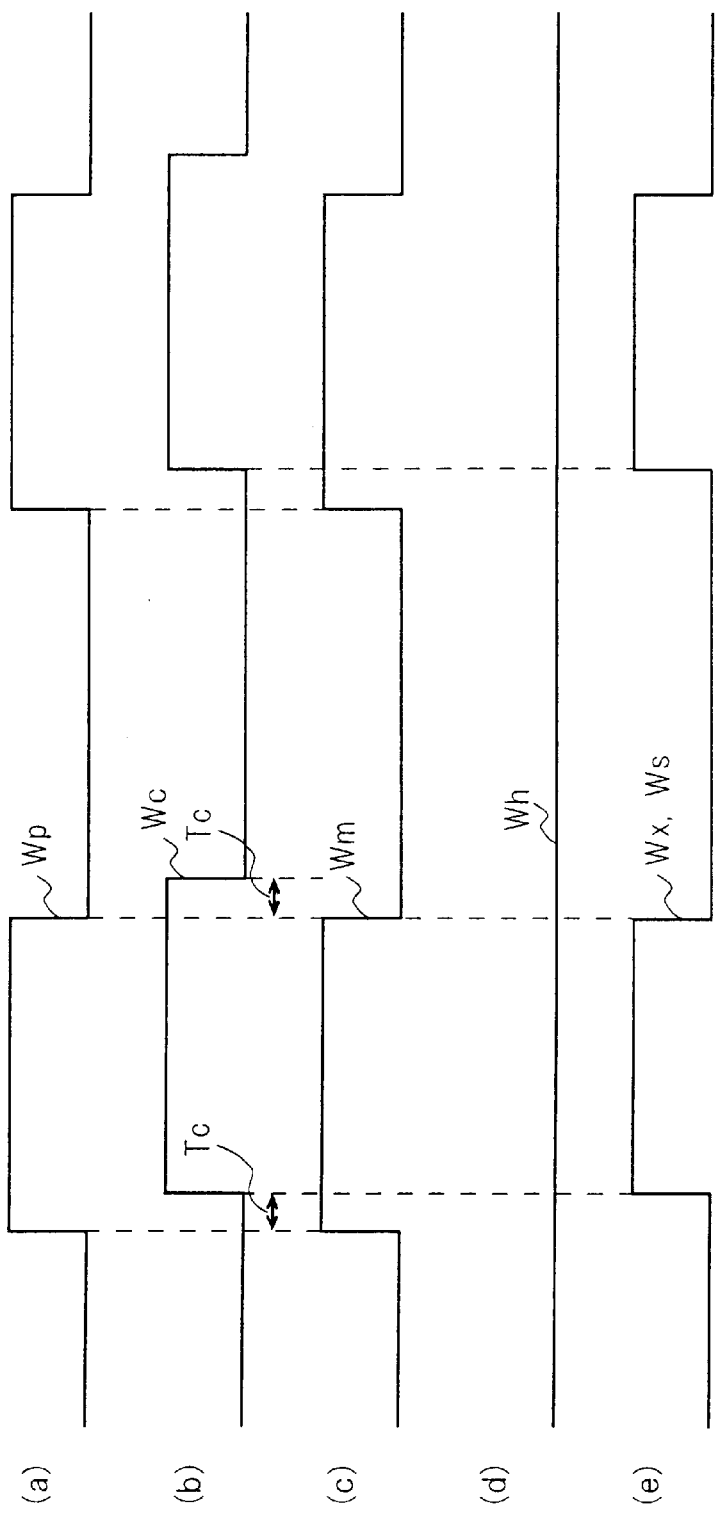
FIG. 26 is a waveform diagram illustrating the operation of the PWM pulse part 502 shown in FIG. 25 in accordance with Embodiment 1.

The PWM pulse part 502 of the switching control part 22 shown in FIG. 25 comprises a whole pulse delay circuit 811 and a logic composing output circuit 812. The whole pulse delay circuit 811 outputs a whole pulse delay signal Wc which is obtained by wholly delaying the fundamental PWM pulse signal Wp of the compare pulse part 501 (FIG. 9) by a predetermined time Tc or about Tc. The logic composing output circuit 812 logically composes the fundamental PWM pulse signal Wp and the whole pulse delay signal Wc, and outputs the main PWM pulse signal Wm, the auxiliary PWM pulse signal Wh, the noise eliminating signal Wx and the synchronous pulse signal Ws. Herein, the synchronous pulse signal Ws is made coincident with the noise eliminating signal Wx. In other words, the noise eliminating signal Wx is used as a sampling pulse signal. The parts (a) to (e) of FIG. 26 show the relationship among the waveforms of the fundamental PWM pulse signal Wp, the whole pulse delay signal Wc, the main PWM pulse signal Wm, the auxiliary PWM pulse signal Wh, the noise eliminating signal Wx and the synchronous pulse signal Ws. The abscissa of FIG. 26 represents time. The whole pulse delay signal Wc is obtained by wholly delaying the fundamental PWM pulse signal Wp by the predetermined time Tc (see the parts (a) and (b) of FIG. 26). Since the main PWM pulse signal Wm is obtained by outputting the fundamental PWM pulse signal Wp via a buffer circuit 821, the main PWM pulse signal Wm has the same waveform as that of the fundamental PWM pulse signal Wp (see the part (c) of FIG. 26). The auxiliary PWM pulse signal Wh is fixed to "L" (see the part (d) of FIG. 26). The noise eliminating signal Wx and the synchronous pulse signal Ws are obtained by logically composing the fundamental PWM pulse signal Wp and the whole pulse delay signal Wc by an AND circuit 822, and have a waveform shown in the part (e) of FIG. 26. Hence, the "L" period of the noise eliminating signal Wx includes the "L" period of the main PWM pulse signal Wm. In addition, the predetermined time Tc is provided between the "L-to-H" change of the main PWM pulse signal Wm and the "L-to-H" change of the noise eliminating signal Wx.

By using the PWM pulse part 502 of the switching control part 22, configured as shown in FIG. 25, the low-side power transistors perform ON-OFF high-frequency switching responding with the main PWM pulse signal Wm. Since the auxiliary PWM pulse signal Wh is "L," the high-side power transistors do not perform high-frequency switching. During the "L" period of the noise eliminating signal Wx, the voltage detecting part 30 stops the operation for detecting the terminal voltages of the windings. Furthermore, during the "H" period of the synchronous pulse signal Ws, the phase detecting part 36 samples the sample voltage responding with the voltage difference between one of the power supplying terminal voltages and the common terminal voltage of the three-phase windings. Hence, the phase detecting part 36 performs sampling while the power transistors are ON. The phase detecting part 36 produces the slant voltage signal by adding a voltage slant to the sample voltage, compares the slant voltage signal with a predetermined reference voltage, and produces the phase pulse signal. Still further, during the predetermined time Tc including the OFF-ON change moment of the power transistors, the voltage detecting part 30 stops the operation for detecting the terminal voltages of the windings. The voltage detecting part 30 detects the detected pulse signal directly responding with the result of the comparison of the terminal voltages of the windings during the ON operation of the power transistors after the lapse of the predetermined time Tc. Hence, improper detection and operation owing to a switching noise caused by the PWM switching of the power transistors can be prevented at the phase detecting part 36 and the voltage detecting part 30.

Figure 27:
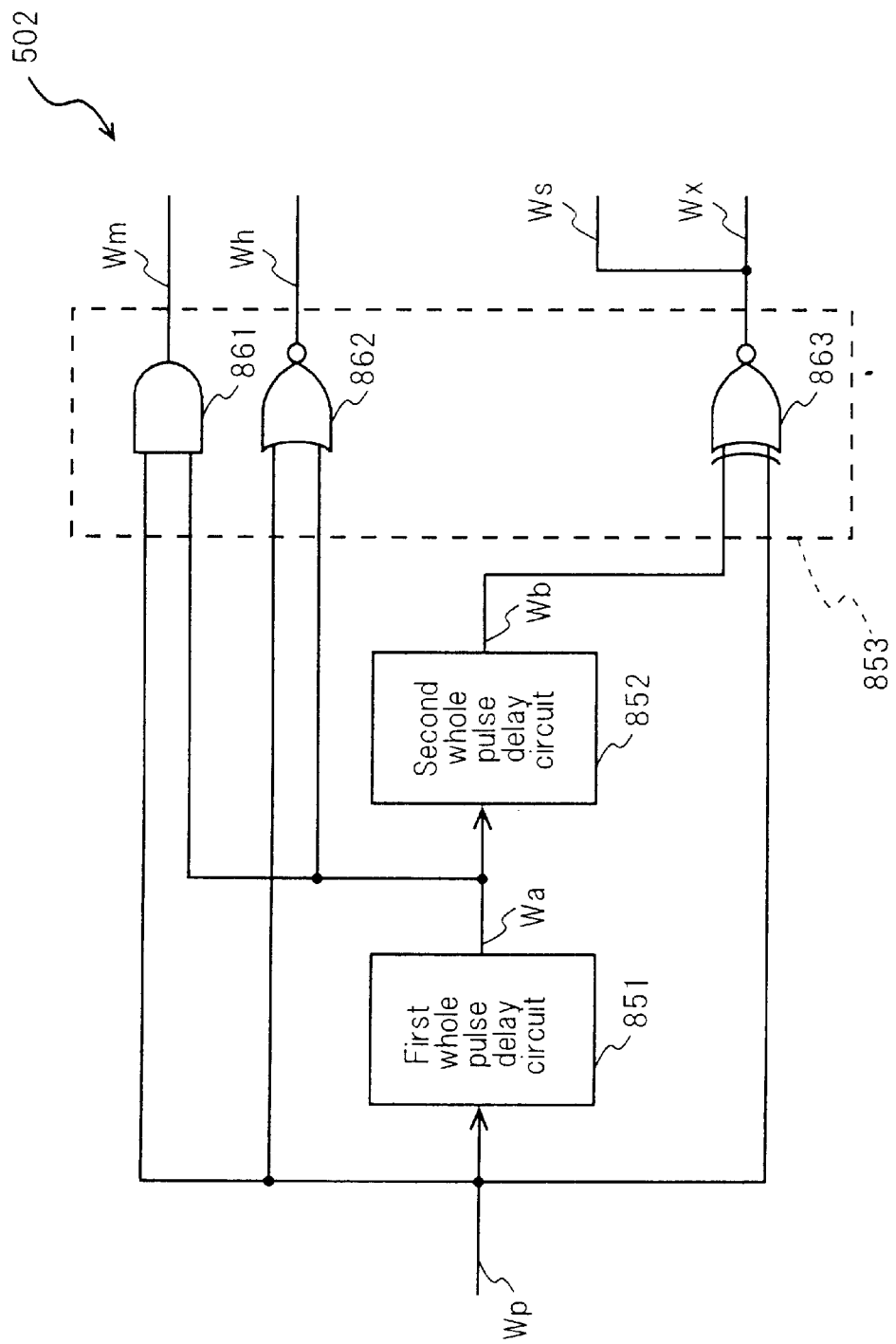
FIG. 27 is a circuit diagram showing still another configuration of the PWM pulse part 502 of the switching control part 22 in accordance with Embodiment 1.

Furthermore, the PWM pulse part 502 of the switching control part 22 shown in FIG. 12 can also be replaced with a configuration shown in FIG. 27. This will be described below.

Figure 28:
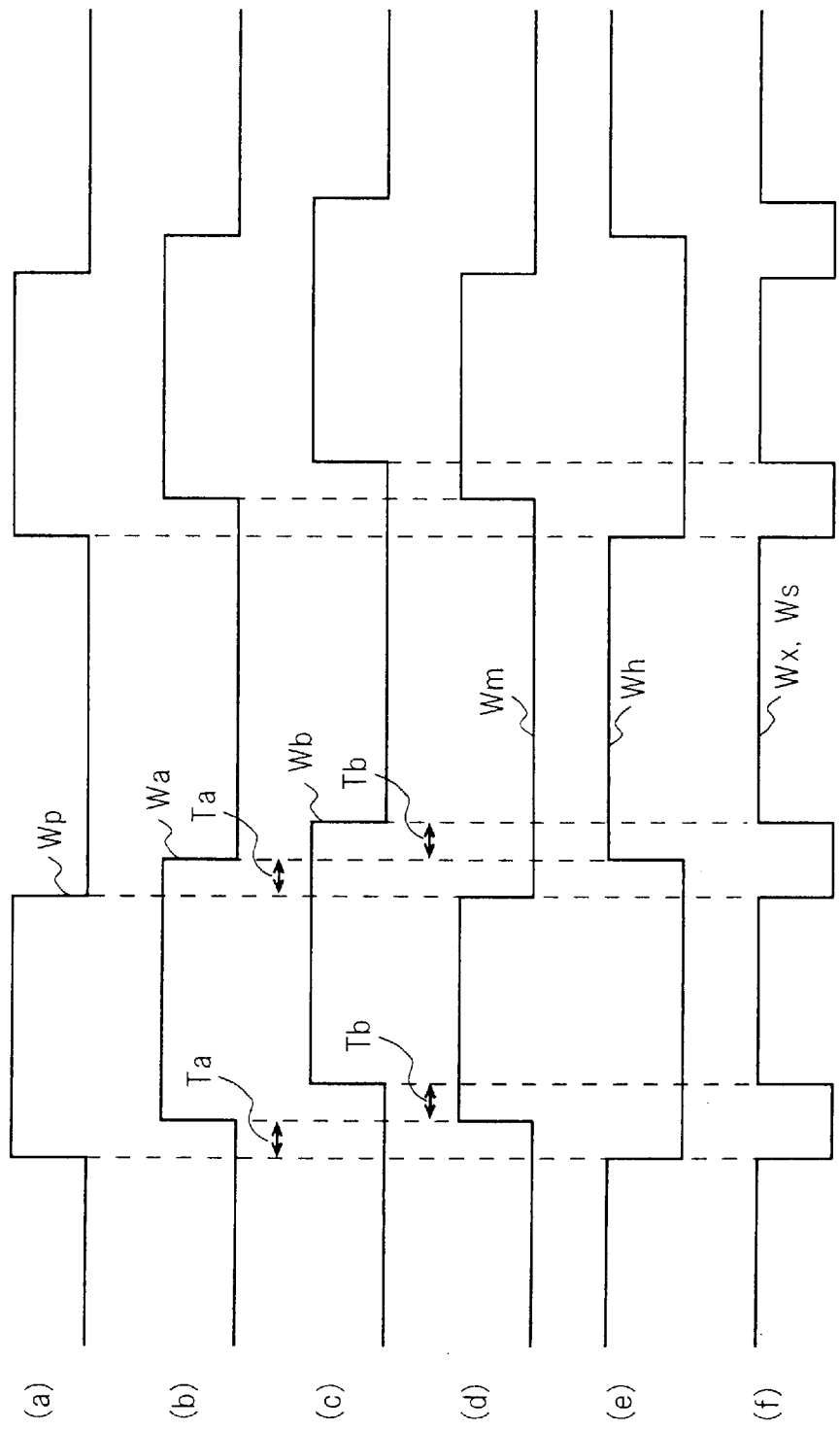
FIG. 28 is a waveform diagram illustrating the operation of the PWM pulse part 502 shown in FIG. 27 in accordance with Embodiment 1.

The PWM pulse part 502 of the switching control part 22 shown in FIG. 27 comprises a first whole pulse delay circuit 851, a second whole pulse delay circuit 852 and a logic composing output circuit 853. The first whole pulse delay circuit 851 outputs a first whole pulse delay signal Wa which is obtained by wholly delaying the fundamental PWM pulse signal Wp of the compare pulse part 501 by a first predetermined time Ta or about Ta. The second whole pulse delay circuit 852 outputs a second whole pulse delay signal Wb which is obtained by wholly delaying the first whole pulse delay signal Wa by a second predetermined time Tb or about Tb. The logic composing output circuit 853 logically composes the fundamental PWM pulse signal Wp, the first whole pulse delay signal Wa and the second whole pulse delay signal Wb, and outputs the main PWM pulse signal Wm, the auxiliary PWM pulse signal Wh, the noise eliminating signal Wx and the synchronous pulse signal Ws. Herein, the synchronous pulse signal Ws is coincident with the noise eliminating signal Wx. The parts (a) to (f) of FIG. 28 show the relationship among the waveforms of the fundamental PWM pulse signal Wp, the first whole pulse delay signal Wa, the second whole pulse delay signal Wb, the main PWM pulse signal Wm, the auxiliary PWM pulse signal Wh, the noise eliminating signal Wx and the synchronous pulse signal Ws. Herein, the abscissa of FIG. 28 represents time. The first whole pulse delay signal Wa is obtained by wholly delaying the fundamental PWM pulse signal Wp by the first predetermined time Ta. The second whole pulse delay signal Wb is obtained by wholly delaying the first whole pulse delay signal Wa by the second predetermined time Tb (see the parts (a) to (c) of FIG. 28). The main PWM pulse signal Wm is obtained by outputting the fundamental PWM pulse signal Wp and the first whole pulse delay signal Wa via an AND circuit 861, and has a waveform shown in the part (d) of FIG. 28. The auxiliary PWM pulse signal Wh is obtained by logically composing the fundamental PWM pulse signal Wp and the first whole pulse delay signal Wa via a NOR circuit 862, and has a waveform shown in the part (e) of FIG. 28. Still further, the "H" period of the auxiliary PWM pulse signal Wh is within the "L" period of the main PWM pulse signal Wm, whereby the main PWM pulse signal Wm and the auxiliary PWM pulse signal Wh do not become "H" simultaneously. In other words, the first predetermined time Ta is provided between the "H" period of the auxiliary PWM pulse signal Wh and the "H" period of the main PWM pulse signal Wm. The noise eliminating signal Wx and the synchronous pulse signal Ws are obtained by logically composing the fundamental PWM pulse signal Wp and the second whole pulse delay signal Wb via an exclusive NOR circuit 863, and has a waveform shown in the part (f) of FIG. 28. The "L" period of the noise eliminating signal Wx includes the change moment of the main PWM pulse signal Wm, and has at least the predetermined time Tb from the change moment. In addition, the "L" period of the noise eliminating signal Wx includes the change moment of the auxiliary PWM pulse signal Wh, and has at least the predetermined time Tb from the change moment. The noise eliminating signal Wx is input to the noise eliminating circuit 201 of the detected pulse producing part 42 of the voltage detecting part 30. The noise eliminating circuit 201 eliminates a switching noise owing to the high-frequency switching of the power transistors.

The "H" period of the synchronous pulse signal Ws does not include the change moments of the main PWM pulse signal Wm and the auxiliary PWM pulse signal Wh. The phase detecting part 36 samples the sample voltage responding with the voltage difference between one of the power supplying terminal voltages and the common terminal voltage of the three-phase windings by the synchronous pulse signal Ws. Since the phase detecting part 36 also detects the sample voltage even during the OFF period of the power transistors performing high-frequency switching, the sample voltage is less affected by the influence of the high-frequency switching, although the accuracy of the detection becomes slightly low. Furthermore, the phase detecting part 36 charges the capacitor in the "L" period of the synchronous pulse signal Ws by a required charge current, thereby producing the slant voltage signal having an adequate voltage slant.

EMBODIMENT 2

Figure 29:
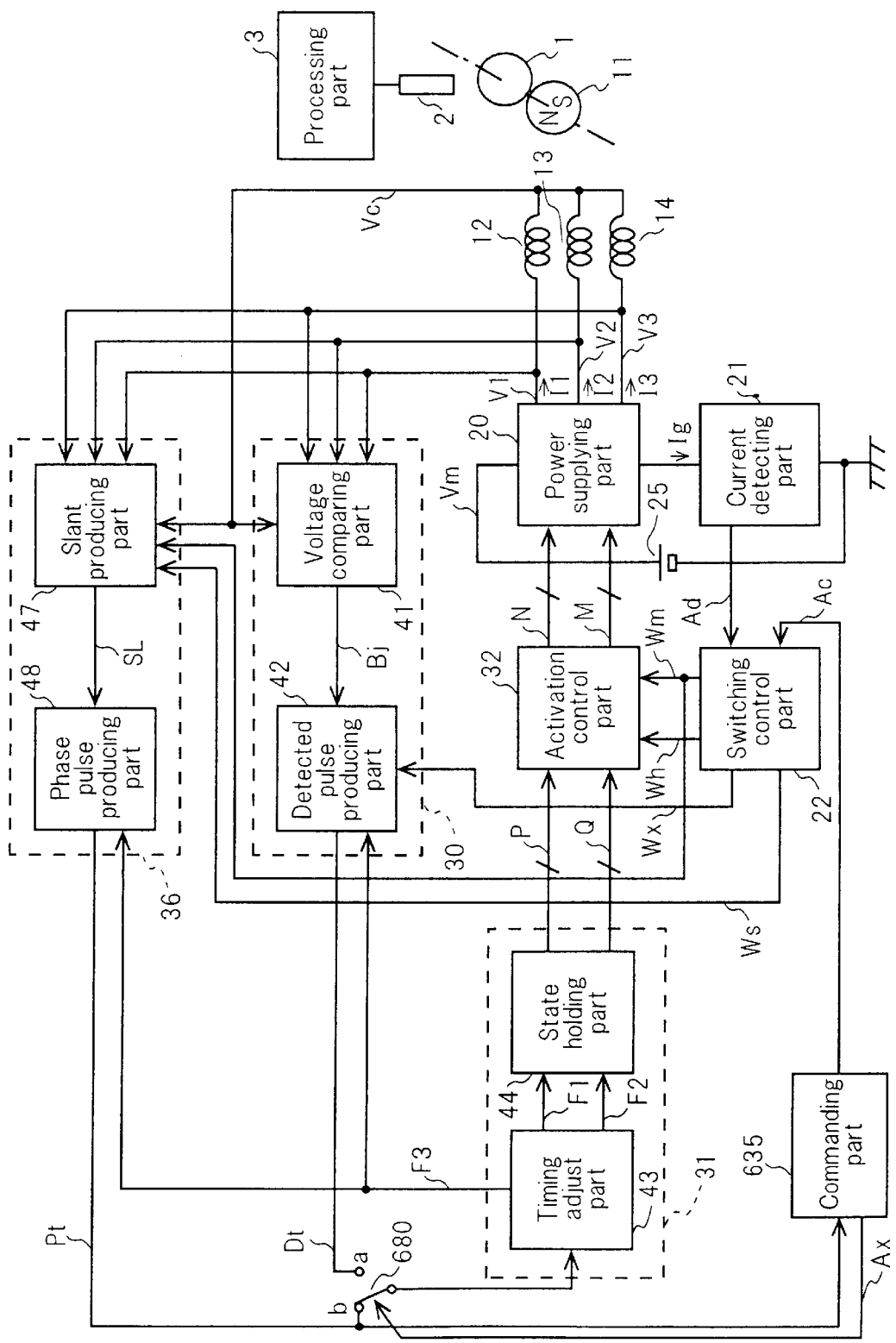
FIG. 29 is a block diagram showing the configuration of a motor and a disk drive apparatus in accordance with Embodiment 2 of the present invention.

FIG. 29 shows a motor and a disk drive apparatus including the motor in accordance with Embodiment 2 of the present invention. FIG. 29 is a block diagram showing the configuration of Embodiment 2. The phase pulse signal Pt of the phase detecting part 36 is also used as the input signal to the state shifting part 31. The components in accordance with Embodiment 2 similar to those in accordance with the above-mentioned Embodiment 1 are designated by the same numerals, and their explanations are omitted.

A commanding part 635 detects the rotational speed of the disk 1 and the rotor 11 by the phase pulse signal Pt of the phase detecting part 36. The commanding part 635 outputs the command signal Ac and a change switch signal Ax responding with the rotational speed of the disk 1 and the rotor 11. A change switch part 680 switches its connection responding with the change switch signal Ax. When the rotational speed of the rotor 11 is lower than a predetermined value, the commanding part 635 sets the change switch signal Ax to "L." The change switch part 680 is connected to its contact a responding with the change switch signal Ax, and the detected pulse signal Dt of the voltage detecting part 30 is input to the state shifting part 31. When the rotational speed of the rotor 11 becomes higher than the predetermined value, the commanding part 635 sets the change switch signal Ax at "H." The change switch part 680 is connected to its contact b responding with the change switch signal Ax, and the phase pulse signal Pt of the phase detecting part 36 is input to the state shifting part 31.

Hence, when the rotational speed of the disk 1 and the rotor 11 is smaller than the predetermined value (Ax="L"), activation to the three-phase windings 12, 13 and 14 is carried out responding with the detected pulse signal Dt of the voltage detecting part 30. This configuration is the same as that of the above-mentioned Embodiment 1, and its explanation is omitted.

When the rotational speed of the disk 1 and the rotor 11 is controlled at the aimed rotational speed larger than the predetermined rotational speed (Ax="H"), activation to the three-phase windings 12, 13 and 14 is carried out responding with the phase pulse signal Pt of the phase detecting part 36. Hence, the voltage detecting part 30 is unnecessary in this operation mode. The timing adjusting part 43 of the state shifting part 31 produces the first timing adjust signal F1, the second timing adjust signal F2 and the third timing adjust signal F3 responding with the phase pulse signal Pt. In other words, the first timing adjust signal F1 is output after the delay of the first adjust time T1 from the arrival of the phase pulse signal Pt. The second timing adjust signal F2 is output after the delay of the second adjust time T2 from the arrival of the phase pulse signal Pt. The third timing adjust signal F3 is output after the delay of the third adjust time T3 from the arrival of the phase pulse signal Pt. The first adjust time T1, the second adjust time T2 and the third adjust time T3 are proportional or nearly proportional to the time interval T0 between successive two of the detecting edges of the phase pulse signal Pt. In addition, the adjust times are set so as to have a relationship of T1<T2<T3<T0.

The configurations of the state holding part 44 of the state shifting part 31, the activation control part 32, the power supplying part 20, the current detecting part 21 and the switching control part 22 in the Embodiment 2 are similar to those in the above-mentioned Embodiment 1. So, the detailed explanation to their operations is omitted.

In Embodiment 2, the current paths to the windings are altered responding with the phase pulse signal of the phase detecting part. The phase detecting part produces the phase pulse signal which accurately corresponds to the rotation phase of the rotor 11 responding with the voltage difference between one of the power supplying terminal voltages and the common terminal voltage of the windings. Hence, the activation to the three-phase windings can be changed accurately responding with the phase pulse signal. As a result, the pulsation of the generated drive force becomes smaller, and accurate disk rotation can be attained.

Furthermore, Embodiment 2 can also have many advantages similar to those of the above-mentioned Embodiment 1.

EMBODIMENT 3

Figure 30:
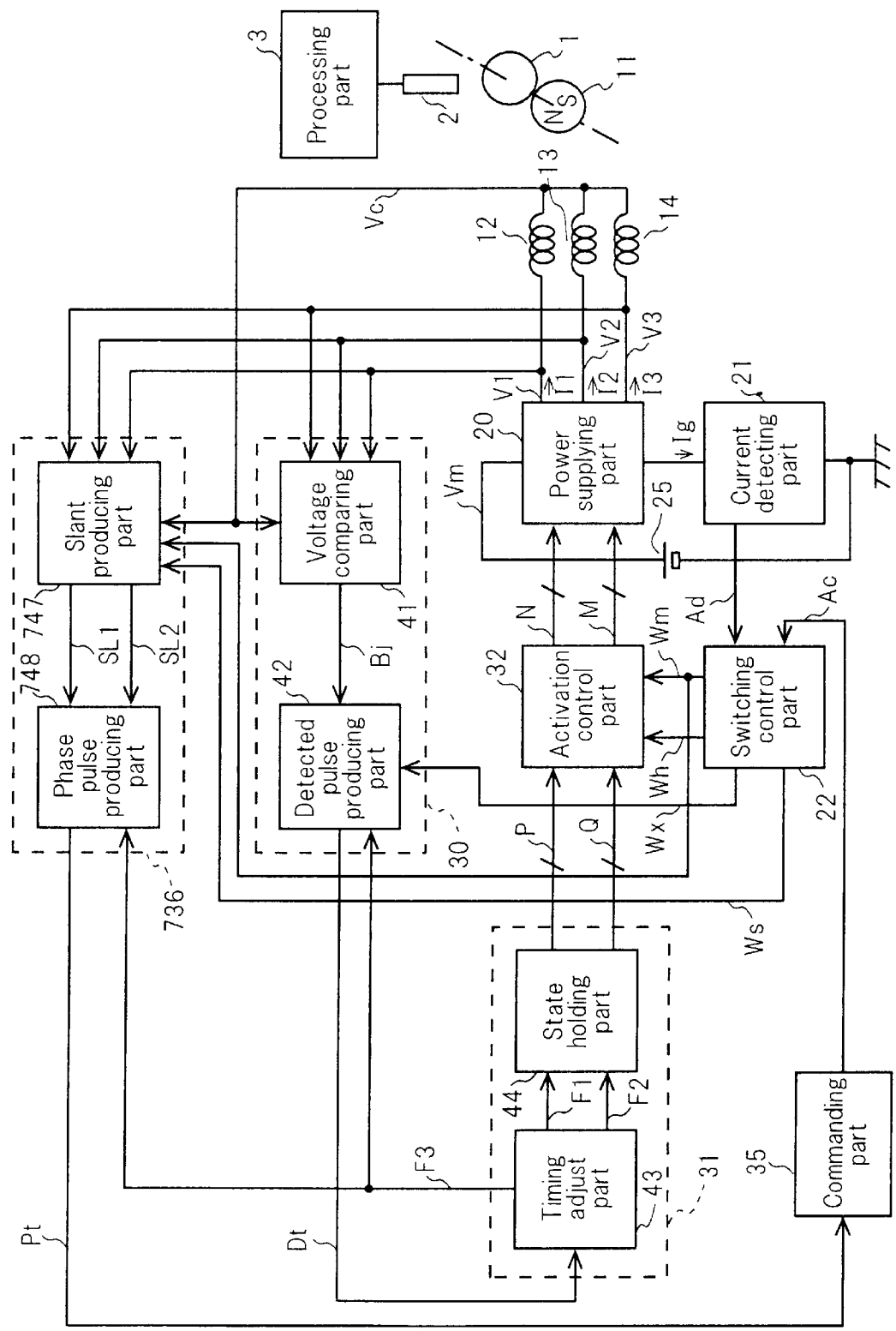
FIG. 30 is a block diagram showing the configuration of a motor and a disk drive apparatus in accordance with Embodiment 3 of the present invention.
Figure 31:
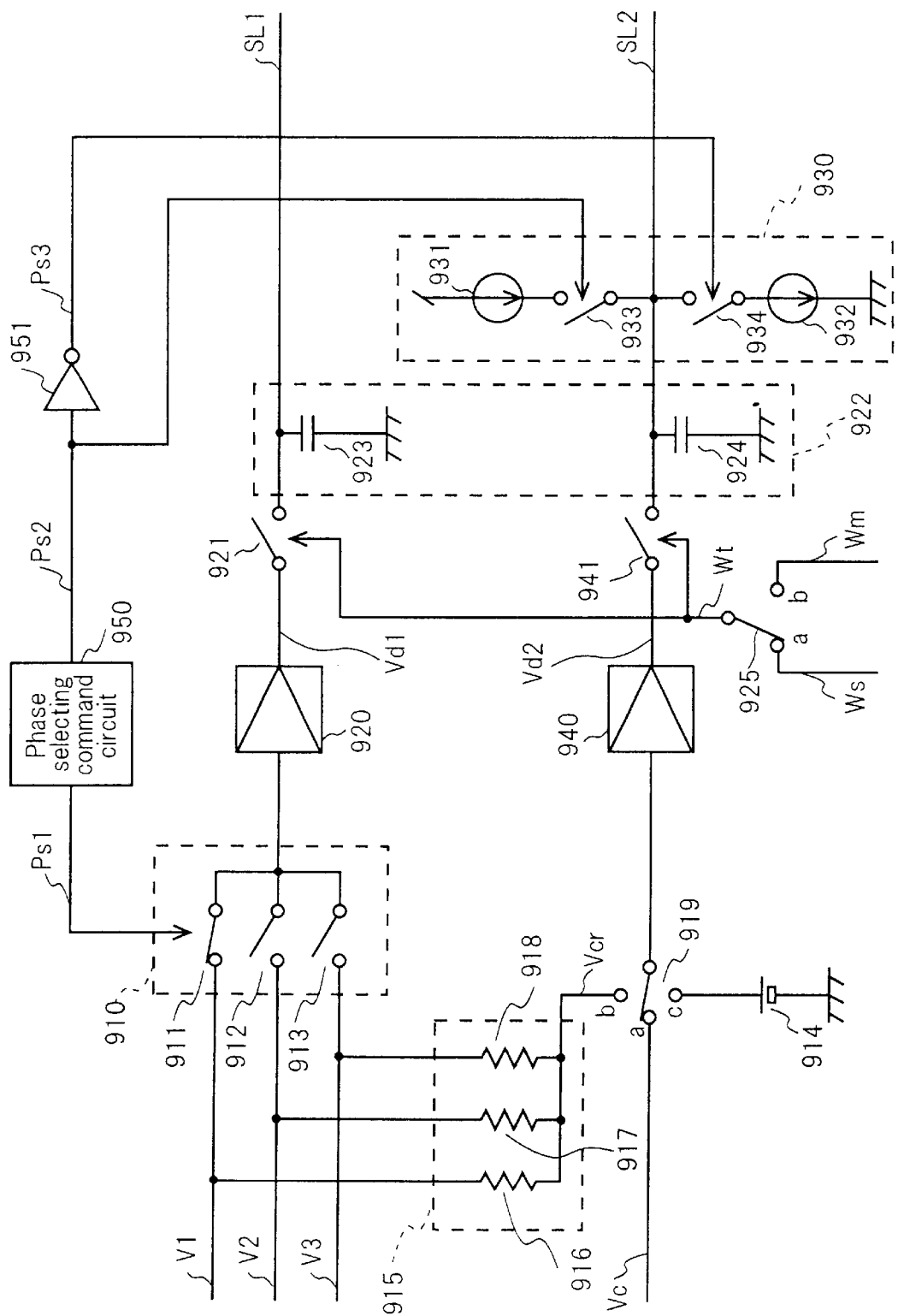
FIG. 31 is a circuit diagram showing the slant producing part 747 of a phase detecting part 736 in accordance with Embodiment 3.
Figure 32:
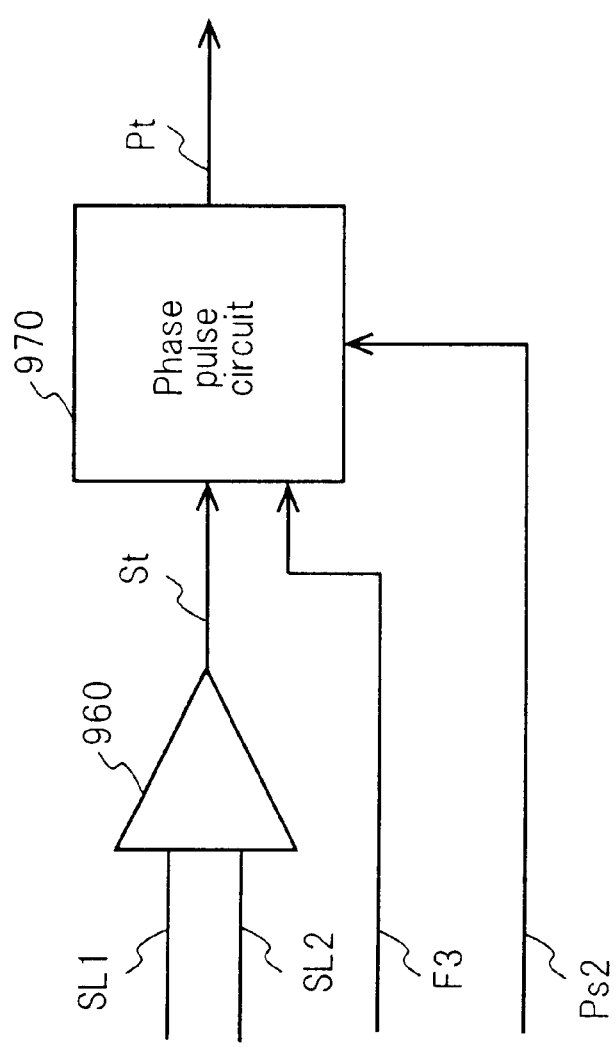
FIG. 32 is a circuit diagram showing the phase pulse producing part 748 of the phase detecting part 736 in accordance with Embodiment 3.

FIG. 30 to FIG. 32 show a motor and a disk drive apparatus including the motor in accordance with Embodiment 2 of the present invention. FIG. 30 is a block diagram showing the configuration of Embodiment 3. A phase detecting part 736 in Embodiment 3 is modified from the configuration of the phase detecting part 36 in the above-mentioned Embodiment 1. The components in accordance with Embodiment 3 similar to those in accordance with the above-mentioned Embodiment 1 are designated by the same numerals, and their explanations are omitted.

The phase detecting part 736 shown in FIG. 30 comprises a slant producing part 747 and a phase pulse producing part 748. The slant producing part 747 obtains a first sample voltage which intermittently responds with one of the power supplying terminal voltages V1, V2 and V3 of the three-phase windings 12, 13 and 14 at a terminal of a first capacitor. The slant producing part 747 outputs a first output signal SL1 responding with the first sample voltage. The slant producing part 747 obtains a second sample voltage which intermittently responds with the common terminal voltage Vc of the three-phase windings 12, 13 and 14 at a terminal of a second capacitor. The slant producing part 747 outputs a second output signal SL2 which is obtained by adding a voltage slant to the second sample voltage. The phase pulse producing part 748 compares the first output signal SL1 and the second output signal SL2 of the slant producing part 747, and outputs the phase pulse signal Pt responding with the result of the comparison. FIG. 31 shows a configuration of the slant producing part 747, and FIG. 32 shows a configuration of the phase pulse producing part 748.

The switch circuits 911, 912 and 913 of the signal selecting circuit 910 of the slant producing part 747 shown in FIG. 31 selects one of the power supplying terminal voltages V1, V2 and V3 of the three-phase windings 12, 13 and 14 responding with the phase selecting command signal Ps1 of a phase selecting command circuit 950, and outputs the voltage to a first analog buffer circuit 920. The phase selecting command circuit 950 outputs the phase selecting command signal Ps1 and the first polarity selecting signal Ps2 responding with the holding state of the state holding part 44 of the state shifting part 31 of the activation operation block. A switch circuit 919 selects the common terminal voltage Vc or the composed common terminal voltage Vcr of a voltage composing circuit 915 (or the reference voltage of a reference voltage source 914), and outputs one of the voltages to a second analog buffer circuit 940. Herein, a case wherein the switch circuit 919 has selected the common terminal voltage Vc will be described. The first analog buffer circuit 920 outputs a voltage signal Vd1 responding with one of the power supplying terminal voltages V1, V2 and V3 of the three-phase windings, and the second analog buffer circuit 940 outputs a voltage signal Vd2 responding with the common terminal voltage Vc of the three-phase windings.

A switch circuit 925 selects the synchronous pulse signal Ws or the main PWM pulse signal Wm, and outputs the selected signal as the sampling pulse signal Wt. Herein, a case wherein the switch circuit 925 has selected the synchronous pulse signal Ws will be explained. A first sampling switch circuit 921 and a second sampling switch circuit 941 turn ON (closed) when the sampling pulse signal Wt is "H," and turn OFF (open) when the sampling pulse signal Wt is "L." A capacitor circuit 922 comprises a first capacitor 923 and a second capacitor 924. When the first sampling switch circuit 921 turns ON, the capacitor circuit 922 samples the output voltage Vd1 of the first analog buffer circuit 920 as a first sample voltage at a terminal (or across the terminals) of the first capacitor 923. When the second sampling switch circuit 941 turns ON, the capacitor circuit 922 samples the output voltage Vd2 of the second analog buffer circuit 940 as a second sample voltage at a terminal (or across the terminals) of the second capacitor 924.

A charge circuit 930 comprises a high-side current source circuit 931, a low-side current source circuit 932, a high-side switch circuit 933 and a low-side switch circuit 934. The phase selecting command circuit 950 outputs the first polarity selecting signal Ps2. An inverter circuit 951 inverts the first polarity selecting signal Ps2 and outputs the inverted signal as the second polarity selecting signal Ps3. When the first polarity selecting signal Ps2 becomes "H," the high-side switch circuit 933 of the charge circuit 930 turns ON. The high-side current source circuit 931 supplies a charge current to the second capacitor 924 of the capacitor circuit 922 and charges the second capacitor 924 (the charging is performed so as to increase the second output signal SL2). When the second polarity selecting signal Ps3 becomes "H," the low-side switch circuit 934 of the charge circuit 930 turns ON. The low-side current source circuit 932 supplies a charge current to the second capacitor 924 of the capacitor circuit 922 and charges the second capacitor 924 (the charging is performed so as to decrease the second output signal SL2). Hence, the second output signal SL2 has a voltage slant in a triangular waveform. The capacitor circuit 922 produces the first output signal SL1 across the terminals of the first capacitor 923 and also produces the second output signal SL2 across the terminals of the second capacitor 924. The charge currents of the high-side and low-side current source circuits 931 and 932 of the charge circuit 930, each of which occasionally charges the second capacitor 924 of the capacitor circuit 922, are proportional or nearly proportional to the aimed rotational speed of the disk 1 and the rotor 11 of the commanding part 35. This changes the voltage slant of the second output signal SL2 responding with the aimed rotational speed of the commanding part 35.

The phase pulse producing part 748 shown in FIG. 32 comprises a comparator circuit 960 and a phase pulse circuit 970. The comparator circuit 960 compares the first output signal SL1 with the second output signal SL2 of the slant producing part 747, and outputs the compared signal St responding with the result of the comparison. The phase pulse circuit 970 produces a polarity selecting comparison signal which is obtained by inverting or noninverting the compared signal St of the comparator circuit 960 responding with the first polarity selecting signal Ps2. The phase pulse circuit 970 includes a flip-flop circuit. The phase pulse circuit 970 resets its flip-flop circuit at the arrival of the third timing adjust signal F3 of the timing adjusting part 43, and sets the flip-flop circuit at the arrival of the polarity selecting comparison signal. The phase pulse circuit 670 outputs the phase pulse signal Pt responding with the state of this flip-flop circuit. Hence, the change timing of the phase pulse signal Pt corresponds to an accurate electrical phase responding with the counter electromotive force of the winding to be detected. Therefore, the phase pulse signal Pt of the phase detecting part 736 generates its detecting edges responding with the terminal voltages of the windings more accurately than the detected pulse signal Dt of the voltage detecting part 30.

The configurations of the voltage detecting part 30, the state shifting part 31, the activation control part 32, the power supplying part 20, the current detecting part 21 and the switching control part 22 in accordance with Embodiment 3 are similar to those in Embodiment 1. So the detailed explanation to their operations is omitted.

In Embodiment 3, the terminal voltages of the windings are detected so as to alter the current paths, thereby making position sensors unnecessary. Furthermore, the power transistors that supply bi-directional drive currents to the windings are subjected to ON-OFF high-frequency switching, thereby reducing power losses significantly. Hence, heat generation of the motor and the disk drive apparatus is reduced remarkably, and the disk drive apparatus can stably record and/or reproduce a signal on/from a high-density disk or a recordable disk.

In Embodiment 3, the phase detecting part 736 produces the phase pulse signal Pt so as to detect the rotational speed of the disk 1 and the rotor 11. The slant producing part 747 samples the second sample voltage intermittently responding with the common terminal voltage Vc of the three-phase windings at a terminal (or across the terminals) of the second capacitor 924, and charges the second capacitor 924 by a predetermined current. As a result, the slant producing part 747 produces the second output signal SL2 having a voltage slant in a triangular waveform. The common terminal voltage Vc has an intermediate potential on average regardless of the rotational position of the rotor 11. Hence, the voltage slant in the triangular waveform can be produced easily across the terminals of the second capacitor after the second sample voltage is sampled. The slant producing part 747 selects one of the power supplying terminal voltages of the three-phase windings responding with the operation of the activation operation block, and samples the first sample voltage, which intermittently responds with the selected power supplying terminal voltage, at a terminal (or across the terminals) of the first capacitor. The slant producing part 747 outputs the first sample voltage as the first output signal SL1. Since the phase pulse producing part 748 compares the first output signal SL1 with the second output signal SL2 of the slant producing part 747, it can produce the phase pulse signal Pt at accurate timing. The commanding part 35 detects the rotational speed of the disk 1 and the rotor 11 by the phase pulse signal Pt, and outputs the command signal Ac responding with the phase pulse signal Pt. As a result, even when the power transistors perform high-frequency switching, the rotational speed of the disk 1 can be controlled at high accuracy by using the phase pulse signal Pt. Hence, a high-performance disk drive apparatus capable of recording and/or reproducing a signal on/from a high-density disk with a reduced jitter can be realized without position sensors and a speed sensor. The charge currents of the high-side and low-side current source circuits 931 and 932 of the charge circuit 930 are changed so as to be proportional or nearly proportional to the aimed rotational speed of the disk 1 and the rotor 11 of the commanding part 35. The voltage slant of the second output signal SL2 is changed adequately responding with the aimed rotational speed of the commanding part 35. So the phase pulse signal Pt of the phase detecting part 736 is detected at accurate timing, even when the aimed speed of the commanding part 35 is changed responding with the position of the head 2.

Furthermore, Embodiment 3 can also have many advantages similar to those of the above-mentioned Embodiment 1.

EMBODIMENT 4

Figure 33:
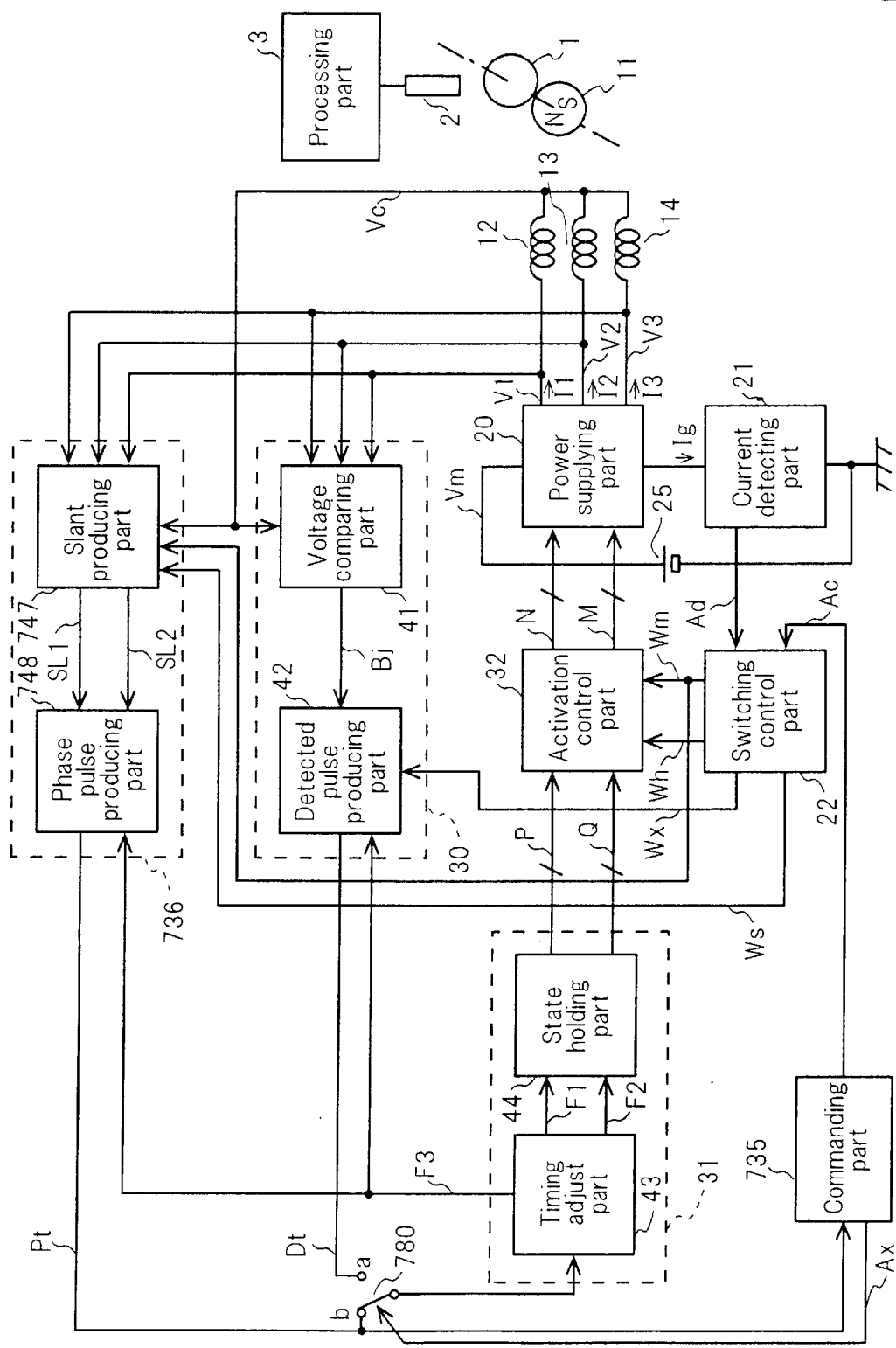
FIG. 33 is a block diagram showing the configuration of a motor and a disk drive apparatus in accordance with Embodiment 4 of the present invention.

FIG. 33 shows a motor and a disk drive apparatus including the motor in accordance with Embodiment 4 of the present invention. FIG. 33 is a block diagram showing the configuration of Embodiment 4. The phase pulse signal Pt of the phase detecting part 736 is also used as the input signal to the state shifting part 31. The components in accordance with Embodiment 4 similar to those in accordance with the above-mentioned Embodiment 1, Embodiment 2 and Embodiment 3 are designated by the same numerals, and their explanations are omitted.

A commanding part 735 detects the rotational speed of the disk 1 and the rotor 11 by the phase pulse signal Pt of the phase detecting part 736. The commanding part 735 outputs the command signal Ac and a change switch signal Ax responding with the rotational speed of the disk 1 and the rotor 11. A change switch part 780 switches its connection responding with the change switch signal Ax. The commanding part 735 sets the change switch signal Ax to "L" when the command signal Ac is smaller than a predetermined value. The change switch part 780 is connected to its contact a responding with the change switch signal Ax, and the detected pulse signal Dt of the voltage detecting part 30 is input to the state shifting part 31. When the command signal Ac becomes larger than the predetermined value, the commanding part 735 sets the change switch signal Ax at "H." The change switch part 780_is connected to its contact b, and the phase pulse signal Pt of the phase detecting part 736 is input to the state shifting part 31.

Hence, when the rotational speed of the disk 1 and the rotor 11 is smaller than the predetermined value (Ax="L"), activation to the three-phase windings 12, 13 and 14 is carried out responding with the detected pulse signal Dt of the voltage detecting part 30. This configuration is the same as that of the above-mentioned Embodiment 3, and its explanation is omitted in the description of Embodiment 4.

When the rotational speed of the disk 1 and the rotor 11 is controlled at the aimed rotational speed larger than the predetermined rotational speed (Ax="H"), activation to the three-phase windings 12, 13 and 14 is carried out responding with the phase pulse signal Pt of the phase detecting part 736. Hence, the voltage detecting part 30 is unnecessary in this operation mode. The timing adjusting part 43 of the state shifting part 31 produces the first timing adjust signal F1, the second timing adjust signal F2 and the third timing adjust signal F3 responding with the phase pulse signal Pt. In other words, the first timing adjust signal F1 is output after the delay of the first adjust time T1 from the arrival of the phase pulse signal Pt. The second timing adjust signal F2 is output after the delay of the second adjust time T2 from the arrival of the phase pulse signal Pt. The third timing adjust signal F3 is output after the delay of the third adjust time T3 from the arrival of the phase pulse signal Pt. The first adjust time T1, the second adjust time T2 and the third adjust time T3 are proportional or nearly proportional to the time interval T0 between successive two of the detecting edges of the phase pulse signal Pt. In addition, the adjust times are set so as to have a relationship of T1<T2<T3<T0.

The configurations of the state holding part 44 of the state shifting part 31, the activation control part 32, the power supplying part 20, the current detecting part 21 and the switching control part 22 in the Embodiment 4 are similar to those in the above-mentioned Embodiment 1. So the detailed explanation to their operations is omitted. Furthermore, the configuration of the phase detecting part 736 is similar to that of the corresponding component in the above-mentioned Embodiment 3, and the detailed explanation is omitted.

In Embodiment 4, the current paths to the windings are altered responding with the phase pulse signal of the phase detecting part 736. The phase detecting part 736 produces accurately the phase pulse signal which corresponds to the rotation phase of the rotor 11. Hence, the activation to the three-phase windings can be carried out accurately responding with the phase pulse signal Pt. As a result, the pulsation of the generated drive force becomes smaller, and accurate disk rotation can be attained.

Furthermore, Embodiment 4 can also have many advantages similar to those of the above-mentioned Embodiment 1, Embodiment 2 and Embodiment 3.

The configuration of each of the above-mentioned embodiments can be modified variously. For example, each of the three-phase windings can be formed by connecting a number of winding portions in series or parallel. The connection of the three-phase windings is not limited to star connection, but delta connection can be used. The number of the phases of the windings is not limited to three. Generally, it is possible to realize a configuration having windings with a number of phases. In addition, the number of the magnetic poles in the field part of the rotor is not limited to two, but the field part can have two or more poles.

In addition, in each of the above-mentioned embodiments, NMOS-FET power transistors are used for the power transistors of the power supplying part to carry out high-frequency switching easily. With this configuration, the power losses and heat generation of the power transistors are remarkably reduced, whereby the power transistors can be formed into an IC easily. However, the present invention is not limited to such a configuration, but power transistors having various types of configurations can be used. For example, IGBT transistors (a kind of an FET transistor) or bipolar-transistors can be used for the power transistors. Furthermore, the power transistors of the power supplying part should only perform high-frequency switching between the ON (full-ON or half-ON) and OFF states thereof.

Still further, in each of the above-mentioned embodiments, only the low-side power transistors are subjected to high-frequency switching. However, the present invention is not limited to such an operation. The high-side power transistors can be subjected to high-frequency switching, or the low-side power transistors and the high-side power transistors can be subjected to high-frequency switching alternately. In addition, in the above-mentioned embodiments, the three low-side power transistors or the three high-side power transistors are subjected to high-frequency switching simultaneously responding with a single switching pulse signal, whereby the switching is carried out by using a simple configuration. However, the present invention is not limited to such a configuration, but the configuration can be modified variously. For example, a number of power transistors can-be subjected to three-phase switching responding with three-phase switching pulse signals.

Furthermore, in each of the above-mentioned embodiments, the current detecting part is configured simply by using a single current detecting resistor. However, the present invention is not limited to such a configuration, but various current detecting methods can be used. For example, the present invention is not limited to the detection of the composed current which is obtained by composing the negative parts of the three-phase drive current signals. A composed current obtained by composing the positive parts of the three-phase drive currents can also be detected. Furthermore, each of the low-side power transistors and the high-side power transistors can have multiple output terminals, and a current output to one of the terminals can be detected, whereby the current detecting resistor can be eliminated.

Still further, in each of the above-mentioned embodiments, the charge current of the slant producing part is set at a required value, thereby simplifying the configuration. However, the present invention is not limited to such a configuration. For example, the charge current of the slant producing part can be changed continuously or stepwise responding with or interlocked with the rotational speed of the disk or the rotor. This configuration is also included in the scope of the present invention.

In addition, the configuration of the present invention can be modified variously without departing from the purpose of the present invention, and it is needless to say that such modifications can also be included in the scope of the present invention.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A motor comprising:
   a rotor having a field part which generates field fluxes;
   Q-phase windings (Q is an integer of 3 or more);
   voltage supplying means, including two output terminals, for supplying a DC voltage;
   power supplying means having Q first power transistors and Q second power transistors, each of said Q first power transistors forming a current path between a first output terminal side of said voltage supplying means and one of said Q-phase windings, and each of said Q second power transistors forming a current path between a second output terminal side of said voltage supplying means and one of said Q-phase windings;
   voltage detecting means for producing a detected pulse signal which responds to terminal voltages of said Q-phase windings;
   phase detecting means for producing a phase pulse signal which responds to terminal voltages of said Q-phase windings;
   state shifting means for shifting a holding state from one state to at least one other state in sequence responding to said detected pulse signal of said voltage detecting means;
   activation control means for controlling active periods of said Q first power transistors and said Q second power transistors responding to said holding state of said state shifting means;
   commanding means for producing a command signal which responds to said phase pulse signal of said phase detecting means; and
   switching operation means for causing at least one power transistor among said Q first power transistors and said Q second power transistors to perform high-frequency switching responding to said command signal; wherein
   said activation control means causes each of said active periods of said Q first power transistors and said Q second power transistors to become larger than the period of 360/Q electrical degrees,
   said switching operation means produces a high-frequency switching pulse signal which responds to said command signal and switches said at least one power transistor responding to said switching pulse signal, and said phase detecting means includes:
      slant producing means for producing a slant voltage signal at a terminal of n capacitor, said slant voltage signal responding intermittently to a voltage difference between one of the power supplying terminal voltages and the common terminal voltage of said Q-phase windings during sampling periods and having a voltage slant during at least one rest period except said sampling periods, and
      phase pulse producing means for producing said phase pulse signal by comparing said slant voltage signal to a reference voltage.

2. The motor in accordance with claim 1, wherein said slant producing means selects one of the power supplying terminal voltages in accordance with the operation of said stare shifting means, and produces said slant voltage which intermittently responds to the voltage difference between the selected power supplying terminal voltage and the common terminal voltage.

3. The motor in accordance wit claim 1, wherein said slant producing means includes:
   said capacitor, sampling means for intermittently obtaining a sampled voltage at the terminal of said capacitor, said sampled voltage responding to the voltage difference between one of the power supplying terminal voltages and the common terminal voltage during said sampling periods, and
   charging means for charging said capacitor with a current so as to produce said voltage slant.

4. The motor in accordance with claim 1, wherein said switching operation means includes:
   current detecting means for producing a current detection signal which responds to or corresponds to a composed current to said Q-phase windings from said voltage supplying means, and
   switching control means for producing said switching pulse signal which responds to said current detection signal and said command signal.

5. The motor in accordance with claim 1, wherein
   said state shifting means shifts said bolding state from a first state to a second state after a first adjust rime from detection of said detected pulse signal, and further shifts said holding state from said second state to a third state after a second adjust time from detection of said detected pulse signal, said second adjust time being larger than said first adjust time.

6. The motor in accordance with claim 5, wherein said state shifting means produces said first adjust rime and said second adjust time proportional to an interval of said detected pulse signal.

7. The motor in accordance with claim 1, wherein said phase detecting means obtains said common terminal voltage of said Q-phase windings by comprising the power supplying terminal voltages of said Q-phase windings.

8. A motor comprising:
a rotor having a field pan which generates field fluxes;
Q-phase windings (Q is an integer of 3 or more);
voltage supplying means, including two output terminals, for supplying a DC voltage;
power supplying means having Q first power transistors and Q second power transistors, each of said Q first power transistors forming a current path between a first output terminal side of said voltage supplying means and one of said Q-phase windings, and each of said Q second power transistors forming a current path between a second output terminal side of said voltage supplying means and one of said Q-phase windings;
phase detecting means for producing a phase pulse signal which responds to terminal voltages of said Q-phase windings;
state shifting means for shifting a holding state from one state to at least one other state in sequence responding to said phase pulse signal of said phase detecting means;
activation control means for controlling active periods of said Q first power transistors and said Q second power transistors responding to said holding state of sail state shifting means;
commanding means for producing a command signal which responds to said phase pulse signal of said phase detecting means; and
switching operation means for causing at least one power transistor among said Q first power transistors and said Q second power transistors to perform high-frequency switching responding to said command signal; wherein
said activation control means causes each of said active periods of said Q first power transistors and said Q second power transistors to become larger than the period of 360/Q electrical degrees,
said switching operation means produces a high-frequency switching pulse signal which responds to said command signal and switches said at least one power transistor responding to said switching pulse signal, and
said phase detecting means includes:
slant producing means for producing a slant voltage signal at a terminal of a capacitor, said slant voltage signal responding intermittently to a voltage difference between one of the power supplying terminal voltages and the common terminal voltage of said Q-phase windings during sampling periods and having a voltage slant during at least one of rest period except said sampling periods, and
phase pulse producing means for producing said phase pulse signal by comparing said slant voltage signal to a reference voltage.

9. The motor in accordance with claim 8, wherein said slant producing means selects one of the power supplying terminal voltages in accordance with the operation of said state shifting means, and produces said slant voltage which intermittently responds to the voltage difference between the selected power supplying terminal voltage and the common terminal voltage.

10. The motor in accordance with claim 8, wherein said slant producing means includes:
said capacitor,
sampling means for intermittently obtaining a sampled voltage at the terminal of said capacitor, said sampled voltage responding to the voltage difference between one of the power supplying terminal voltages and the common terminal voltage during said sampling periods, and
charging means for charging said capacitor with a current so as to produce said voltage slant.

11. The motor in accordance with claim 8, wherein said switching operation means includes:
current detecting means for producing a current detection signal which responds to or corresponds to a composed current to said Q-phase windings from said voltage supplying means, and
switching control means for producing said switching pulse signal which responds to said current detection signal and said command signal.

12. The motor in accordance with claim 8, where said state shifting means shifts said holding state from a first state to a second state after a first adjust time from detection of said detected pulse signal, and further shifts said holding state from said second state to a third state after a second adjust time from detection of said detected pulse signal, said second adjust time being larger than said first adjust time.

13. The motor in accordance with claim 12, wherein said state shifting means produces said first adjust time and said second adjust time proportional to an interval of said detected pulse signal.

14. The motor in accordance with claim 8, wherein said phase detecting means obtains said common terminal voltage of said Q-phase windings by composing the power supplying terminal voltages of said Q-phase windings.

15. A motor comprising:
a rotor having a field part which generates field fluxes;
Q-phase windings (Q is an integer of 3 or more);
voltage supplying means, including two output terminals, for supplying a DC voltage;
power supplying means having plural power transistors, said plural power transistors supplying said Q-phase windings with bi-directional currents from said voltage supplying means;
phase detecting means for producing a phase pulse signal which responds to terminal voltages of said Q-phase windings;
activation operation means for controlling active periods of said plural power transistors responding to terminal voltages of said Q-phase windings;
commanding means for producing a command signal which responds to said phase pulse signal of said phase detecting means; and
switching operation means for causing at least one power transistor among said plural power transistors to perform high-frequency switching responding to said command signal; wherein
said activation operation means causes each of said active periods of said plural power transistors to become larger than the period of 360/Q electrical degrees, said switching operation means produces a high-frequency switching pulse signal which responds to said command signal and switches said at least one power transistor responding to said switching pulse signal, and said phase detecting means includes:
slant producing means for producing a slant voltage signal at a terminal of a capacitor, said slant voltage signal responding intermittently to a voltage difference between one of the power supplying terminal voltages and the common terminal voltage of said Q-phase windings during sampling periods and having a voltage slant during at least one rest period except said sampling periods, and phase pulse producing means for producing said phase pulse signal responding to said slant voltage signal.

16. The motor in accordance with claim 15, wherein said slant producing means includes:
said capacitor,
sampling means for intermittently obtaining a sampled voltage at the terminal of said capacitor, said sampled voltage responding to the voltage difference between one of the power supplying terminal voltages and the common terminal voltage during said sampling periods, and
charging means for charging said capacitor with a current so as to produce said voltage slant.

17. The motor in accordance with claim 15, wherein said switching operation means includes:
current detecting means for producing a current detection signal which responds to or corresponds to a composed current to said Q-phase windings from said voltage supplying means, and
switching control means for producing said switching pulse signal which responds to said current detection signal and said command signal.

18. A motor comprising:
a rotor having a field part which generates field fluxes;
Q-phase windings (Q is an integer of 3 or more);
voltage supplying means, including two output terminals, for supplying a DC voltage;
power supplying means having plural power transistors, said plural power transistors supplying said Q-phase windings with bi-directional currents from said voltage supplying means;
phase detecting means for producing a phase pulse signal which responds to terminal voltages of said Q-phase windings;
activation operation means for controlling active periods of said plural power transistors responding to terminal voltages of said Q-phase windings;
commanding means for producing a command signal which responds to said phase pulse signal of said phase detecting means; and
switching operation means for causing at least one power transistor among said plural power transistors to perform high-frequency switching responding to said command signal; wherein
said activation operation means causes each of said active periods of said plural power transistors to become larger than the period of 360/Q electrical degrees,
said switching operation means produces a high-frequency switching pulse signal which responds to said command signal and switches said at least one power transistor responding said switching pulse signal, and said phase detecting means includes:
slant producing means for producing a first voltage signal at a terminal of a first capacitor which intermittently responds to one of the power supplying terminal voltages of said Q-phase winding means, and producing a second voltage signal at a terminal of a second capacitor which intermittently responds to the common terminal voltage of said Q-phase windings during sampling periods and has a voltage slant during at least one rest period except said sampling periods, and
phase pulse producing means for producing said phase pulse signal by comparing said first voltage signal to said second voltage signal.

19. The motor in accordance with claim 18, when in said slant producing means includes:
capacitor means having said first capacitor and said second capacitor,
first sampling means for obtaining a first sampled voltage as said first voltage signal at the terminal of said first capacitor, said first sampled voltage intermittently responding to one of the power supplying terminal voltages of said Q-phase windings,
second sampling means for obtaining a second sampled voltage at the terminal of said second capacitor, said second sampled voltage intermittently responding to the common terminal voltage of said Q-phase windings, and
charging means for charging said second capacitor with a current so as to produce said voltage slant of said second voltage signal.

20. The motor in accordance with claim 18, wherein said switching operation means includes:
current detecting means for producing a current detection signal which responds to or corresponds to a composed current to said Q-phase windings from said voltage supplying means, and
switching control means for producing said switching pulse signal which responds to said current detection signal and said command signal.

21. A disk drive apparatus comprising:
head means for at least reproducing a signal from a disk or recording a signal on said disk;
processing means for at least processing an output signal from said head means and outputting a reproduced signal, or processing a signal and outputting a recording signal into said head means,
a rotor, having a field part which generates field fluxes, for driving directly said disk;
Q-phase windings (Q is an integer of 3 or more);
voltage supplying means, including two output terminals, for supplying a DC voltage;
power supplying means having Q first power transistors and Q second power transistors, each of said Q first power transistors forming a current path between a first output terminal side of said voltage supplying means and one of said Q-phase windings, and each of said Q second power transistors forming a current path between a second output terminal side of said voltage supplying means and one of said Q-phase windings;
voltage detecting means for producing a detected pulse signal which responds to terminal voltages of said Q-phase windings;
phase detecting means for producing a phase pulse signal which responds to terminal voltages of said Q-phase windings;

state shifting means for shifting a holding state from one state to at least one other state in sequence responding to said detected pulse signal of said voltage detecting means;

activation control means for controlling active periods of said Q first power transistors and said Q second power transistors responding to said holding state of said state shifting means;

commanding means for producing a command signal which responds to said phase pulse signal of said phase detecting means; and switching operation means for causing at least one power transistor among said Q first power transistors and said Q second power transistors to perform high-frequency switching responding to said command signal; wherein said activation control means causes each of said active periods of said Q first power transistors and said Q second power transistors to become larger than the period of 360/Q electrical degrees, said switching operation means produces a high-frequency switching pulse signal which responds to said command signal and switches said at least one power transistor responding said switching pulse signal, and said phase detecting means includes:
  slant producing means for producing a slant voltage signal at a terminal of a capacitor, said slant voltage signal responding intermittently to a voltage difference between one of the power supplying terminal voltages and the common terminal voltage of said Q-phase windings during sampling periods and having a voltage slant during at least one rest period except said sampling periods, and
  phase pulse producing means for producing said phase pulse signal by comparing said slant voltage signal to a reference voltage.

22. The disk drive apparatus in accordance with claim 21, wherein said slant producing means selects one of the power supplying terminal voltages in accordance with the operation of said state shifting means, and produces said slant voltage which intermittently responds to the voltage difference between the selected power supplying terminal voltage and the common terminal voltage.

23. The disk drive apparatus in accordance with claim 21, wherein
  said slant producing means includes:
    said capacitor,
    sampling means for intermittently obtaining a sampled voltage at the terminal of said capacitor, said sampled voltage responding to the voltage difference between one of the power supplying terminal voltages and the common terminal voltage during said sampling periods, and
    charging means for charging said capacitor with a current so as to produce said voltage slant.

24. The disk drive apparatus in accordance with claim 21, wherein
  said switching operation means includes:
    current detecting means for producing a current detection signal which responds to or corresponds to a composed current to said Q-phase windings from said voltage supplying means, and
    switching control means for producing said switching pulse signal which responds to said current detection signal and said command signal.

25. The disk drive apparatus in accordance with claim 21, wherein said state shifting means shifts said holding state from a first state to a second state after a first adjust time from detection of said detected pulse signal, and further shifts said holding state from said second state to a third state after a second adjust time from detection of said detected pulse signal, said second adjust time being larger than said first adjust time.

26. The disk drive apparatus in accordance with claim 25, wherein said state shifting means produces said first adjust time and said second adjust time proportional to an interval of said detected pulse signal.

27. The disk drive apparatus in accordance with claim 21 wherein said phase detecting means obtains said common terminal voltage of said Q-phase windings by composing the power supplying terminal voltages of said Q-phase windings.

28. A disk chive apparatus comprising:
  head means for at least reproducing a signal from a disk or recording a signal on said disk;
  processing means for at least processing an output signal from said head means and outputting a reproduced signal, or processing a signal and outputting a recording signal into said head means;
  a rotor, having a field part which generates field fluxes, for driving directly said disk;
  Q-phase windings (Q is an integer of 3 or more);
  voltage supplying means, including two output terminals, for supplying a DC voltage;
  power supplying means having Q first power transistors and Q second power transistors, each of said Q first power transistors forming a current path between a first output terminal side of said voltage supplying means and one of said Q-phase windings, and each of said Q second power transistors forming a current path between a second output terminal side of said voltage supplying means and one of said Q-phase windings;
  phase detecting means for producing a phase pulse signal which responds to terminal voltages of said Q-phase windings;
  state shifting means for shifting a holding state from one state to at least one other state in sequence responding to said phase pulse signal of said phase detecting means;
  activation control means for controlling active periods of said Q first power transistors and said Q second power transistors responding to said holding state of said state shifting means;
  commanding means for producing a command signal which responds to said phase pulse signal of said phase detecting means; and
  switching operation means for causing at least one power transistor among said Q first power transistors and said Q second power transistors to perform high-frequency switching responding to said command signal; wherein
  said activation control means causes each of said active periods of said Q first power transistors and said Q second power transistors to become larger than the period of 360/Q electrical degrees,
  said switching operation means produces a high-frequency switching pulse signal which responds to said command signal and switches said at least one power transistor responding to said switching pulse signal, and
  said phase detecting means includes:
    slant producing means for producing a slant voltage signal at a terminal of a capacitor, said slant voltage signal responding intermittently to a voltage difference between one of the power supplying terminal voltages and the common terminal voltage of said Q-phase windings during sampling periods and having a voltage slant during at least one rest period except said sampling periods, and phase pulse producing means for producing said phase pulse signal by comparing said slant voltage signal to a reference voltage.

29. The disk drive apparatus in accordance with claim 28, wherein said slant producing means selects one of the power supplying terminal voltages in accordance with the operation of said state shifting means, and produces said slant voltage which intermittently responds to the voltage difference between the selected power supplying terminal voltage and the common terminal voltage.

30. The disk drive apparatus in accordance with claim 28, wherein said slant producing means includes:

said capacitor, sampling means for intermittently obtaining a sampled voltage at the terminal of said capacitor, said sampled voltage responding to the voltage difference between one of the power supplying terminal voltages and the common terminal voltage during said sampling periods, and charging means for charging said capacitor with a current so as to produce said voltage slant.

31. The disk drive apparatus in accordance with claim 28, wherein said switching operation means includes:

current detecting means for producing a current detection signal which responds to or corresponds to a composed current to said Q-phase windings from said voltage supplying means, and switching control means for producing said switching pulse signal which responds to said current detection signal and said command signal.

32. The disk drive apparatus in accordance with claim 28, wherein said state shifting means shifts said holding state from a first state to a second state after a first adjust time from detection of said detected pulse signal, and further shifts said holding state from said second state to a third state after a second adjust time from detection of said detected pulse signal, said second adjust time being larger than said first adjust time.

33. The disk drive apparatus in accordance with claim 32, wherein said state shifting means produces said first adjust time and said second adjust time proportional to an interval of said detected pulse signal.

34. The disk drive apparatus in accordance with claim 28, wherein said phase detecting means obtains said common terminal voltage of said Q-phase windings by composing the power supplying terminal voltages of said Q-phase windings.

35. A disk drive apparatus comprising:

head means for at least reproducing a signal from a disk or recording a signal on said disk;

processing means for at least processing an output signal from said head means and outputting a reproduced signal, or processing a signal and outputting a recording signal into said head means;

a rotor, having a field part which generates field fluxes, for driving directly said disk;

Q-phase windings (Q is an integer of 3 or more);

voltage supplying means, including two output terminals, for supplying a DC voltage;

power supplying means having plural power transistors, said plural power transistors supplying said Q-phase windings bi-directional currents from said voltage supplying means;

phase detecting means for producing a phase pulse signal which responds to terminal voltages of said Q-phase windings;

activation operation means for controlling active periods of said plural power transistors responding to terminal voltages of said Q-phase windings;

commanding means for producing a command signal which responds to said phase pulse signal of said phase detecting means; and switching operation means for causing at least one power transistor among said plural power transistors to perform high-frequency switching responding to said command signal; wherein said activation operation means causes each of said active periods of said plural power transistors to become larger than the period of 360/Q electrical degrees, said switching operation means produces a high-frequency switching pulse signal which responds to said command signal and switches said at least one power transistor responding said switching pulse signal, and said phase detecting means includes:

slant producing means for producing a slant voltage signal at a terminal of a capacitor, said slant voltage signal responding intermittently to a voltage difference between one of the power supplying terminal voltages and the common terminal voltage of said Q-phase windings during sampling periods and having a voltage slant during at least one rest period except said sampling periods, and phase pulse producing means for producing said phase pulse signal responding to said slant voltage signal.

36. The disk drive apparatus in accordance with claim 35, wherein said slant producing means includes:

said capacitor, sampling means for intermittently obtaining a sampled voltage at the terminal of said capacitor, said sampled voltage responding to the voltage difference between one of the power supplying terminal voltages and the common terminal voltage during said sampling periods, and charging means for charging said capacitor with a current so as to produce said voltage slant.

37. The disk drive apparatus in accordance with claim 35, wherein said switching operation means includes:

current detecting means for producing a current detection signal which responds to or corresponds to a composed current to said Q-phase windings from said voltage supplying means, and switching control means for producing said switching pulse signal which responds to said current detection signal and said command signal.

38. A disk drive apparatus comprising:

head means for at least reproducing a signal from a disk or recording a signal on said disk;

processing means for at least processing an output signal from said head means and outputting a reproduced signal, or processing a signal and outputting a recording signal into said head means;

a rotor, having a field part which generates field fluxes, for driving directly said disk;

Q-phase windings (Q is an integer of 3 or more);

voltage supplying means, including two output terminals, for supplying a DC voltage;

power supplying means having plural power transistors, said plural power transistors supplying said Q-phase windings bi-directional currents from said voltage supplying means;

phase detecting means for producing a phase pulse signal which responds to terminal voltages of said Q-phase windings;

activation operation means for controlling active periods of said plural power transistors responding to terminal voltages of said Q-phase windings;

commanding means for producing a command signal which responds to said phase pulse signal of said phase detecting means; and switching operation means for causing at least one power transistor among said plural power transistors to perform high-frequency switching responding said command signal; wherein said activation operation means causes each of said active periods of said plural power transistors to become larger than the period of 360/Q electrical degrees, said switching operation means produces a high-frequency switching pulse signal which responds to said command signal and switches said at least one power transistor responding to said switching pulse signal, and said phase detecting means includes:
   slant producing means for producing a first voltage signal at a terminal of a first capacitor which intermittently responds to one of the power supplying terminal voltages of said Q-phase winding means, and producing a second voltage signal at a terminal of a second capacitor which intermittently responds to the common terminal voltage of said Q-phase windings during sampling periods and has a voltage slant during at least one rest period except said sampling periods, and
   phase pulse producing means for producing said phase pulse signal by comparing said first voltage signal with said second voltage signal.

39. The disk drive apparatus in accordance with claim 38, wherein said slant producing means includes:

capacitor means having said first capacitor and said second capacitor, first sampling means for obtaining a first sampled voltage as said first voltage signal at the terminal of said first capacitor, said first sampled voltage intermittently responding to one of the power supplying terminal voltages of said Q-phase windings, second sampling means for obtaining a second sampled voltage at the terminal of said second capacitors said second sampled voltage intermittently responding to the common terminal voltage of said Q-phase windings, and charging means for charging said second capacitor with a current so as to produce said voltage slant of said second voltage signal.

40. The disk drive apparatus in accordance wit claim 38, wherein said switching operation means includes:

current detecting means for producing a current detection signal which responds or corresponds to a composed current to said Q-phase windings from said voltage supplying means, and switching control means for producing said switching pulse signal which responds to said current detection signal and said command signal.

* * * * *

UNITED STATES PATENT AND TRADEMARK OFFICE
CERTIFICATE OF CORRECTION

PATENT NO. : 6,680,593 B2
DATED : January 20, 2004
INVENTOR(S) : Makoto Gotou

It is certified that error appears in the above-identified patent and that said Letters Patent is hereby corrected as shown below:

Column 52,
Line 25, after the word "and" should start a new paragraph;
Line 27, "n" should read "a";
Line 40, "stare" should read -- state --;
Line 44, "wit" should read -- with --;
Line 46, the word "sampling" should start a new paragraph;
Line 65, "bolding" should read -- holding --;
Line 66, "rime" should read -- time --;

Column 53,
Line 6, "rime" should read -- time --;
Line 14, "pan" should read -- part --;
Line 35, "sail" should read -- said --;
Line 60, the word "of" should be deleted.

Signed and Sealed this

Twenty-second Day of June, 2004

JON W. DUDAS
*Acting Director of the United States Patent and Trademark Office*